(12) United States Patent
    Oledzki

(10) Patent No.: US 10,145,454 B2
(45) Date of Patent: Dec. 4, 2018

(54) SLIDING FRICTION-FREE GEAR

(71) Applicant: Wieslaw Julian Oledzki, Bialystok (PL)

(72) Inventor: Wieslaw Julian Oledzki, Bialystok (PL)

( * ) Notice: Subject to any disclaimer, the term of this patent is extended or adjusted under 35 U.S.C. 154(b) by 222 days.

(21) Appl. No.: 14/809,190

(22) Filed: Jul. 25, 2015

(65) Prior Publication Data

US 2017/0023110 A1    Jan. 26, 2017

(51) Int. Cl.
    *F16H 15/52* (2006.01)

(52) U.S. Cl.
    CPC .................... *F16H 15/52* (2013.01)

(58) Field of Classification Search
    CPC .......... F16H 13/00; F16H 13/04; F16H 13/06; F16H 13/08; F16H 15/48; F16H 15/503; F16H 15/52
    USPC ....... 475/162, 165, 166, 178, 179, 183, 196, 475/197, 245, 246, 247, 253, 348; 476/70
    See application file for complete search history.

(56) References Cited

U.S. PATENT DOCUMENTS

| 5,247,847 | A  | * | 9/1993  | Gu ......................... F16H 1/24 |
|           |    |   |         | 74/422 |
| 7,258,642 | B2 | * | 8/2007  | Jones ..................... F16H 25/06 |
|           |    |   |         | 475/168 |
| 8,672,792 | B2 | * | 3/2014  | Tozaki ................... F16H 13/08 |
|           |    |   |         | 475/183 |
| 9,206,881 | B2 | * | 12/2015 | Kong ..................... F16H 25/06 |
| 2003/0072665 | A1 | * | 4/2003 | Bachmann .............. F04C 2/10 |
|           |    |   |         | 418/171 |
| 2003/0134708 | A1 | * | 7/2003 | Regner ................... F16H 1/32 |
|           |    |   |         | 475/178 |
| 2004/0102274 | A1 | * | 5/2004 | Tesar ..................... B64C 13/34 |
|           |    |   |         | 475/168 |
| 2013/0072341 | A1 | * | 3/2013 | Chen ..................... B25F 5/001 |
|           |    |   |         | 475/269 |

* cited by examiner

*Primary Examiner* — William V Gilbert

(57) ABSTRACT

A sliding friction-free gear has cams of specific profiles, rollers separating cooperating cams that roll over the cams of the gears, thus eliminating the sliding friction between the gears. The rollers are mounted rotatably e.g. in sliders or eccentrics, wherein the sliders, resp. eccentrics, are mounted slidingly, resp. rotatably, in a yoke attached rigidly to a shaft. The rollers are free to execute oscillating motion relative the yoke while rolling over the cam profiles of the cams of the gears. The cooperating members of the gear contact along a line like in conventional evolvent gears, and unlike in the Wildhaber-Novikov's gear (where the momentary contact between teeth of cooperating toothed wheels is pointwise); therefore the gear according to the present invention offers much larger transmission capacity and is much less prone to seizure than known gears.

10 Claims, 46 Drawing Sheets

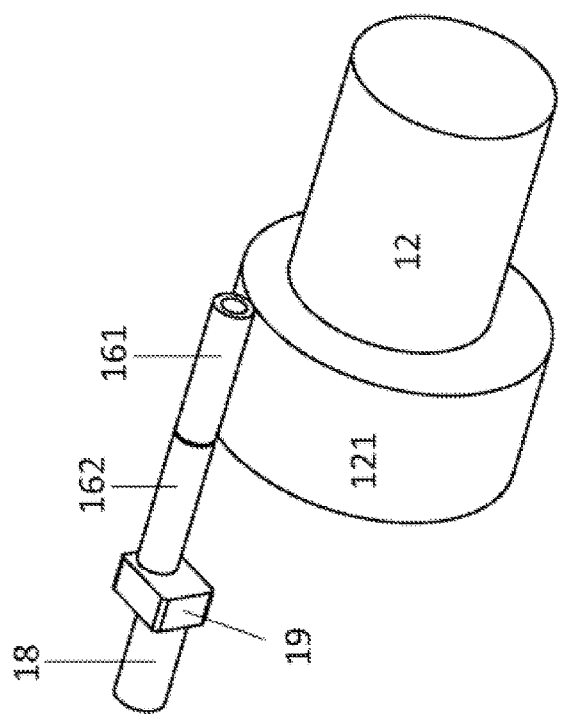
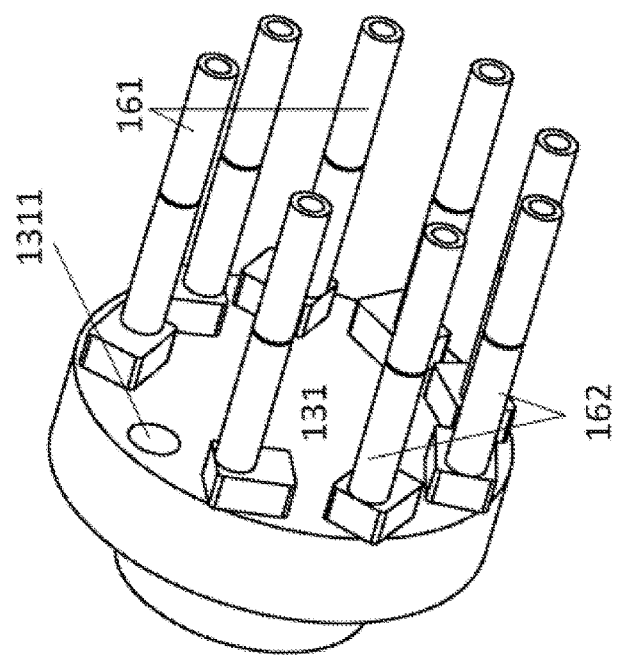
Fig. 21

SLIDING FRICTION-FREE GEAR

TECHNICAL FIELD OF THE INVENTION

The invention relates to gears, and is particularly concerned with a method for elimination of sliding friction between cooperating gear members.

STATE OF THE ART AND BACKGROUND OF THE INVENTION

Power transmitting devices known in the prior art are naturally divided into the following four categories: friction drives, hydraulic (hydrostatic or hydrodynamic) transmissions, electric transmissions, and cogwheels or gears. All these drives have important disadvantages. Thus friction drives that depend upon friction force acting between moving parts in contact to transmit motion have very limited transmission capacity and therefore are usually bulky and heavy, and suffer from slippage between cooperating members which diminishes their durability and efficiency, and renders their reliability questionable. Hydraulic transmissions are capable of coping with large loads while retaining compact size, but are complicated and expensive, and feature poor efficiency and not always satisfactory reliability. Electric transmissions are complicated, heavy and expensive, and definitely not suitable for application in high power drive lines of aerial vehicles. Gears are far superior to all aforementioned power transmitting devices in terms of transmission capacity/weight, efficiency and reliability, and are used as the only power transmitting devices in aviation drives (with exception of those of very small power). However also gears have some disadvantages: Cooperating gear teeth slide against each other (rarely used Wildhaber-Novikov's meshing being an exception), which diminishes gear's transmission capacity and reliability, and causes gears require good lubrication, as lack of lubrication leads to seizure and catastrophic failure. Recent trends in large bypass ratio turbofan engines technology (large diameter fans driven by turbine via a gear) impose particularly high demands on the gears as far as reliability, safety and transmission capacity are concerned.

Gears, in which teeth on the pinion are replaced by rollers, as described e.g. in U.S. Pat. No. 5,247,847 haven't earned wider acceptance, and rollers that cyclically engage and disengage spur gear teeth seems to be the main reason of this state of affairs.

Thus there is a need for a compact, lightweight, extremely reliable gear, insusceptible to seizure, capable of meeting stringent requirements of aviation industry.

SUMMARY OF THE INVENTION

Thus the principal objective of the present invention is to provide a gear that outperforms known power transmitting devices particularly in aspects of compactness, lightness, reliability, insusceptibility to seizure, and transmission capacity, thus being capable of meeting most stringent requirements of aviation industry.

Another objective of the present invention is to provide a one stage gear of compact structure having large transmission ratio (16:1 to 50:1 and more).

These and other objectives are achieved according to the present invention by providing sliding friction-free gears, the cooperating members of which contact along a line like in conventional evolvent gears, and unlike Wildhaber-Novikov's gear (where the momentary contact between teeth of cooperating toothed wheels is pointwise), which therefore offer much larger transmission capacity and are much less prone to seizure than known gears.

The method for achieving sliding friction-free gears according to the present invention consists in providing gears with a specific toothing (or rather cams of specific profiles, as described below and claimed in separate patent claims), and separating cooperating gears by rollers that roll over the cams of the gears, thus eliminating the sliding friction between the gears. The rollers are mounted rotatably e.g. in sliders or eccentrics, wherein the sliders, resp. eccentrics, are mounted slidingly, resp. rotatably, in a yoke. The rollers are free to execute oscillating motion relative the yoke while rolling over the cam profiles of the cams of the gears.

As mentioned above, thanks to the virtual absence of the sliding friction between the transmission elements meeting along the lines, the gear of the present invention features substantially greater transmission capacity than ordinary gears of the same dimensions. Thus the gear according to the present invention is expected to offer substantial gains in transmission's capacity/weight and transmission's capacity/size ratios and transmission's reliability (e.g. ability to work properly in the absence of lubrication) in comparison with conventional gears.

An interesting and important advantage of the gear according to the present invention is that the rollers separating cams remain in constant contact with cams, which contributes to the gear reliability and durability; moreover the rollers do the job of bearing, which renders separate bearings supporting output shaft unnecessary.

As indicated above, the gear of the instant invention is destined mainly for aviation drives (e.g. geared turbofan engines like Pratt&Whitney's "Pure Power" engine, final drives of rotorcrafts) and other most demanding applications like drivelines of high speed military vessels, ferries, hydrofoils, hovercrafts and pleasure crafts, and highly loaded winches.

BRIEF DESCRIPTION OF THE DRAWINGS

FIG. 21 is a partially exploded view of the assembly of rollers and the output shaft of said gear according to the instant invention with one roller assembly offset from the output shaft.

Like numerals denote like gear's elements through all the drawings, where:

Figure 1:
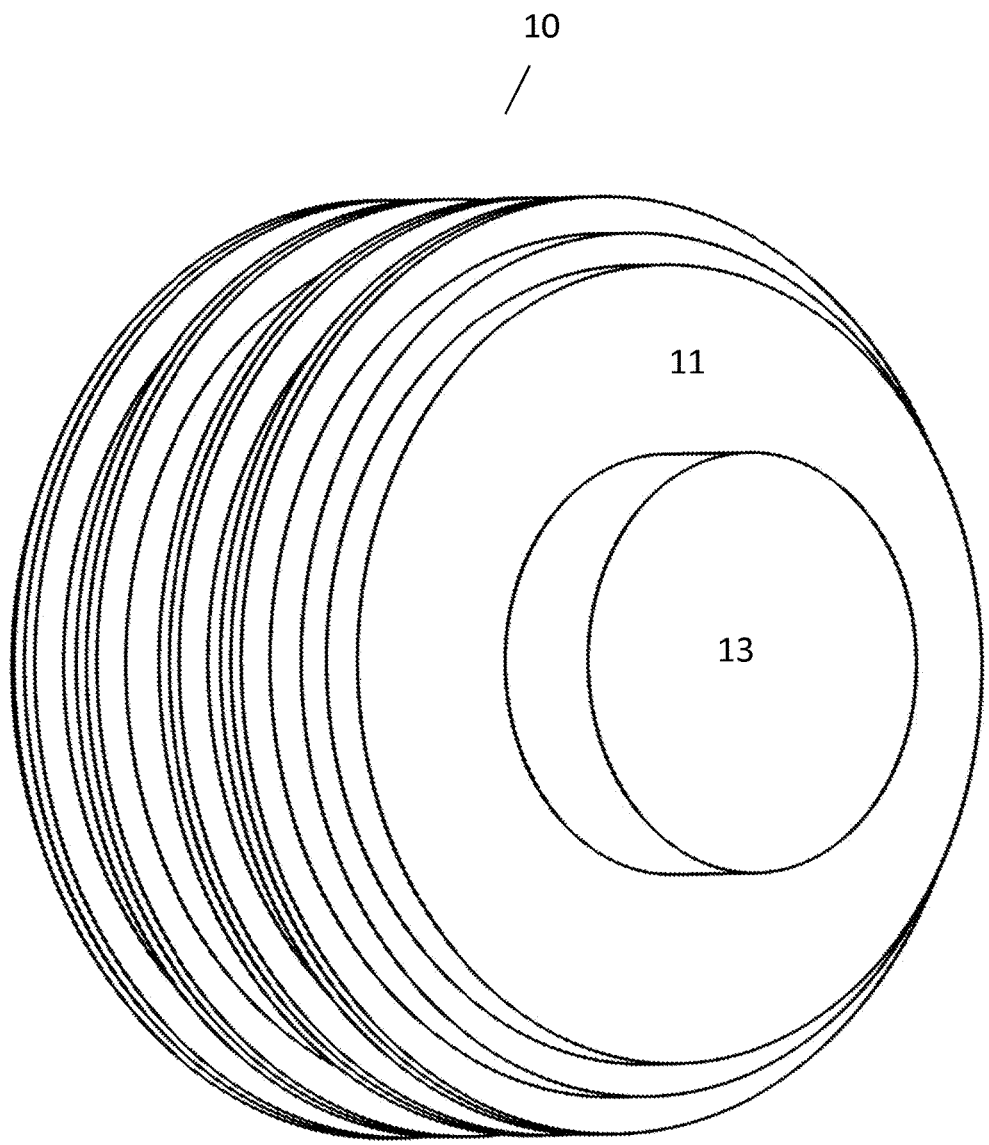
FIG. 1 is a general view of a gear according to the present invention.

Numeral 10 refers generally to the gear of the instant invention;

numeral 11 refers generally to the gear body;

numerals 111, 112, 113, 114, and 115 indicate the body parts;

numeral 1121, resp. 1141, indicates a cam placed in the part 112, resp. 114, of the gear body 11.

numeral 12 indicates the input shaft;

numeral 121 indicates an eccentric on the input shaft 12;

numeral 13 refers to the output shaft;

numeral 131 indicates a disc attached to the output shaft;

numeral 16 refers to primary rollers;

numeral 161 indicates secondary rollers;

numerals 151 and 152 refer to sliders supporting rollers 16;

numeral 14 refers generally to the roller's yoke;

numerals 141, 142, 143, 144, and 145 indicate parts of the yoke 14;

numeral 1411, resp. numeral 1451, refers to sockets placed in the part 141, resp. 145, of the yoke 14, and accommodating sliders 151, resp. 152;

numeral 1421, resp. 1441, indicates recesses placed in the part 142, resp. 144, of the yoke 14 and accommodating the primary rollers 16;

numeral 1431 refers to recesses placed in the part 143 of the yoke 14 and accommodating the secondary rollers 161;

numeral 162 refers generally to some other rollers of a second preferred embodiment of the invention;

numeral 17 refers to axles supporting rollers 161 and 162 of the second preferred embodiment of the invention;

numeral 18 indicates eccentrics supporting axles 17;

numeral 19 refers to webs joining axles 17 with eccentrics 18;

numeral 132 refers to a cam attached to the output shaft 13 of a third preferred embodiment of the invention;

numeral 23 indicates levers of the third preferred embodiment of the invention;

numeral 21, resp. 22, indicates generally to holders supporting rollers 161, resp. 162 of the third embodiment of the invention;

numeral 116 refers to sockets placed in body 11 of the third preferred embodiment of the invention that accommodating levers 23;

numeral 163 refers to auxiliary rollers used to mount pivotally holders 21 and 22 in the levers 23;

numeral 231, resp. 232, refers to sockets placed in the levers 23 and accommodating auxiliary rollers 163;

numeral 211, resp. 221, indicates sockets placed in the holders 21, resp. 22, and accommodating auxiliary rollers 163.

DETAILED DESCRIPTION OF PREFERRED EMBODIMENTS

First Embodiment, Variant a (FIGS. 1-15)

Figure 2:
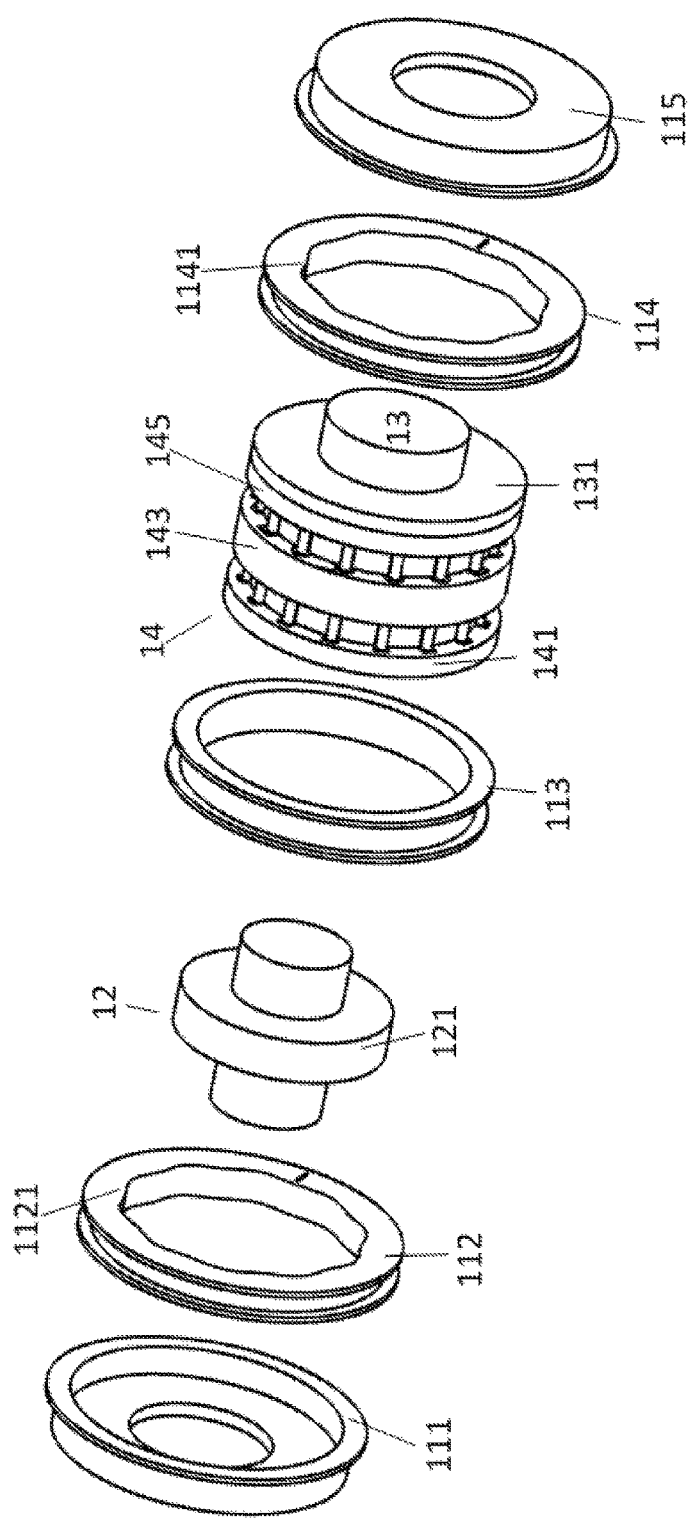
FIG. 2 is an exploded view of the gear according to the present invention showing its all principal elements.
Figure 3:
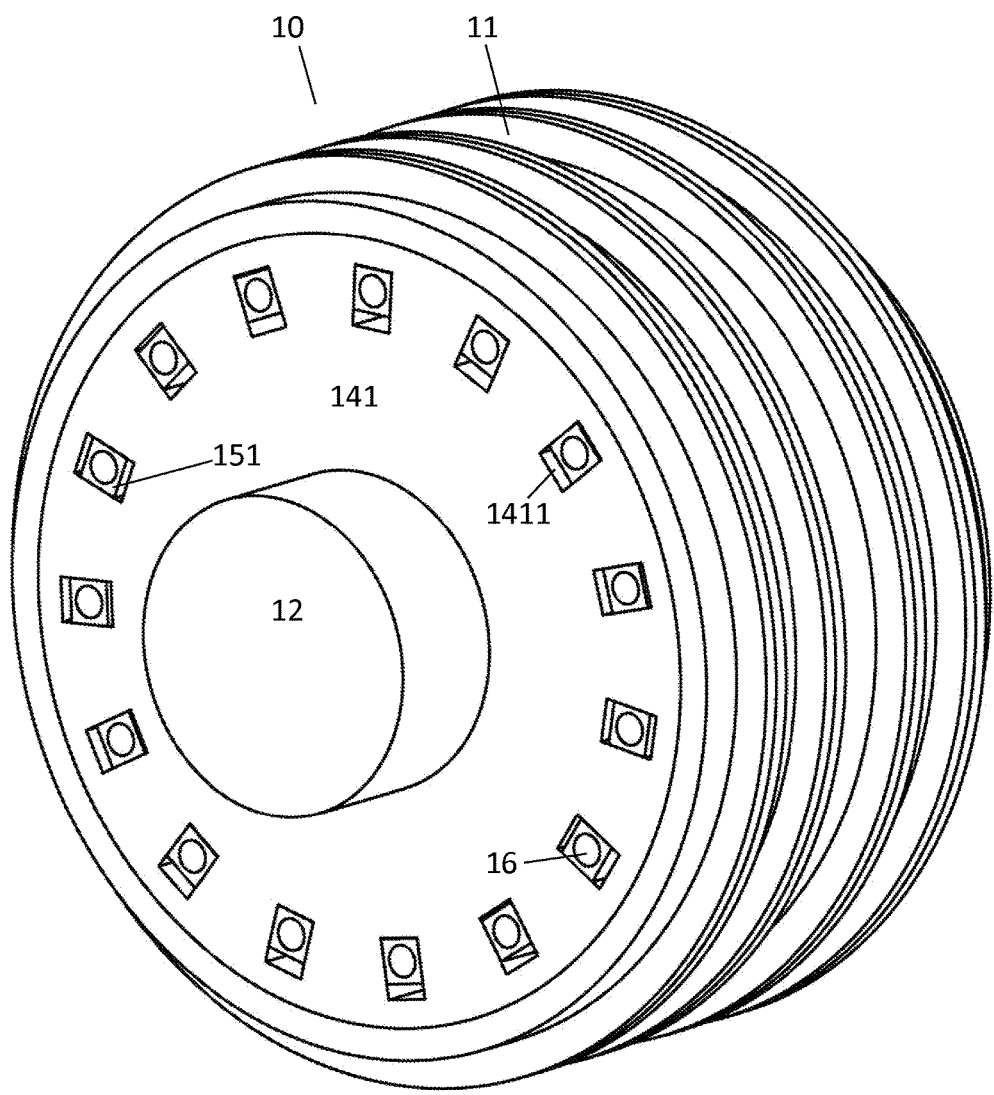
FIG. 3 is a perspective view of the gear according to the present invention with a section of the gear body removed.
Figure 4:
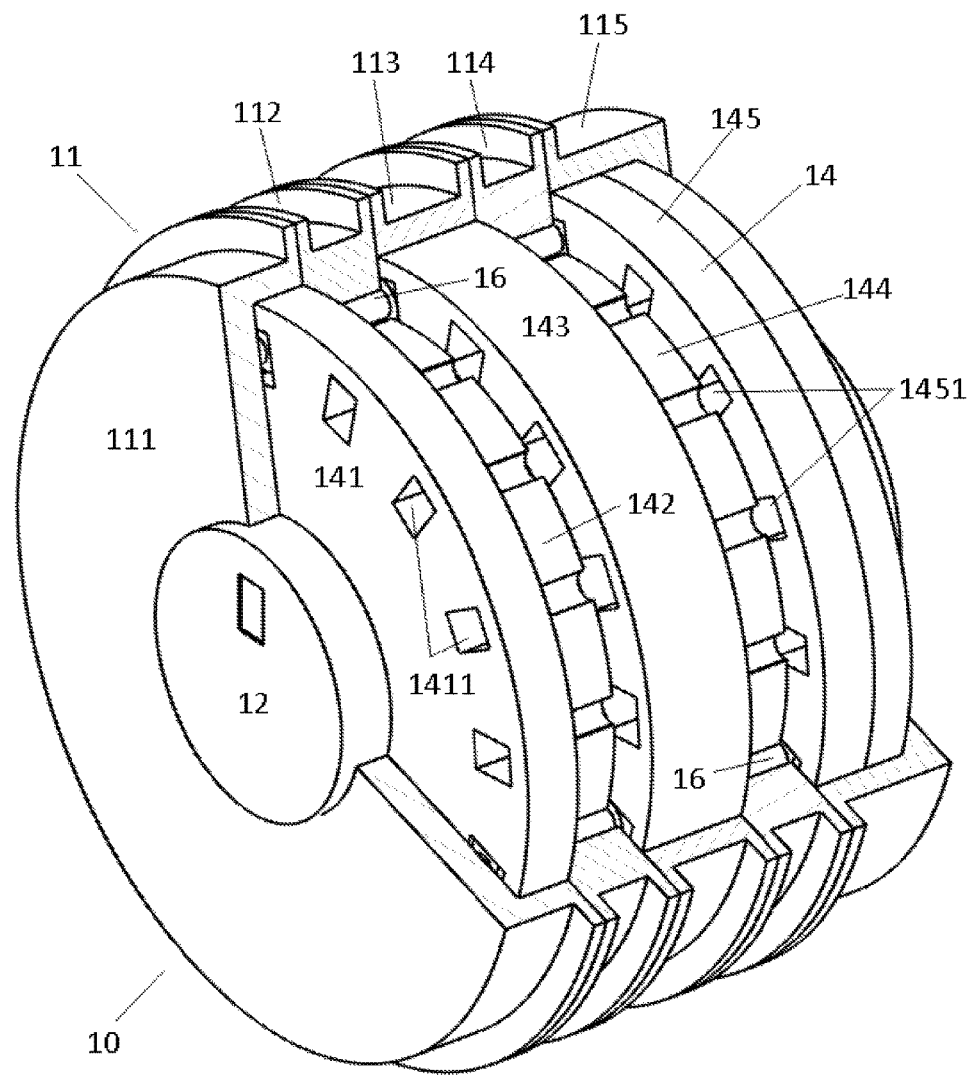
FIG. 4. is a cut-away section of the gear according to the present invention showing a roller's yoke.
Figure 5:
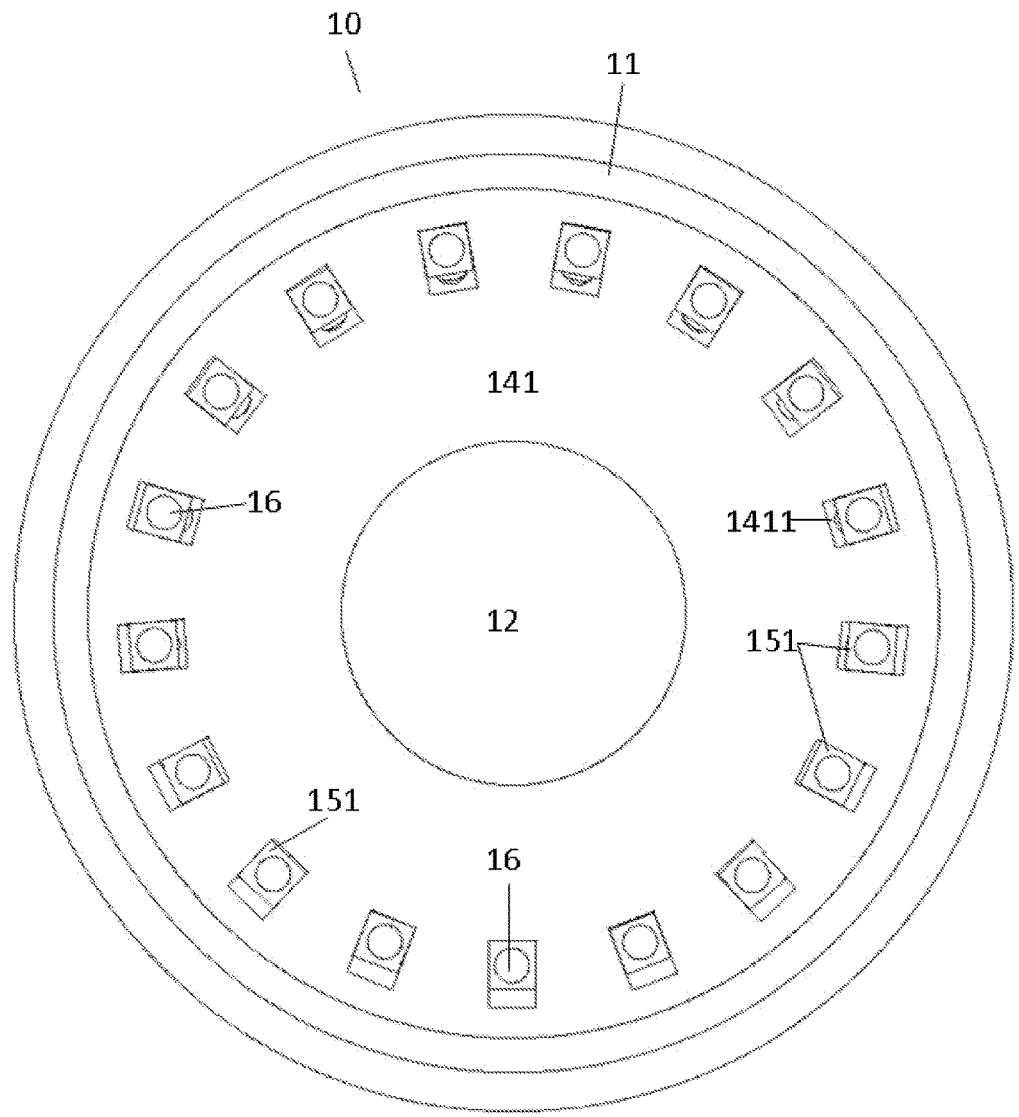
FIG. 5. is a frontal view of the gear according to the present invention with a section of the body removed.
Figure 6:
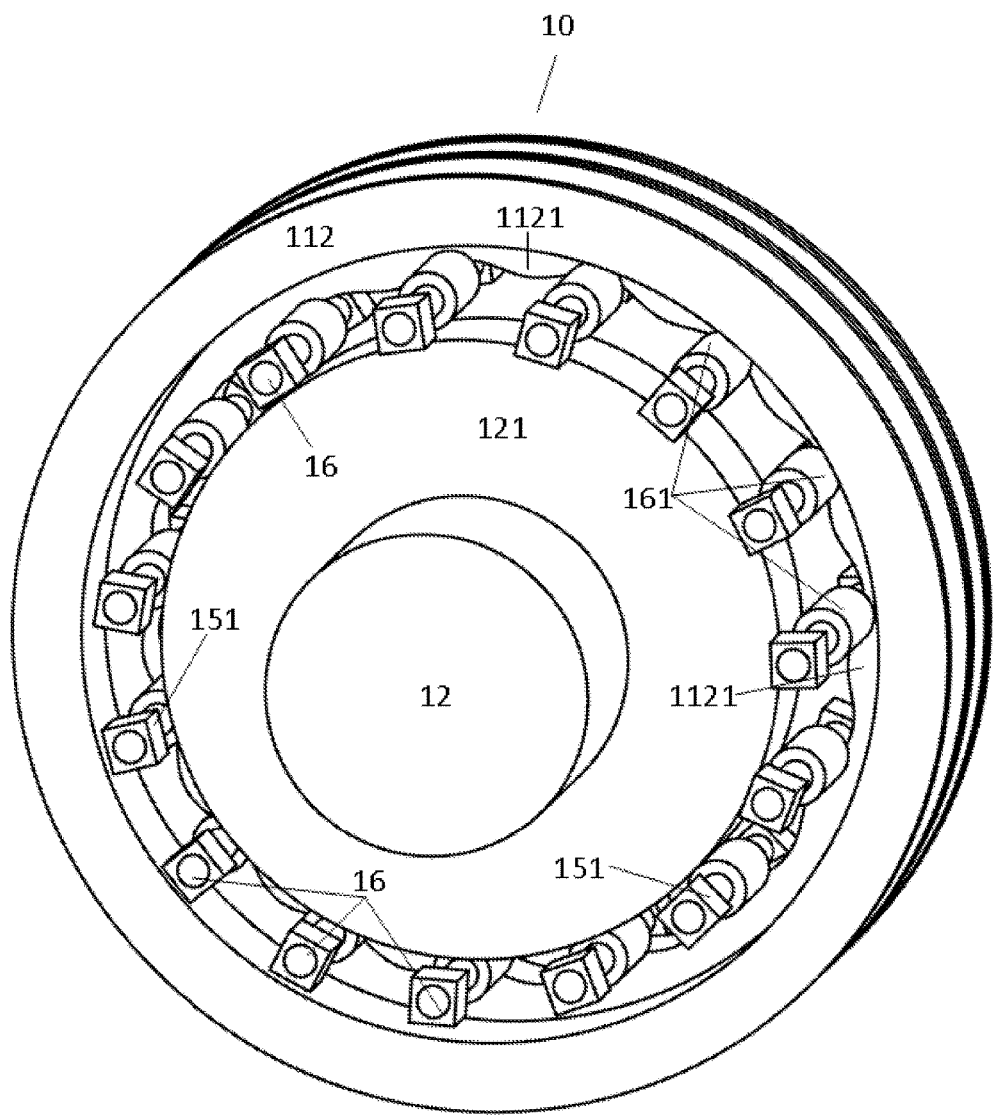
FIG. 6 is a perspective/frontal view of the gear according to the present invention with a section of the body and a section of a roller's yoke removed.
Figure 7:
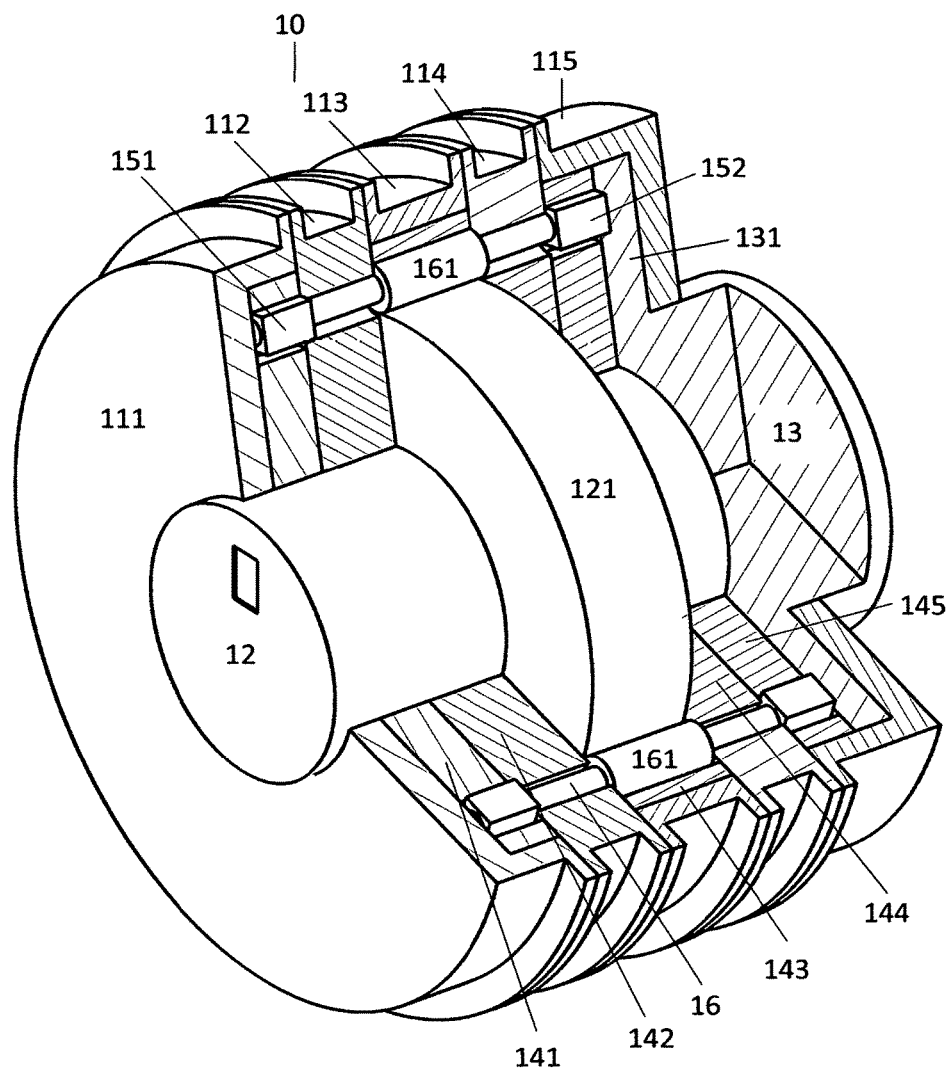
FIG. 7 is another cut-away view of the gear according to the present invention showing the arrangement of its internal parts.
Figure 8:
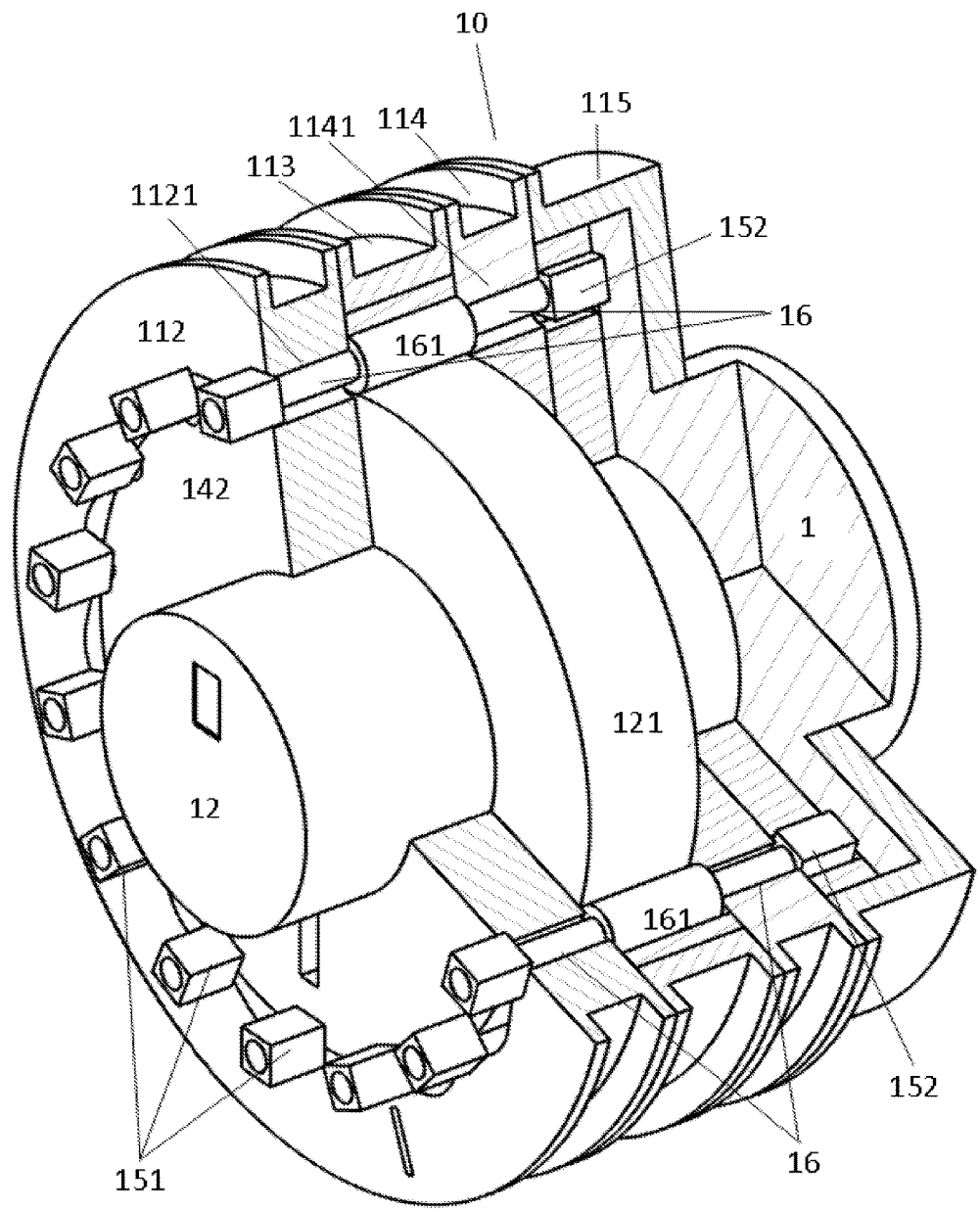
FIG. 8 is another cut away view of the gear according to the present invention with a section of the body and a section of the roller's yoke removed.
Figure 9:
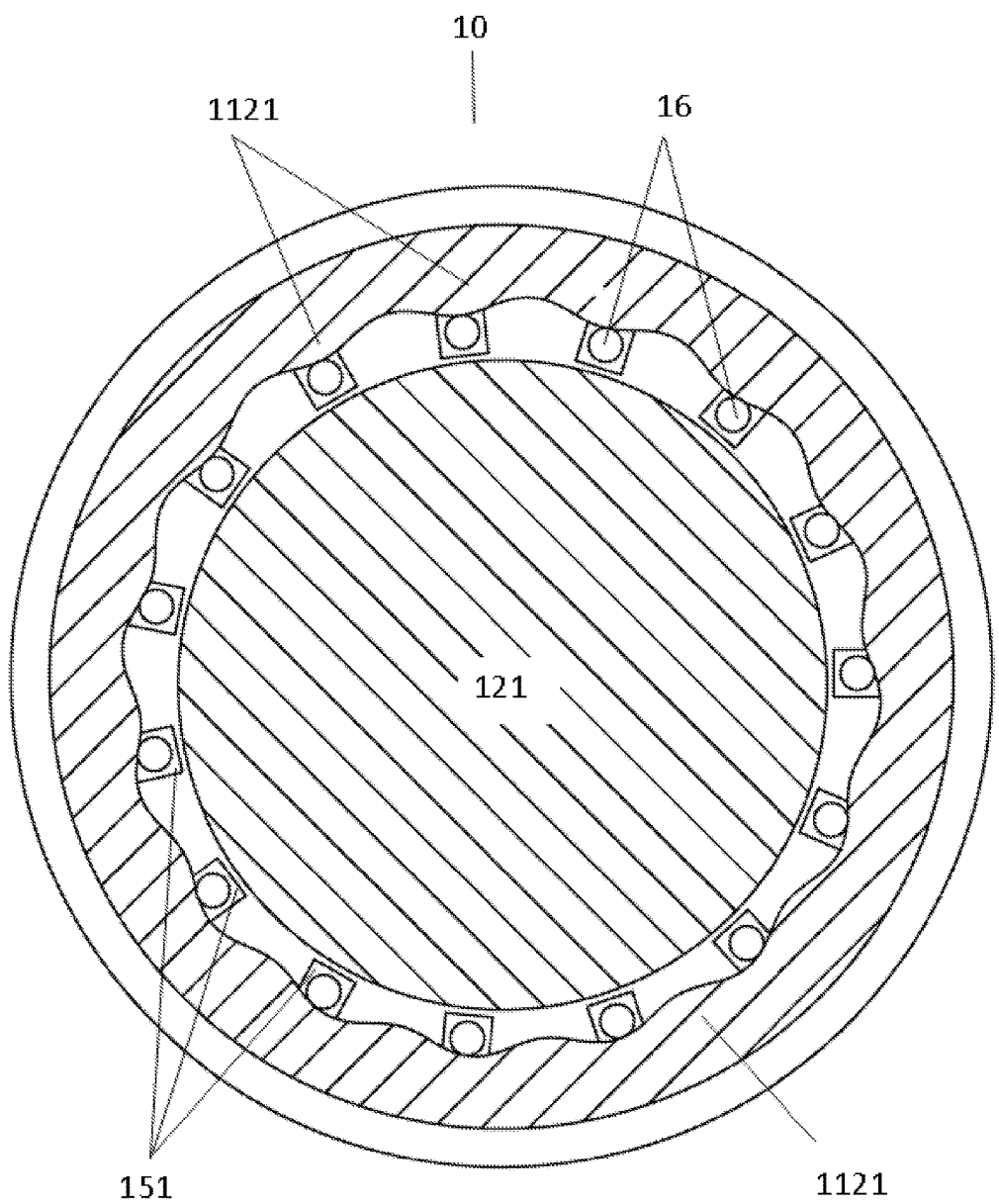
FIG. 9 is a transverse section of the gear according to the present invention showing an assembly of the rollers and a cam.
Figure 10:
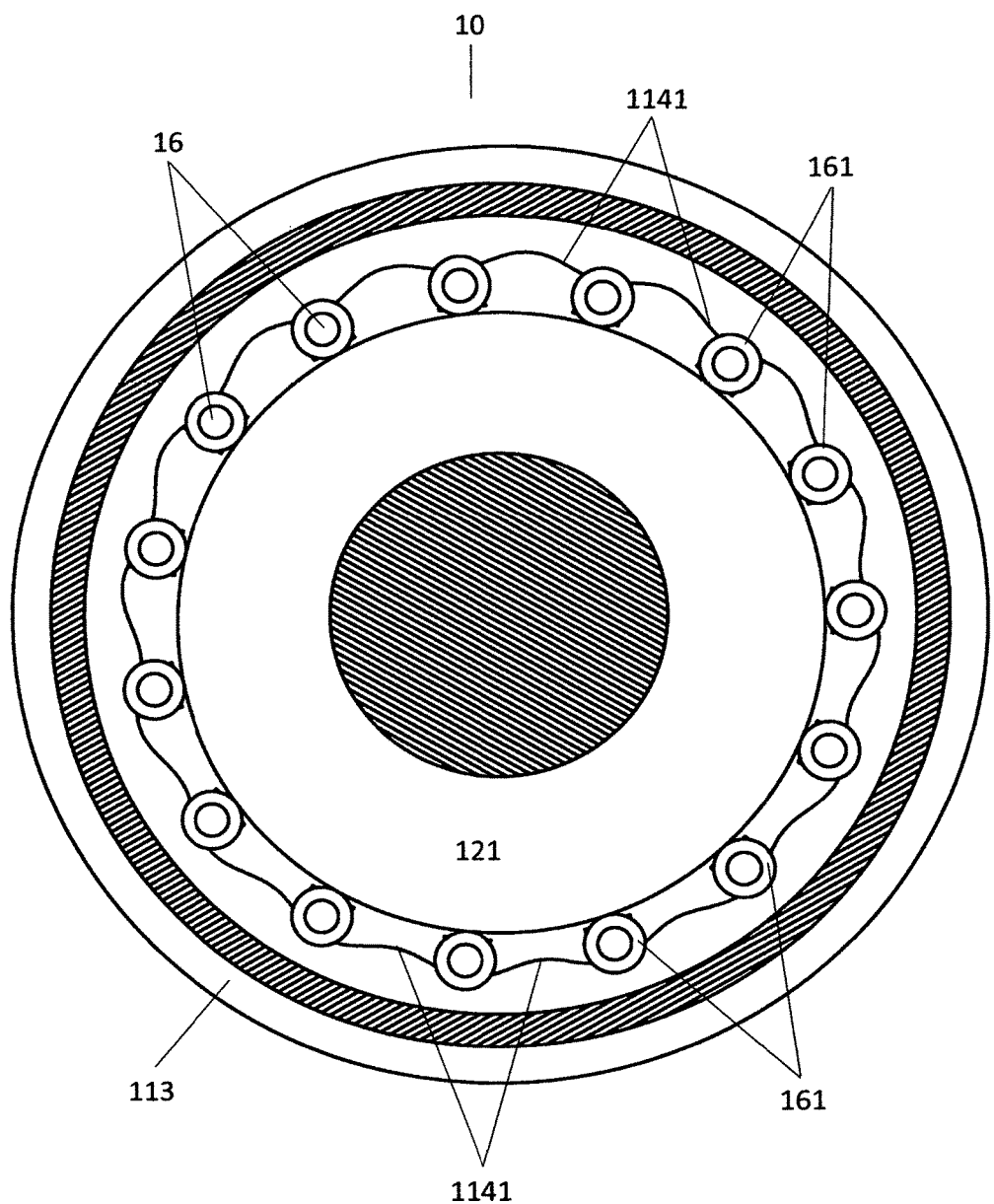
FIG. 10 is another transverse section of the gear according to the present invention showing an assembly of the rollers and an input shaft eccentric.
Figure 11:
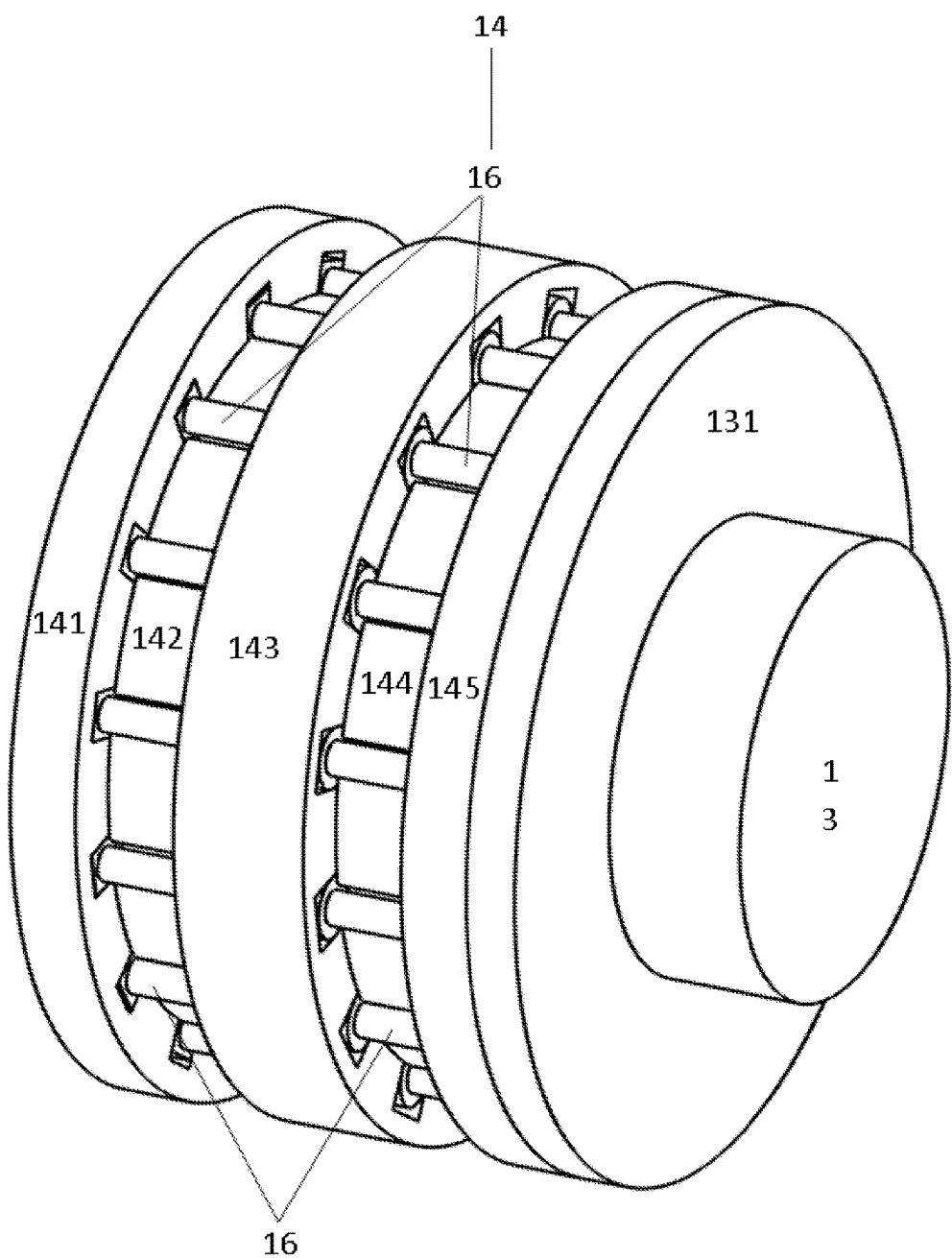
FIG. 11 is a general view of an assembly of the roller's yoke and an output shaft.
Figure 12:
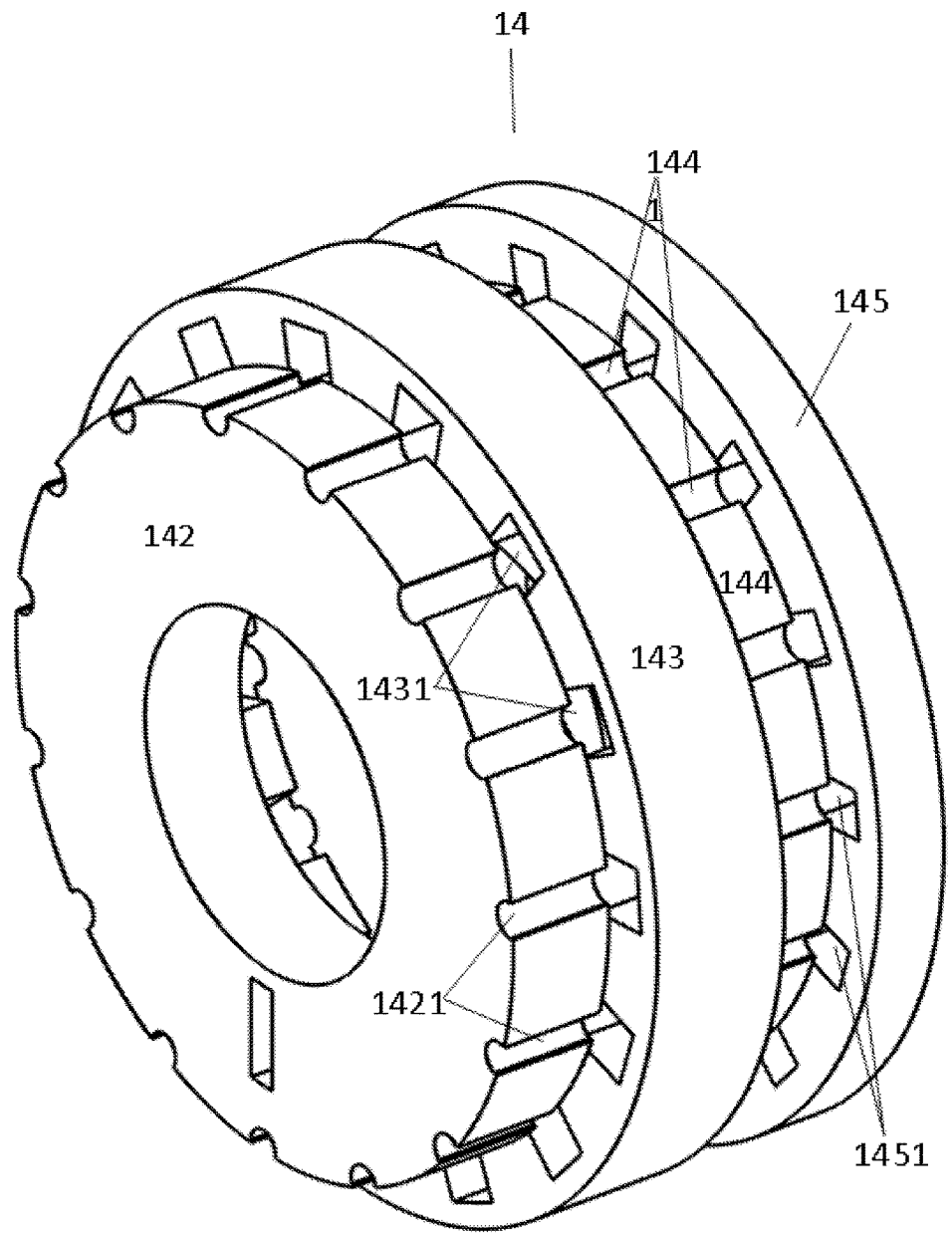
FIG. 12 is a general perspective view of the roller's yoke with the rollers removed.
Figure 13:
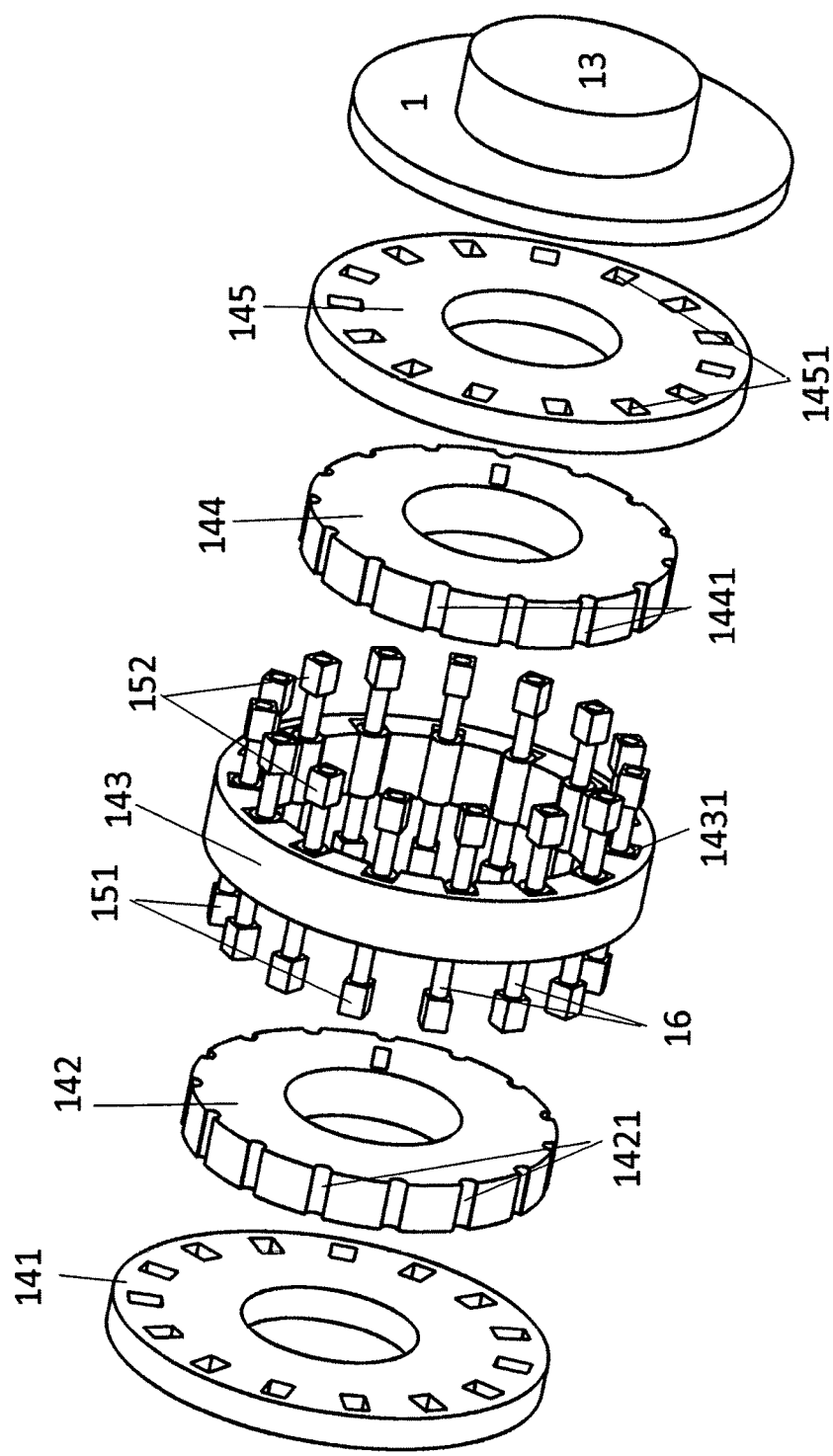
FIG. 13 is an exploded view of the assembly of the yoke and the output shaft.
Figure 14:
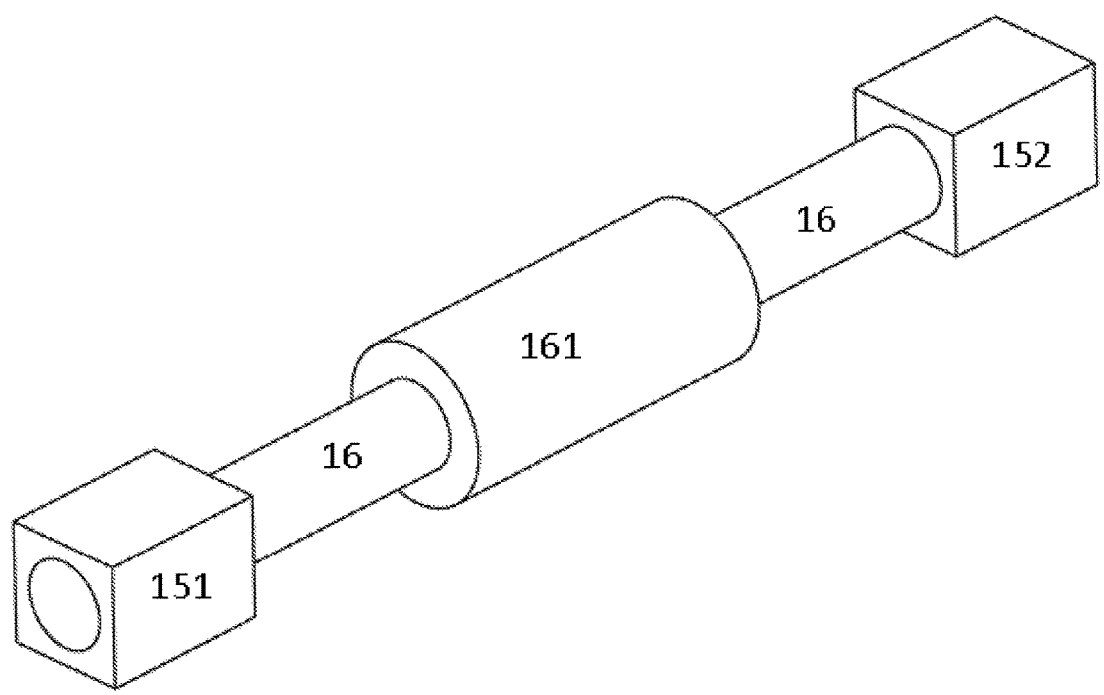
FIG. 14 is a general perspective view of an assembly of the rollers and associated sliders.
Figure 15:
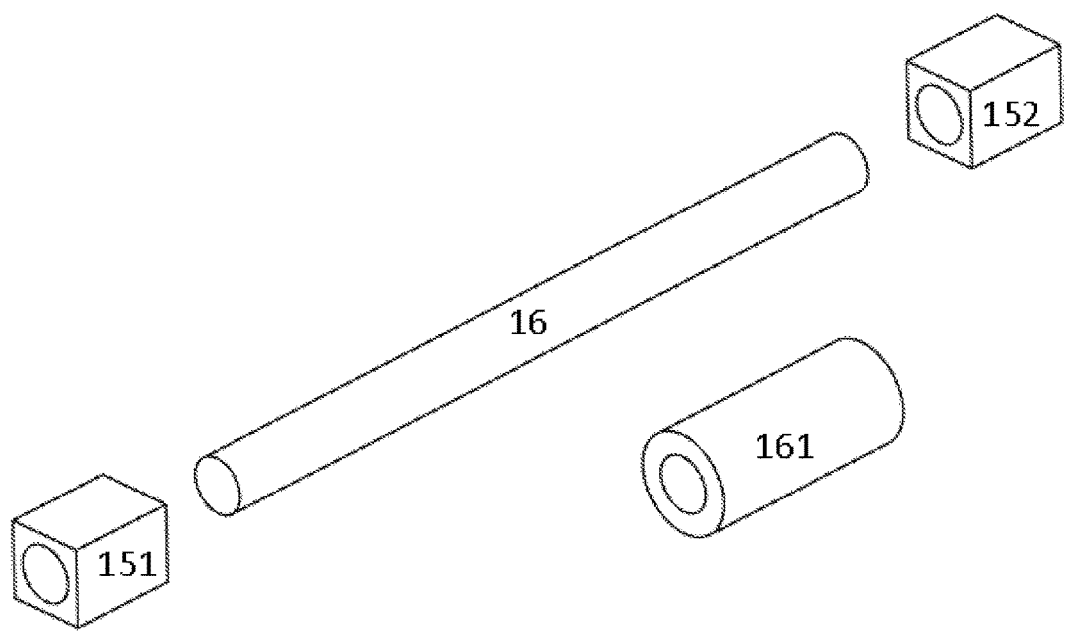
FIG. 15 is is an exploded view of the assembly of the rollers and associated sliders.

A gear 10 according to the present invention, being the first preferred embodiment of the invention (see FIGS. 1-17, and particularly FIGS. 1-15), has a body 11, an input shaft 12, an output shaft 13, and a roller's yoke 14 (FIGS. 1, 2). Body 11 is composed of five parts 111, 112, 113, 114, and 115 joined by screws (not shown) or in any other suitable manner (FIGS. 1, 2, 3, 4, 7, 8). Input shaft 12 is supported pivotally in body part 111; output shaft 13 is supported pivotally in body part 115, coaxially with the input shaft 12 (FIGS. 2, 7, 8). Output shaft 13 has a disc 131 fastened thereon (FIGS. 2, 7, 11). Roller's yoke 14 is fastened with the help of screws (not shown), or in any other suitable manner, to the disc 113. Roller's yoke 14 is composed of two principal elements 141, and 145, and three intermediate elements 142, 143, 144, connected together by screws (not shown), or in any other suitable manner (FIGS. 7, 8, and particularly FIGS. 11, 12, 13). Arranged at equal angular distances there is a plurality (in this case 15) of roller assemblies (FIGS. 7, 8, 13) mounted movably in yoke 14, each roller assembly being composed of a primary roller 16, a secondary roller 161, and two sliders 151 and 152 (FIGS. 14, 15). Primary rollers 16 are supported at their both ends in sliders 151, 152 in any suitable manner, e.g. using needle bearings (not shown); similarly, secondary rollers 161 are mounted rotatably on their respective primary rollers 16 in any suitable manner, e.g. with the help of needle bearings (not shown). Sliders 151 are mounted movably in their respective sockets 1411 placed at equal angular distances in principal yoke part 141 of yoke 14; analogously, sliders 152 are mounted movably in their respective sockets 1451 placed at equal angular distances in principal yoke part 145 of yoke 14 (FIGS. 3, 4, 5, 7, 8,13). The purpose of recesses 1421 placed in intermediate part 142 of yoke 14 is to accommodate primary rollers 16; analogously, the purpose of recesses 1441 placed in intermediate part 144 of yoke 14 is to accommodate primary rollers 16; the purpose of recesses 1431 placed in intermediate part 143 of yoke 14 is to accommodate secondary rollers 161. The purpose of three intermediate yoke parts 142, 143, and 144 is to connect two principal yoke parts 141 and 145. Placed on input shaft 12 there is a cam 121 (in the case of the first preferred embodiment of the invention, by way of an example but not in a restricted sense, cam 121 is a circular eccentric, i.e. its profile is a circle placed eccentrically relative the axis of rotation of input shaft 12, but it may be any suitable cam, the profile of which is given in a cylindrical coordinate system $(r,\varphi,z)$, $r \in <0,\infty>$, $\varphi \in <0,2\pi)$, $z \in <-\infty,\infty>$, by a differentiable function $r=f(\varphi,z)$) (FIGS. 2, 7, 8, 10). Placed in part 112 of body 11 there is a cam 1121, the profile of which is given in a cylindrical coordinate system $(r,\varphi,z)$, $r \in <0,\infty>$, $\varphi \in <0,2\pi)$, $z \in <-\infty,\infty>$, by a differentiable function $r=F(\varphi,z)$) (FIGS. 2, 6, 9); analogously, placed in part 114 of body 11 there is a cam 1141, the profile of which is given in a cylindrical coordinate system $(r,\varphi,z)$, $r \in <0,\infty>$, $\varphi \in <0,2\pi)$, $z \in <-\infty,\infty>$, by a differentiable function $r=G(\varphi,z)$) (FIGS. 2, 10). The cam profile $F(\varphi,z)$ of cam 1121 and the cam profile $G(\varphi,z)$ of cam 1141 are determined by the cam profile $f(\varphi,z)$ of cam 121, required transmission ratio k, and method of mounting of rollers assemblies in yoke 14 (in this example with the help of sliders), so as during operation all primary rollers 16 are kept in constant contact with cams 1121 and 1141 placed in parts 112 and 114 of body 11 (FIGS. 6, 7, 8, 9), and secondary rollers 161 remain in constant contact with cam 121 on input shaft (FIGS. 6, 7, 8, 10); equations binding together the profiles $F(\varphi,z)$, $G(\varphi,z)$ and $f(\varphi,z)$ are presented below. In the case of the first preferred embodiment of the invention, cam 121 is a circular eccentric, and each of cams 1121 and 1141 has a number (in this example 16) of suitably shaped lobes and the same number of suitably shaped valleys; thus in this example the number of roller assemblies 16-161 is by one smaller than the number of lobes of cams 1121 and 1141.

Here is a description of functioning of the gear according to the present invention.

Input shaft 12 is driven by any suitable source of rotary power (internal combustion engine, electric motor, hydraulic motor, or any other suitable means), and cam 121 (in this instance eccentric) presses on secondary rollers 161. Secondary rollers 161 press on primary rollers 16, which in turn press on cams 1121 and 1141 placed in parts 112 and 114 of the gear body 11, and generate a force F acting upon cams 1121 and 1141. By the third Newton law of dynamics, cams 1121 and 1141 exert the force –F acting upon primary rollers 16. The tangential component of the force –F is transferred via sliders 151 and 152 to yoke 14 and, via disc 131, to output shaft 13 forcing it to rotate, in this case with the rotational velocity equal to –1/n, the rotational speed of the input shaft 12, where n is the number of roller assemblies (–1/n=–1/15 in this example; in particular, output shaft 13 rotates in the opposite direction than input shaft 12).

By stopping output shaft 13 and letting body 11 to rotate, a gear in accordance with the present invention with transmission ratio 1/16 is obtained (some changes, that would be obvious to those skilled in the art, of the structure of the gear are necessary to get a fully operational device).

Figure 16:
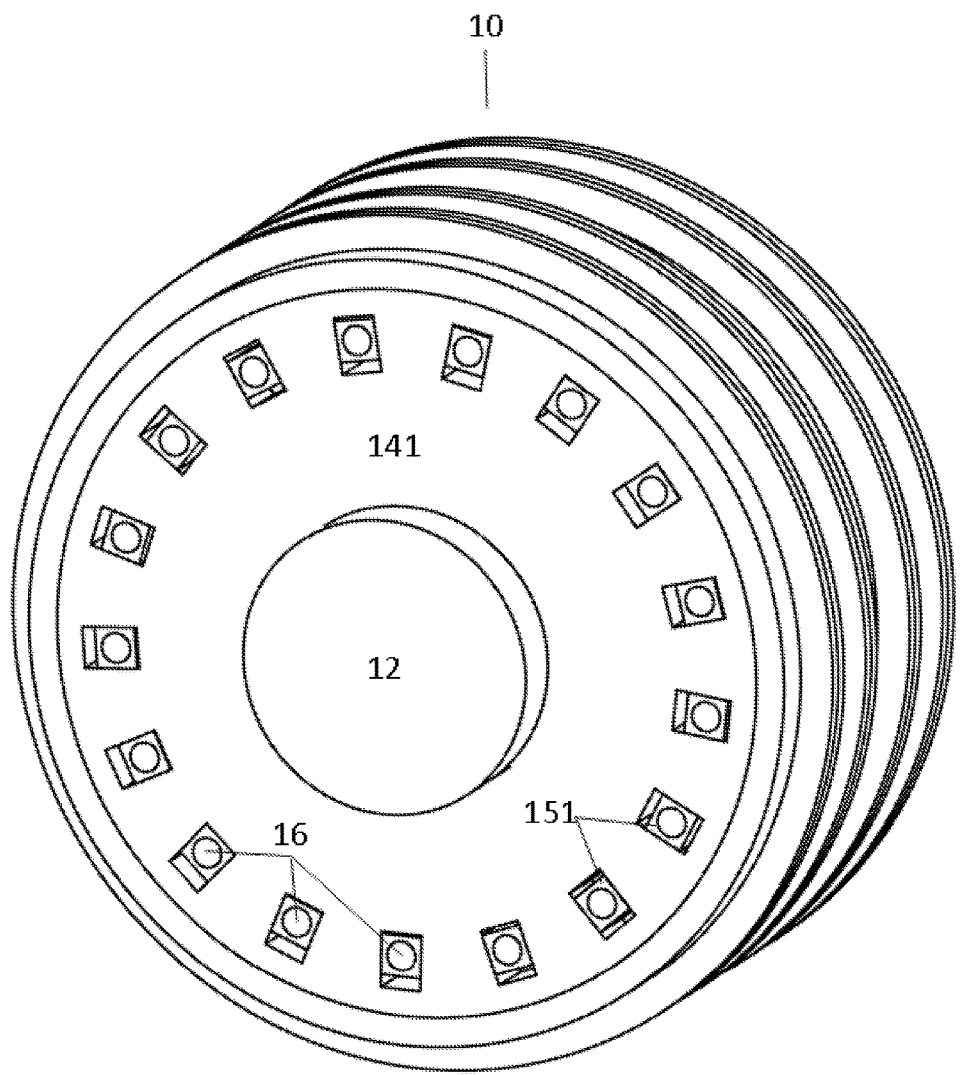
FIG. 16 is a frontal perspective view of another version of the gear according to the present invention with a section of the body removed and differently arranged rollers.
Figure 17:
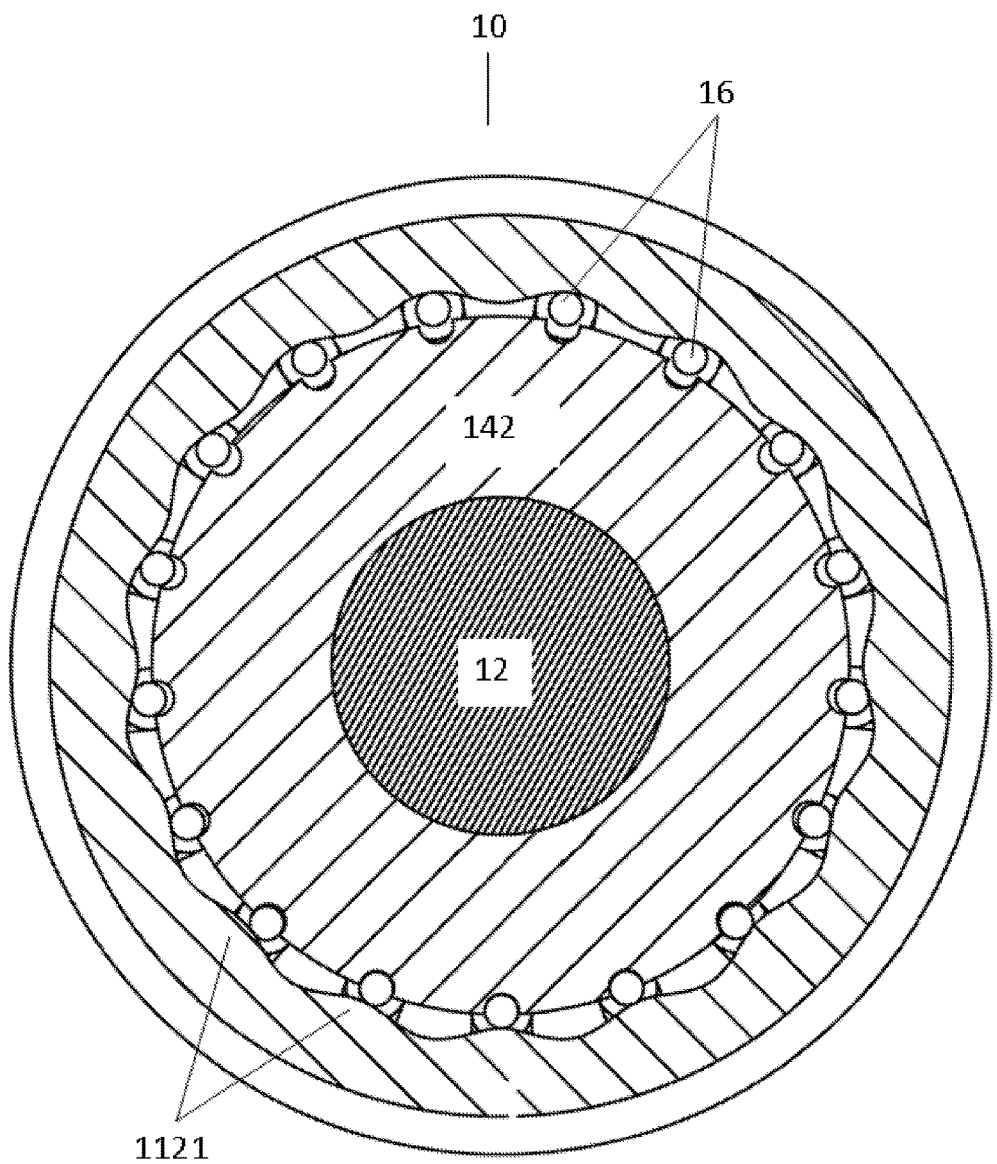
FIG. 17 shows the assembly of the rollers and the cam of the other version of the gear according to the present invention.
Figure 18:
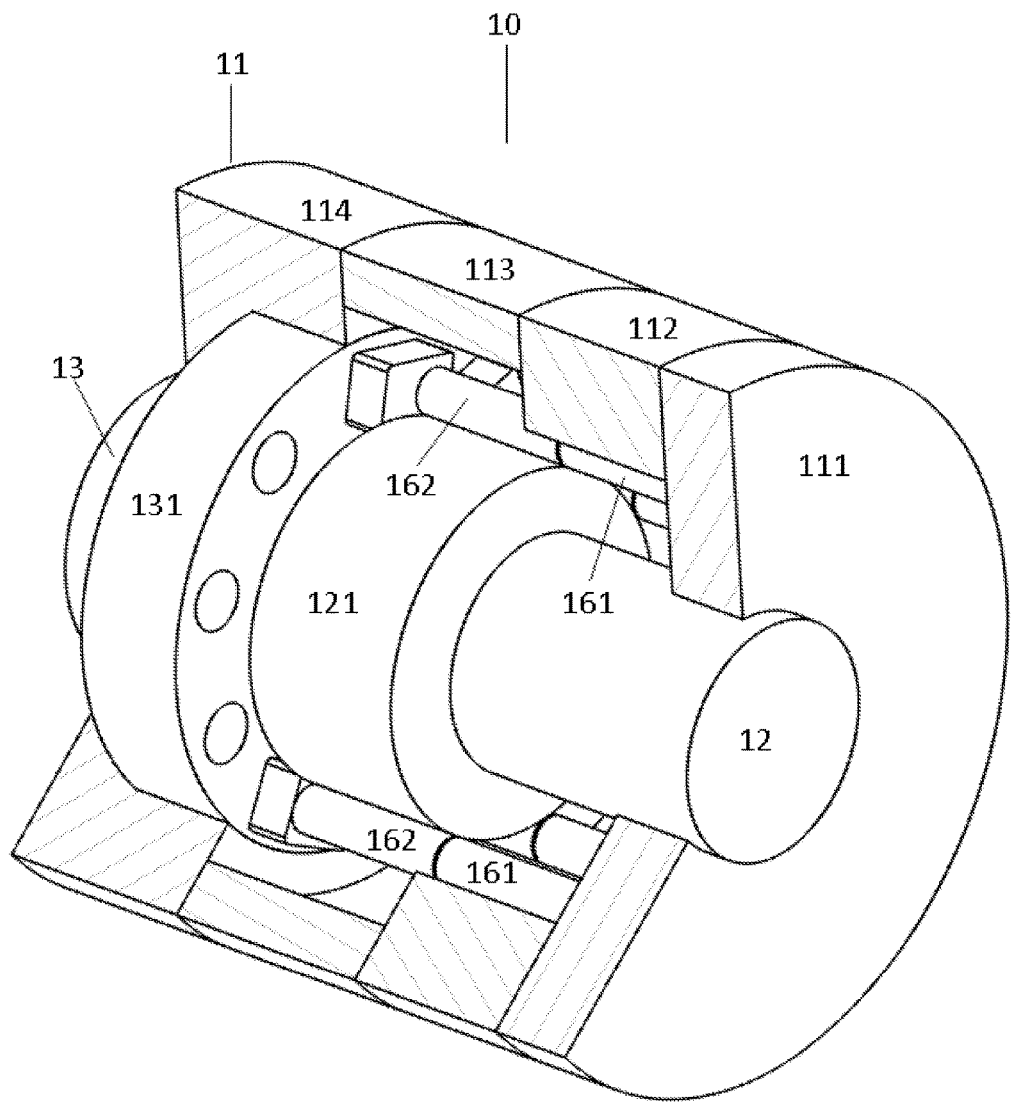
FIG. 18 is a perspective cut-away view of yet another version of the gear according to the instant invention showing its internal elements.
Figure 19:
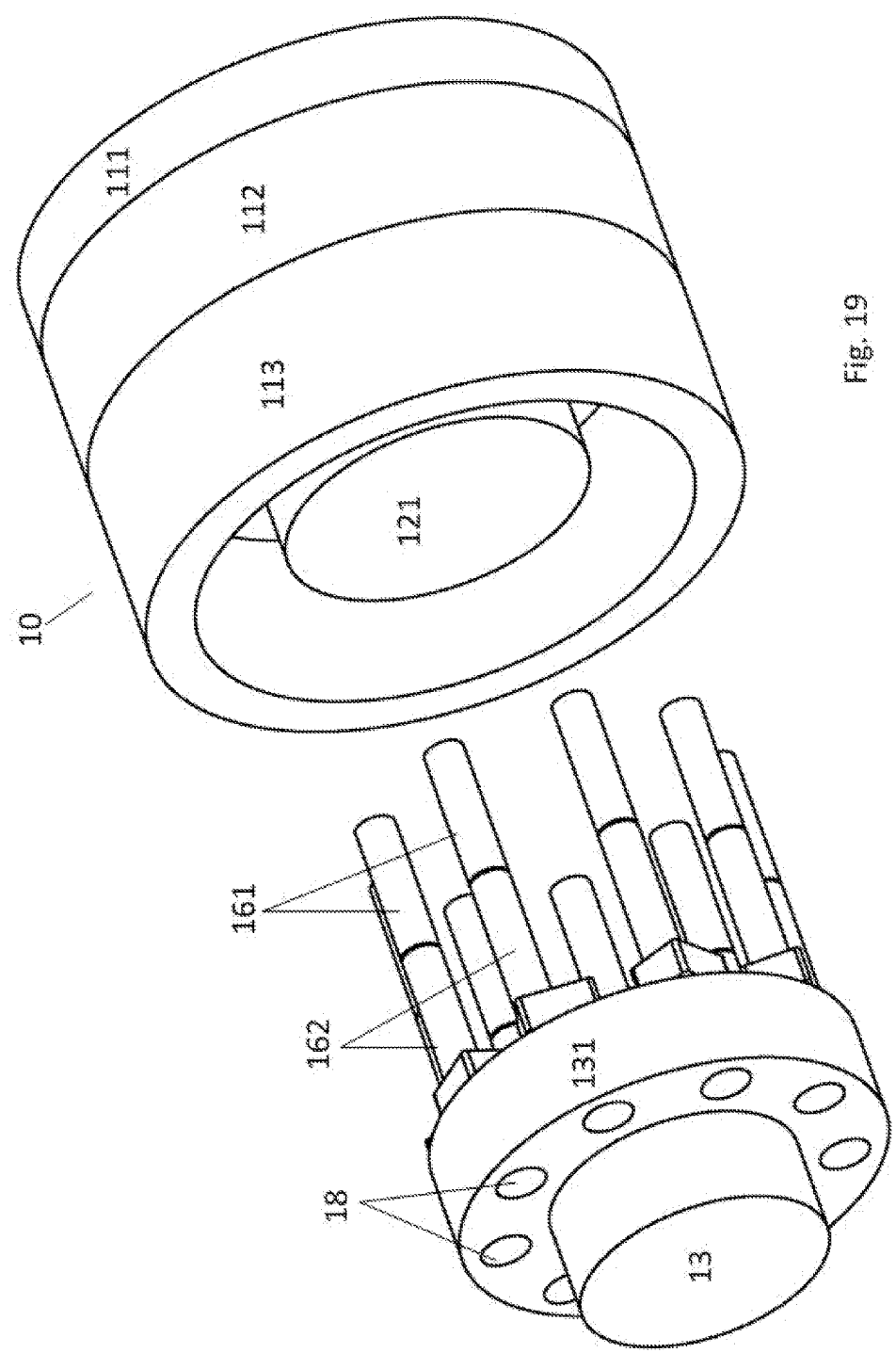
FIG. 19 is a perspective partially exploded view of said version of the gear according to the present invention with the assembly of rollers and the output shaft ejected from the body.
Figure 20:
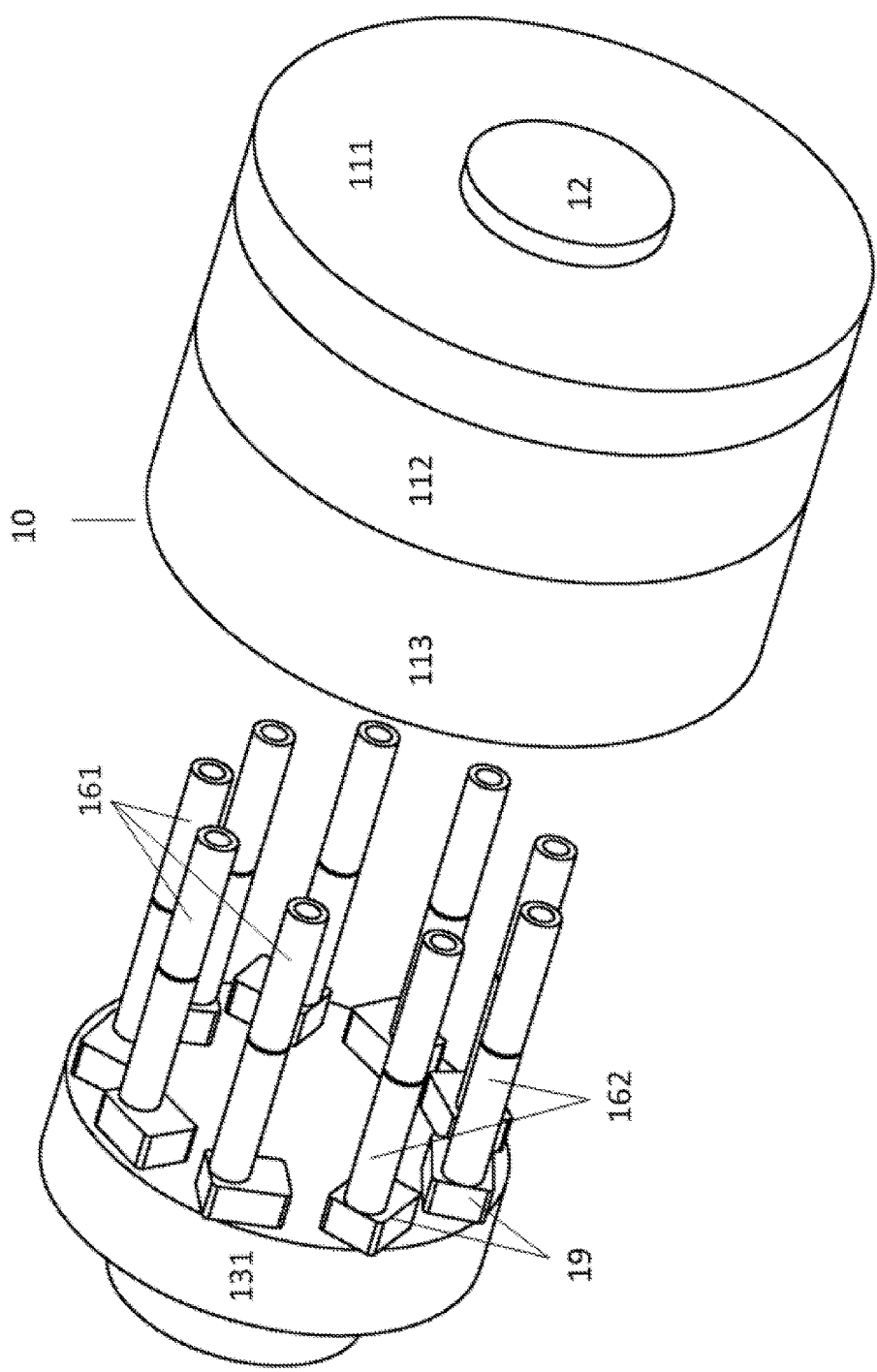
FIG. 20 is another perspective partially exploded view of said version of the gear according to the present invention with the assembly of rollers and the output shaft ejected from the body.
Figure 22:
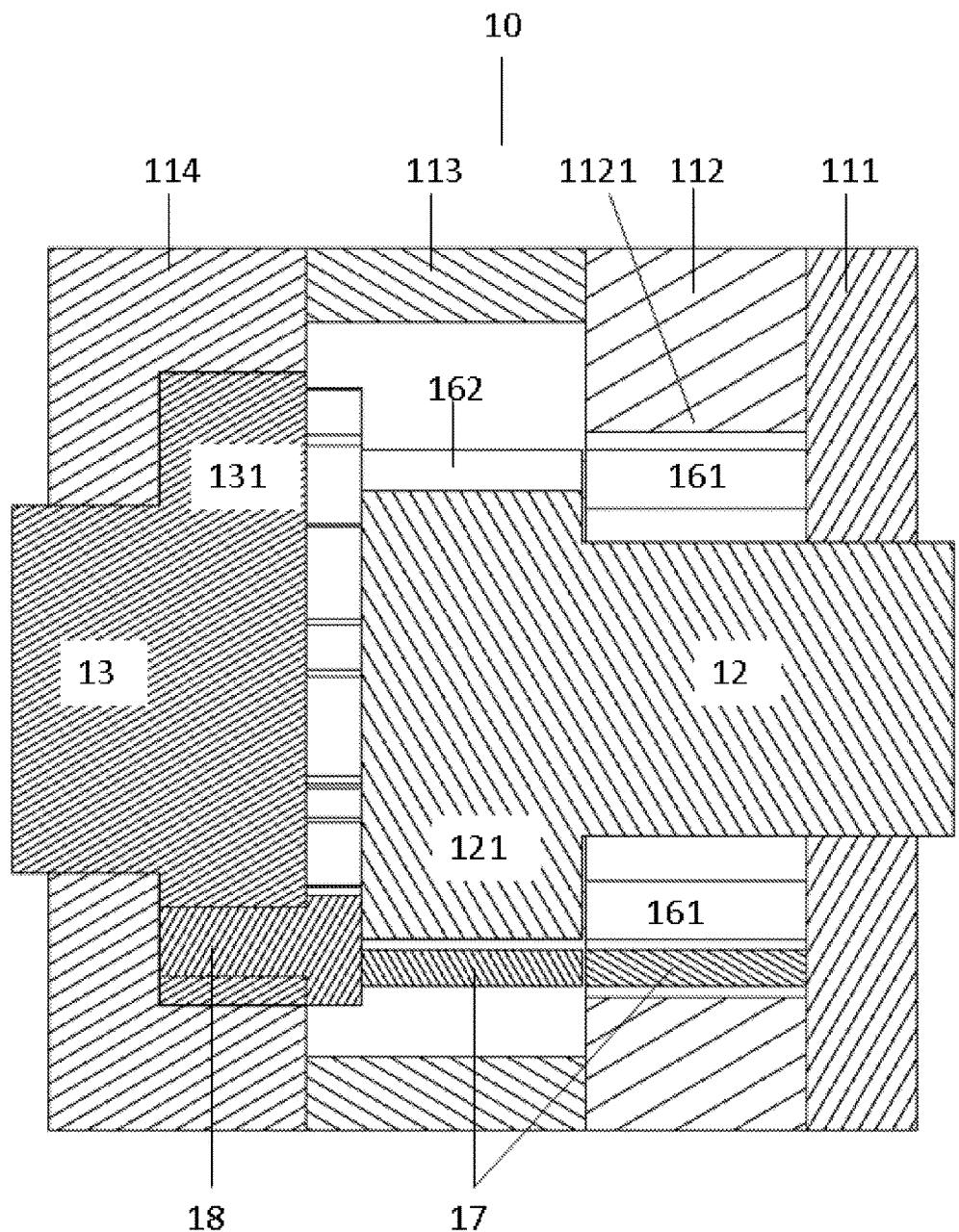
FIG. 22 is a longitudinal cross-section of said version of the gear according to the present invention.
Figure 23:
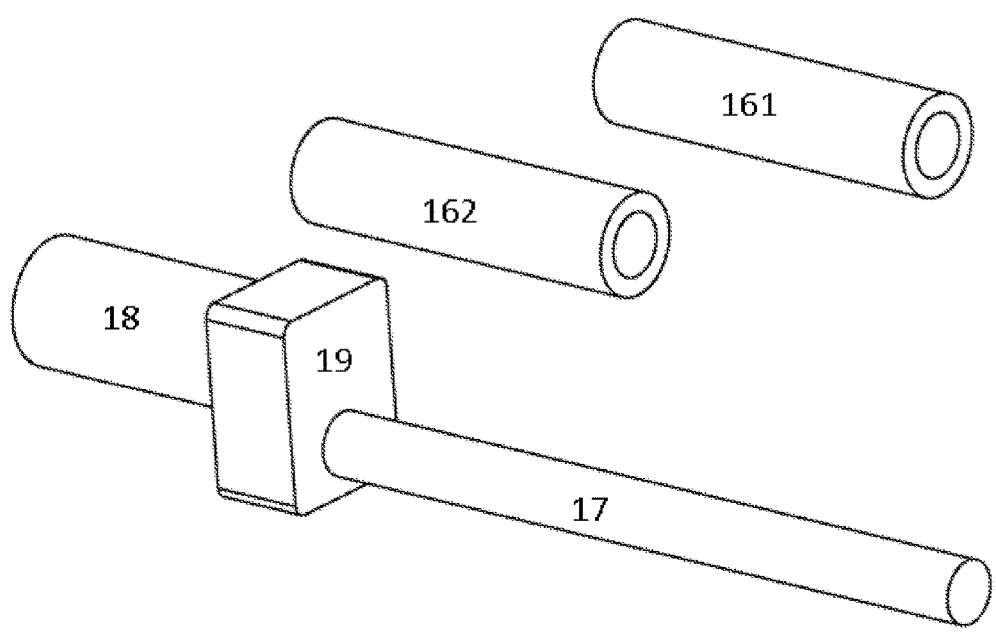
FIG. 23 is an exploded view of the roller assembly of said version of the gear according to the present invention.
Figure 24:
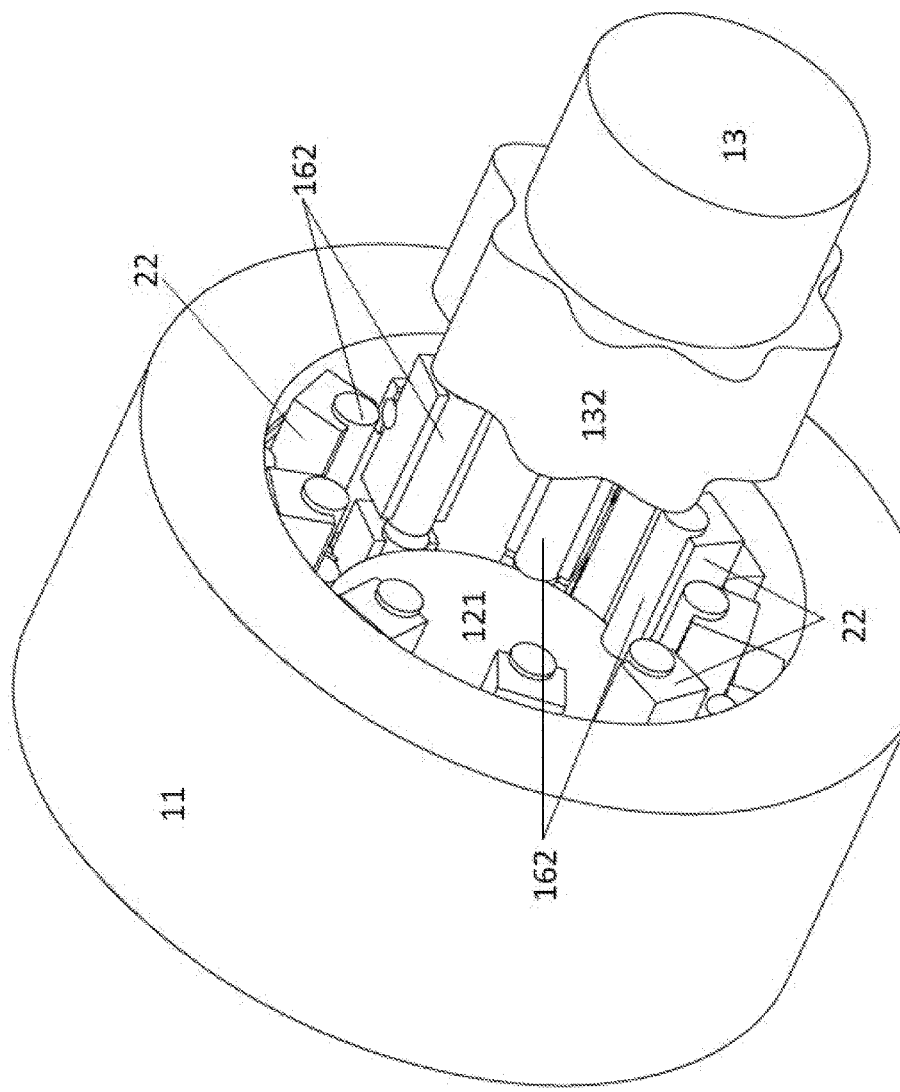
FIG. 24 is a perspective view of yet another version of the gear according to the present invention partially disassembled.
Figure 25:
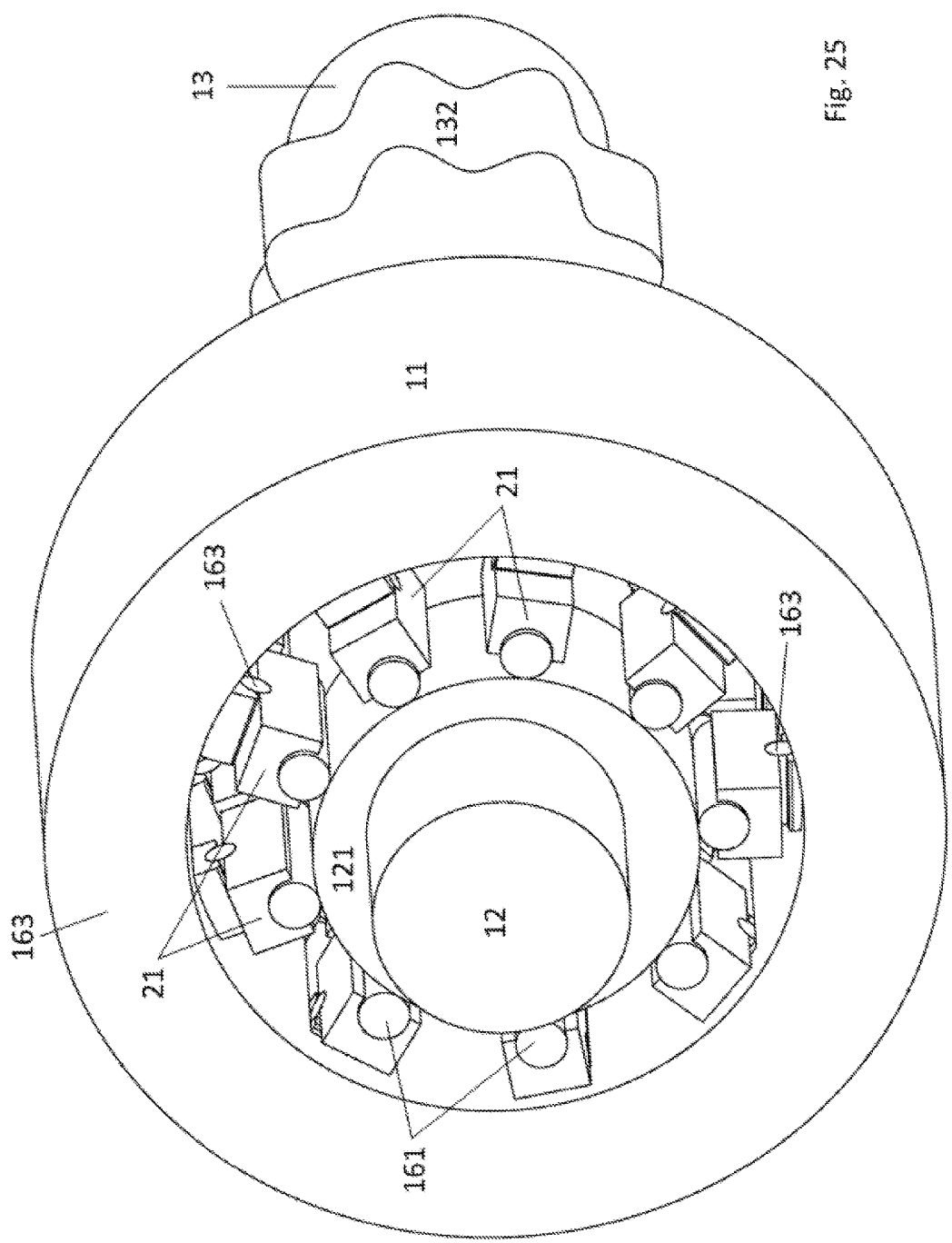
FIG. 25 is another perspective view of the version of the gear shown in FIG. 24 with one section of the body removed, and with the output shaft offset from the body.
Figure 26:
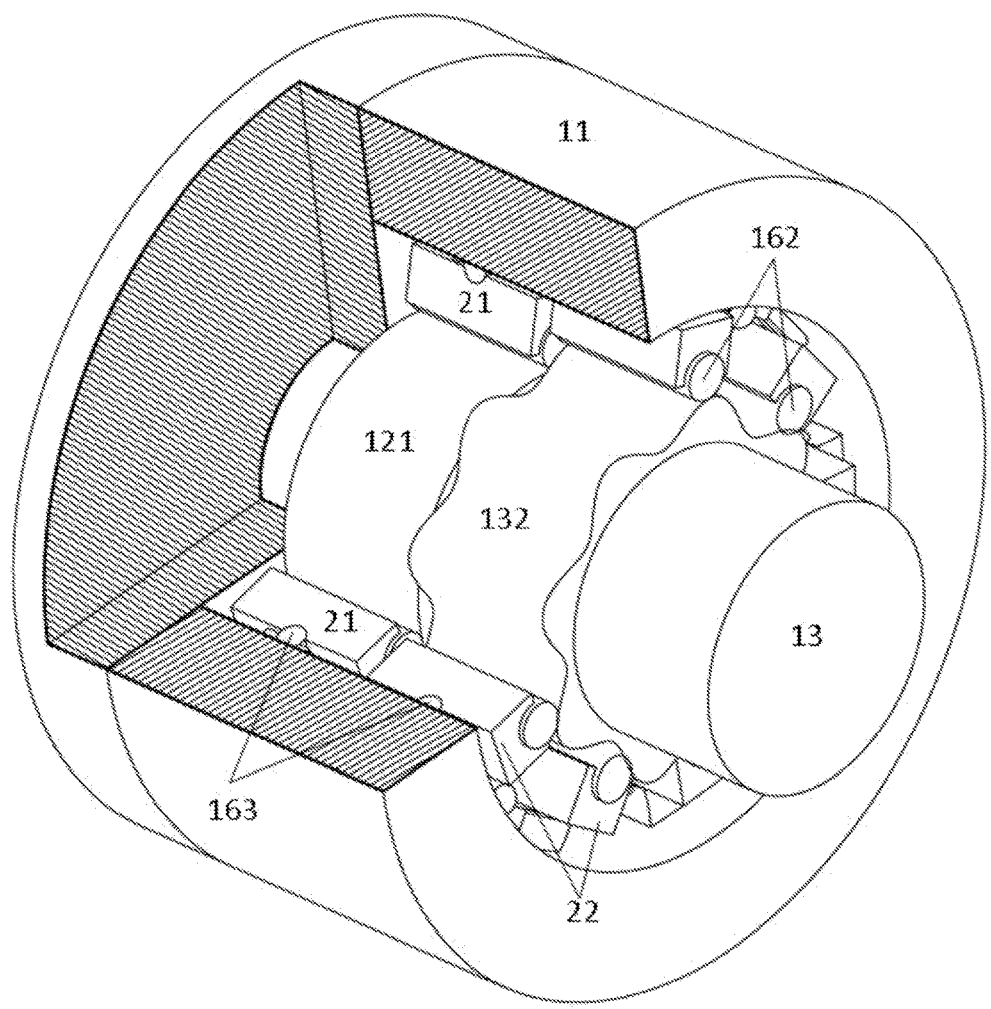
FIG. 26 is a perspective cut-away view of the version of the gear according to the present invention illustrated in FIGS. 24, 25.
Figure 27:
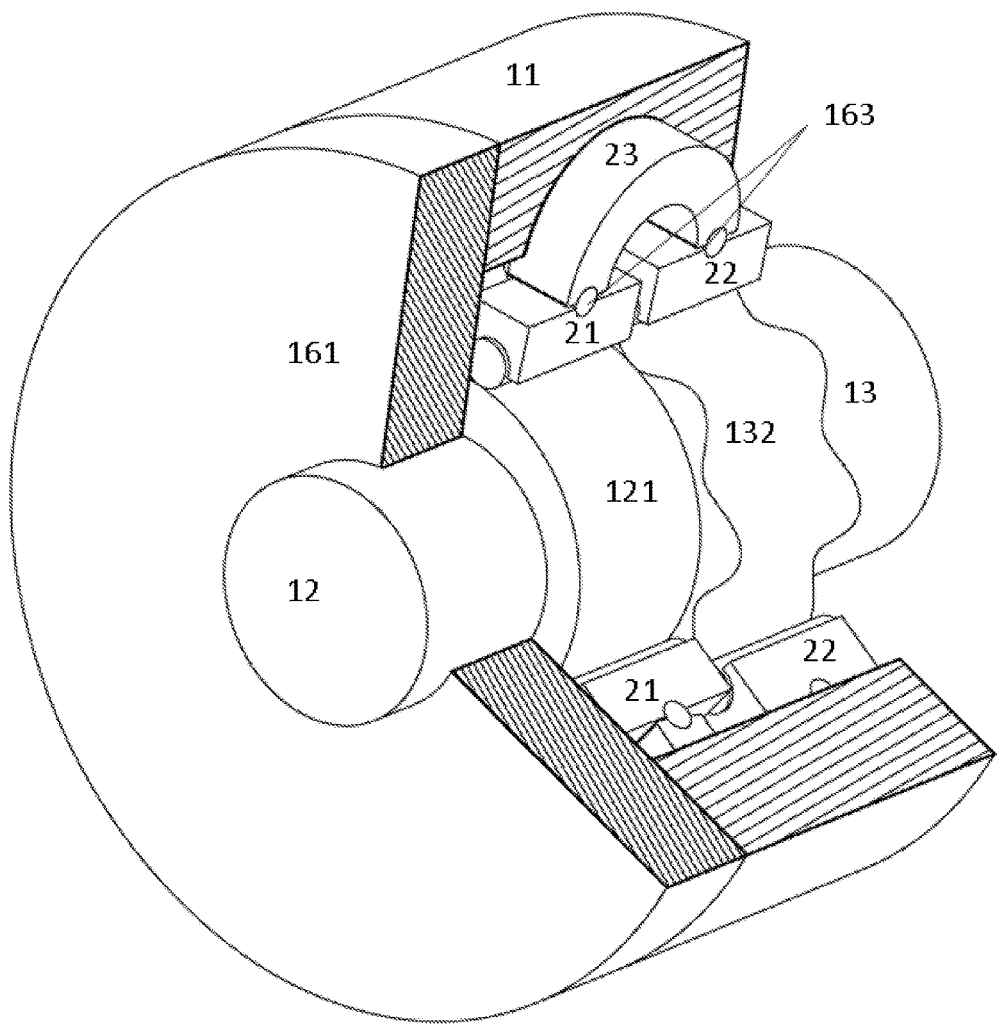
FIG. 27 is another perspective cut-away view of said version of the gear according to the present invention showing an assembly of input and output shafts, rollers and levers.
Figure 28:
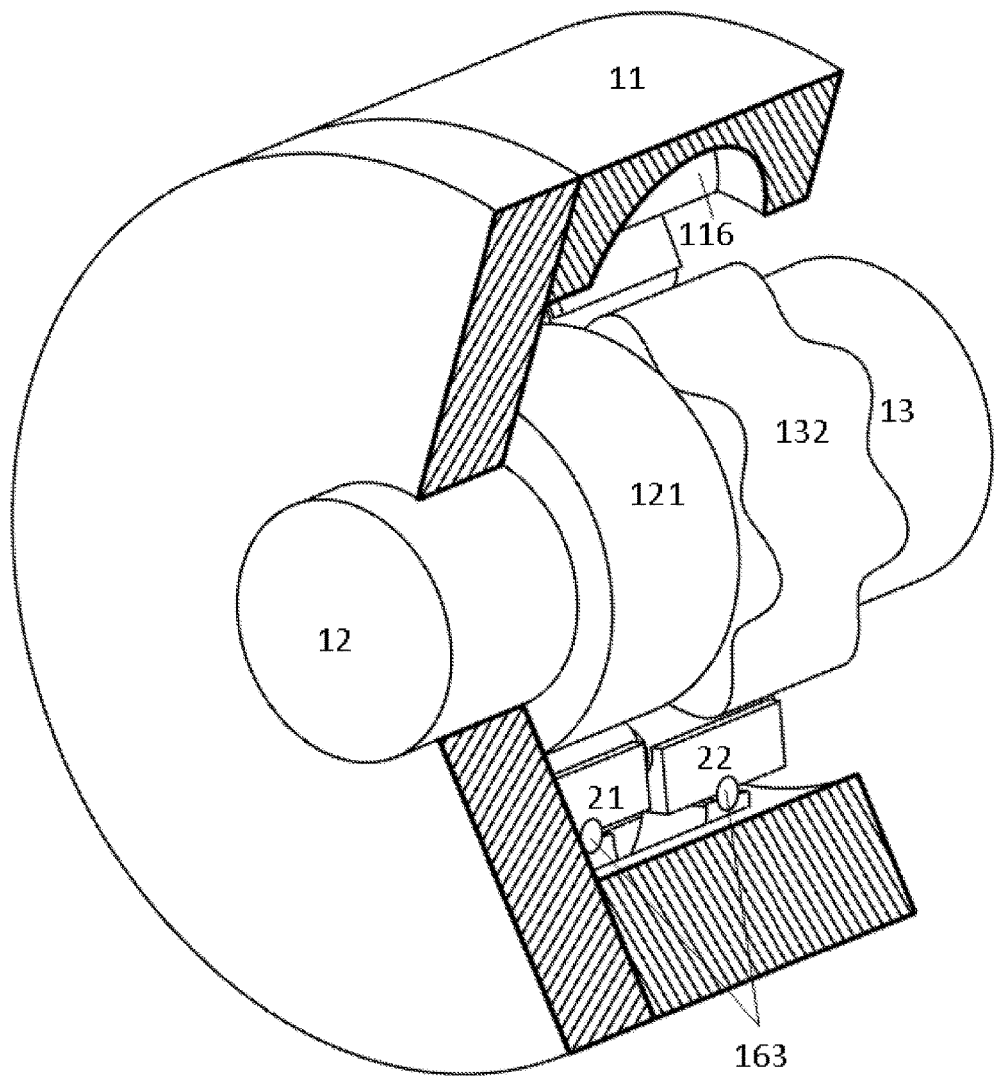
FIG. 28 is yet another perspective cut-away view of said version of the gear according to the present invention exhibiting the assembly of input and output shafts and rollers, with levers removed, and showing a lever's socked.
Figure 29:
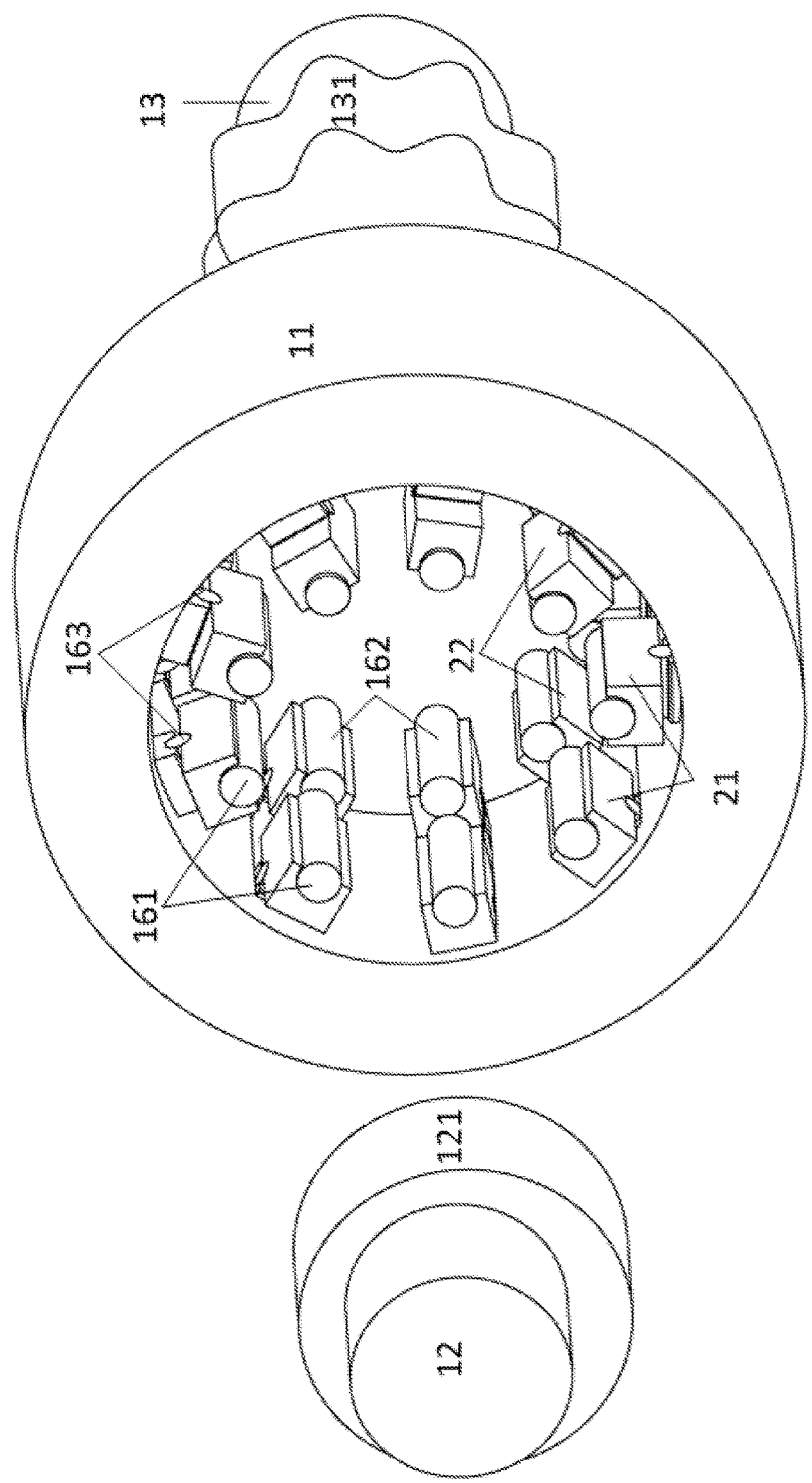
FIG. 29 is another perspective view of the last version of the gear according to the present invention with input and output shafts offset from the gear body.
Figure 30:
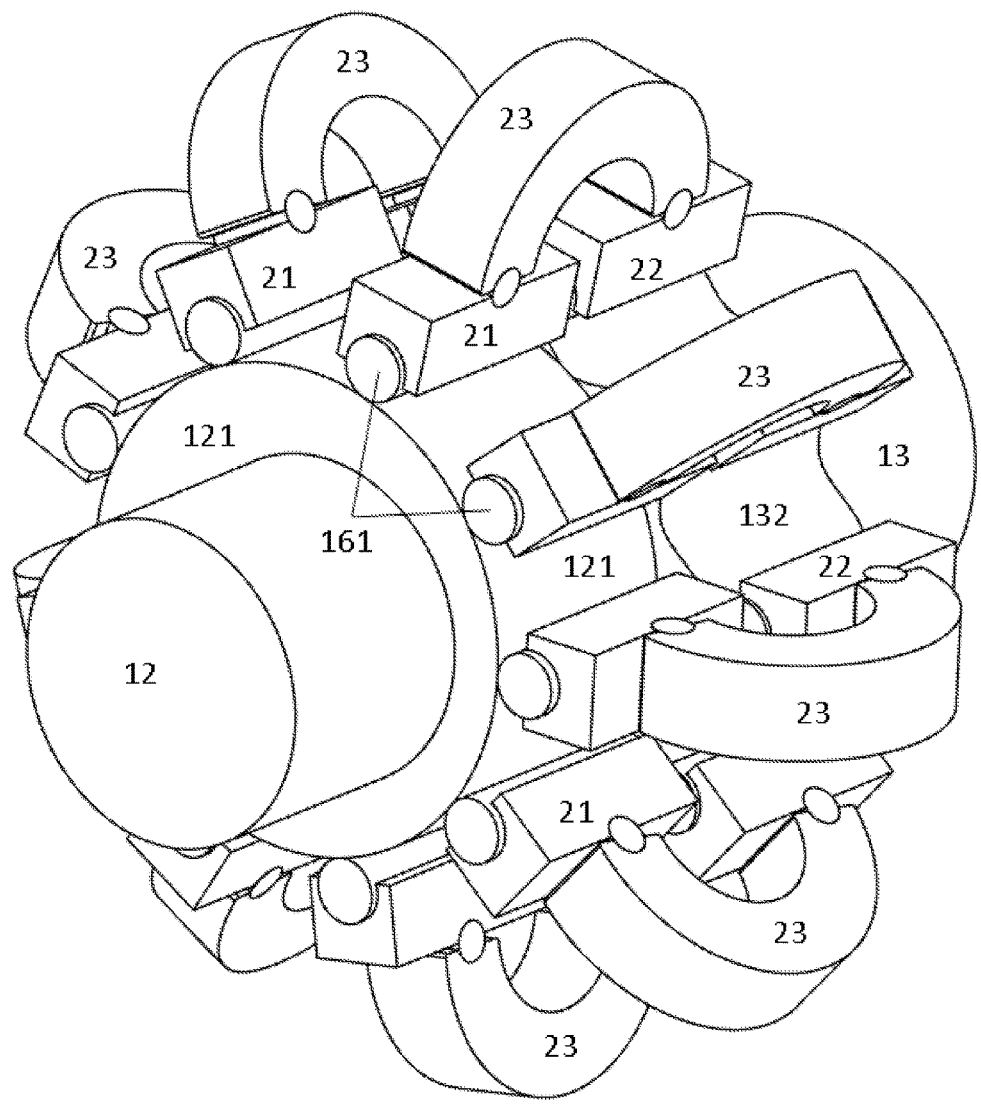
FIG. 30 is a general view of the assembly of input and output shafts, rollers and levers of the last version of the gear according to the instant invention.
Figure 31:
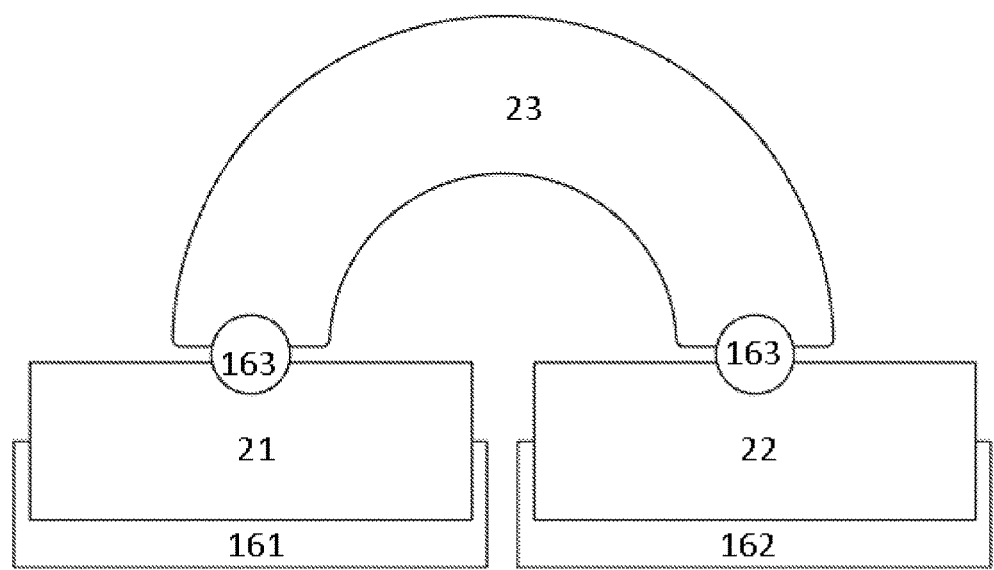
FIG. 31 is a side view of the assembly of two main rollers and the associated lever.
Figure 32:
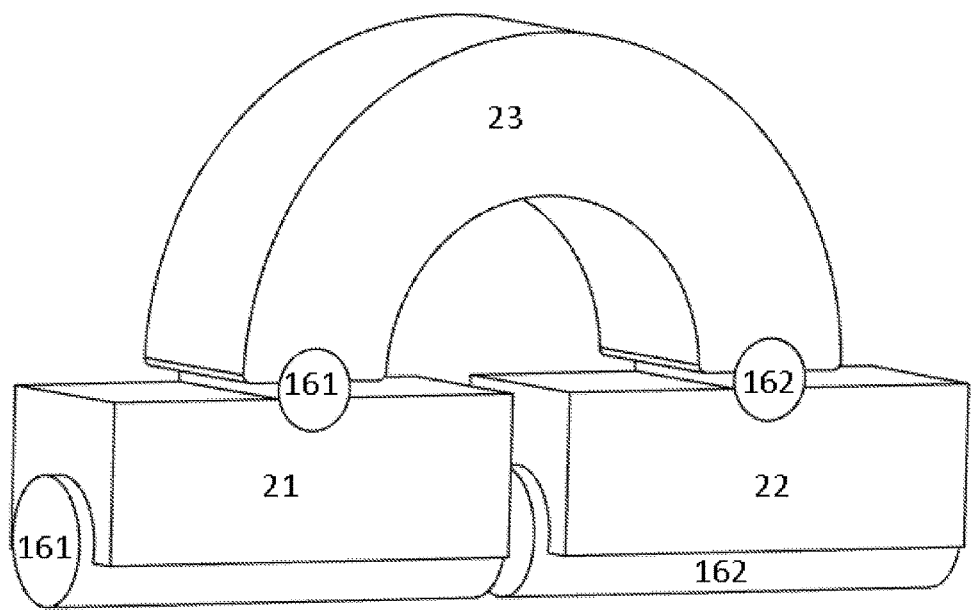
FIG. 32 is another view of the assembly of two main rollers and the associated lever shown in FIG. 31.
Figure 33:
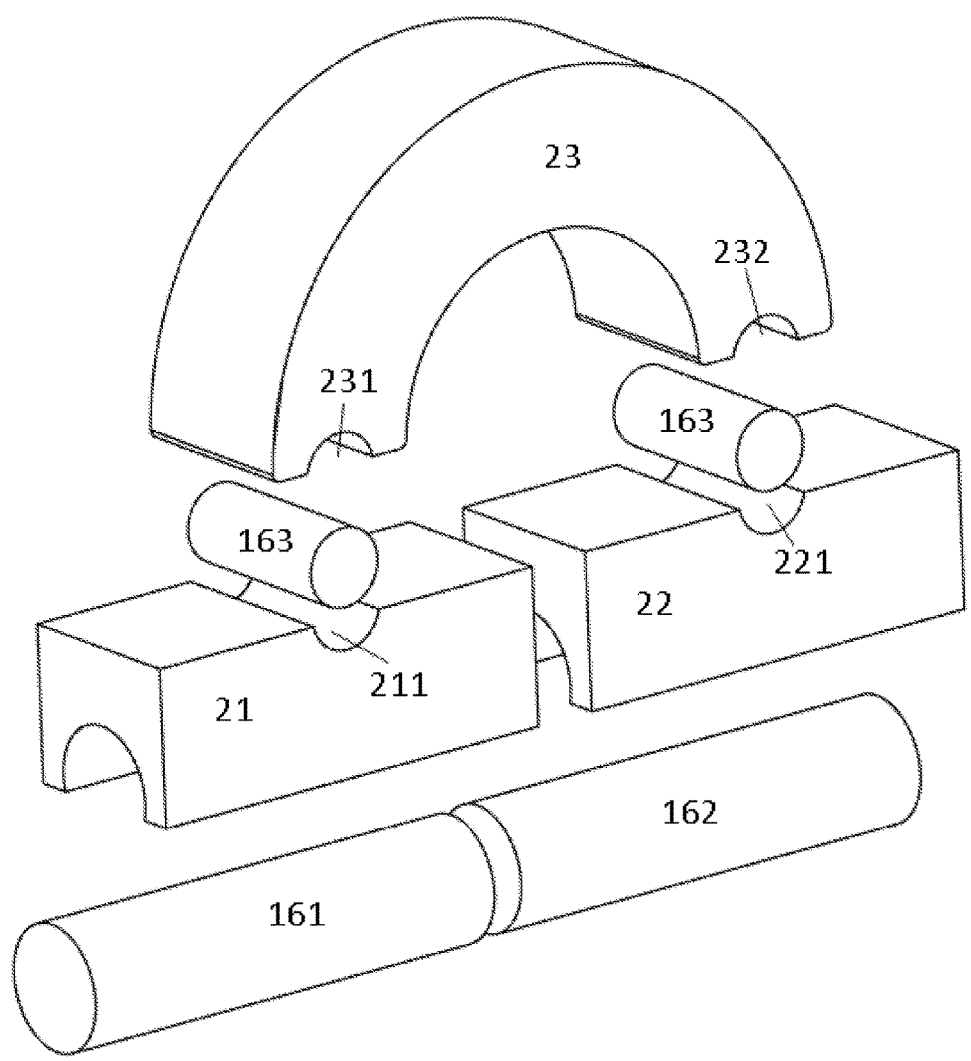
FIG. 33 is an exploded view of the assembly of two main rollers and the associated lever.
Figure 34:
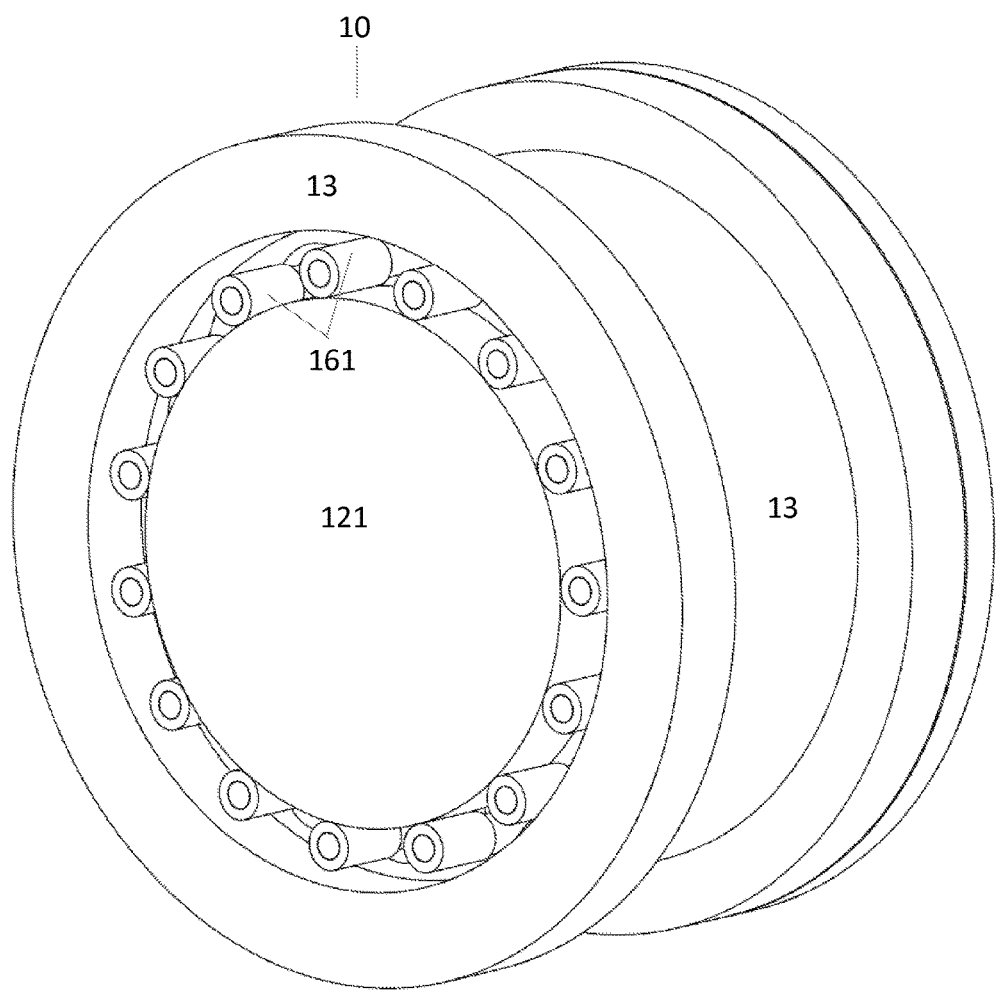
FIG. 34 is a general view of a gear being the fourth preferred embodiment of the present invention.
Figure 35:
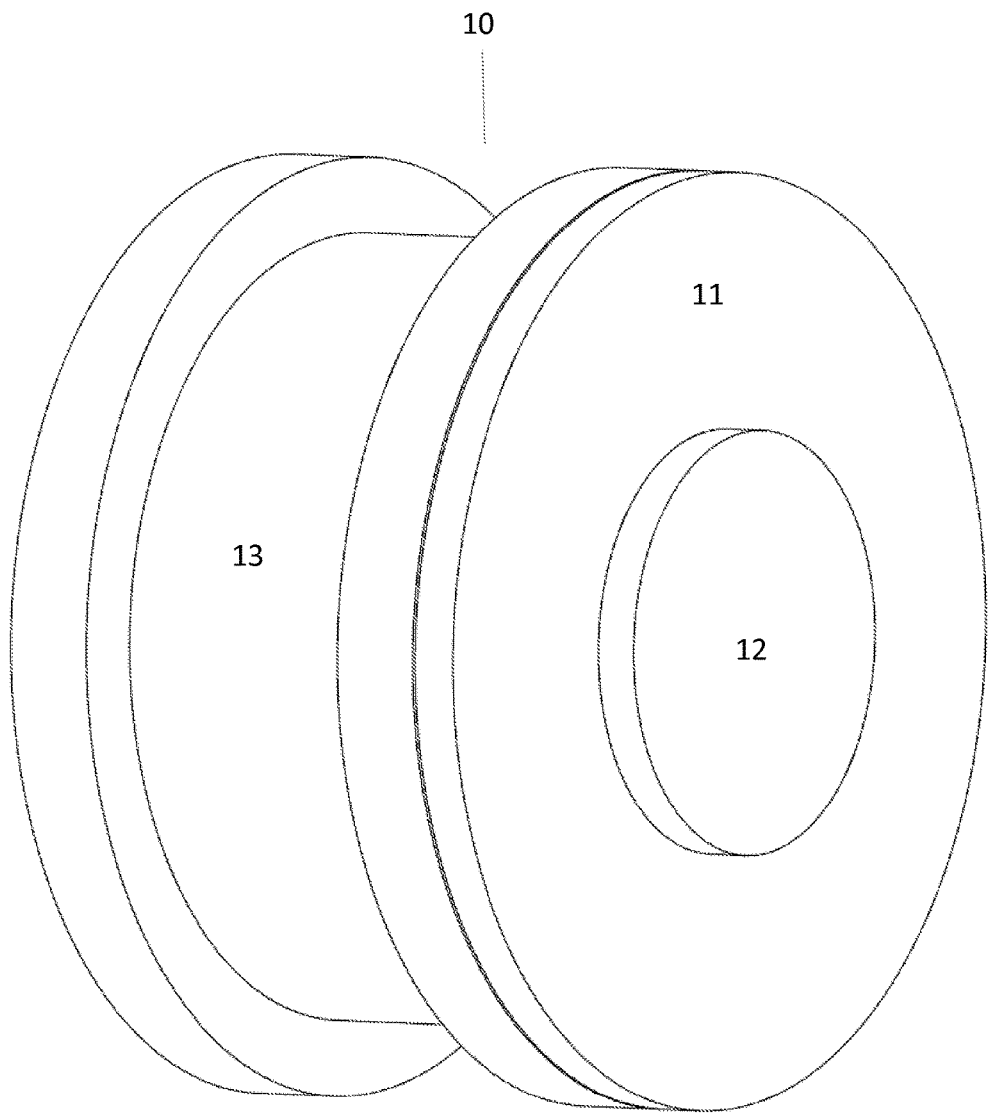
FIG. 35 is another general view of the gear being the fourth preferred embodiment of the present invention.
Figure 36:
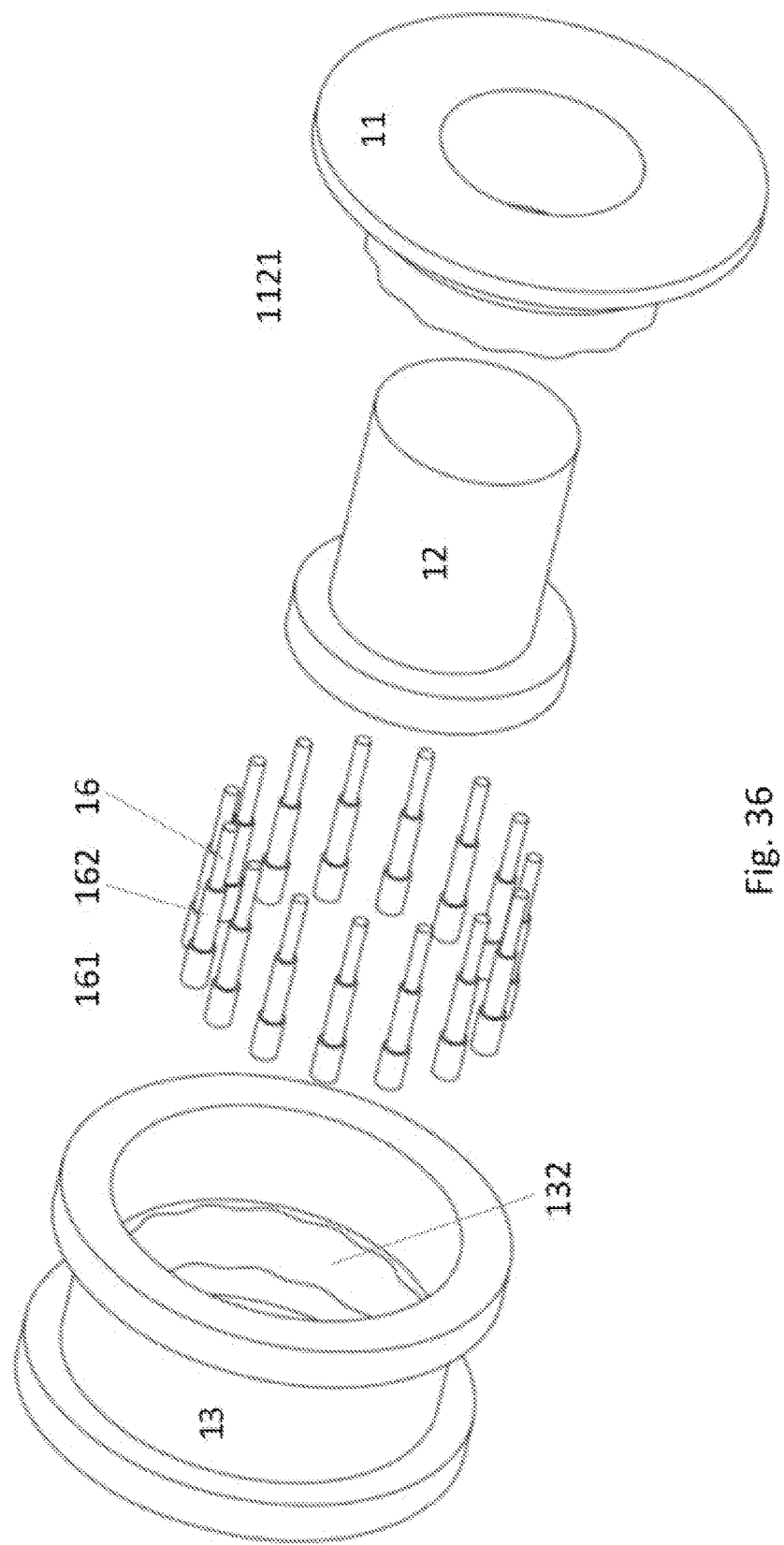
FIG. 36 is an exploded view of the gear being the fourth preferred embodiment of the present invention.
Figure 37:
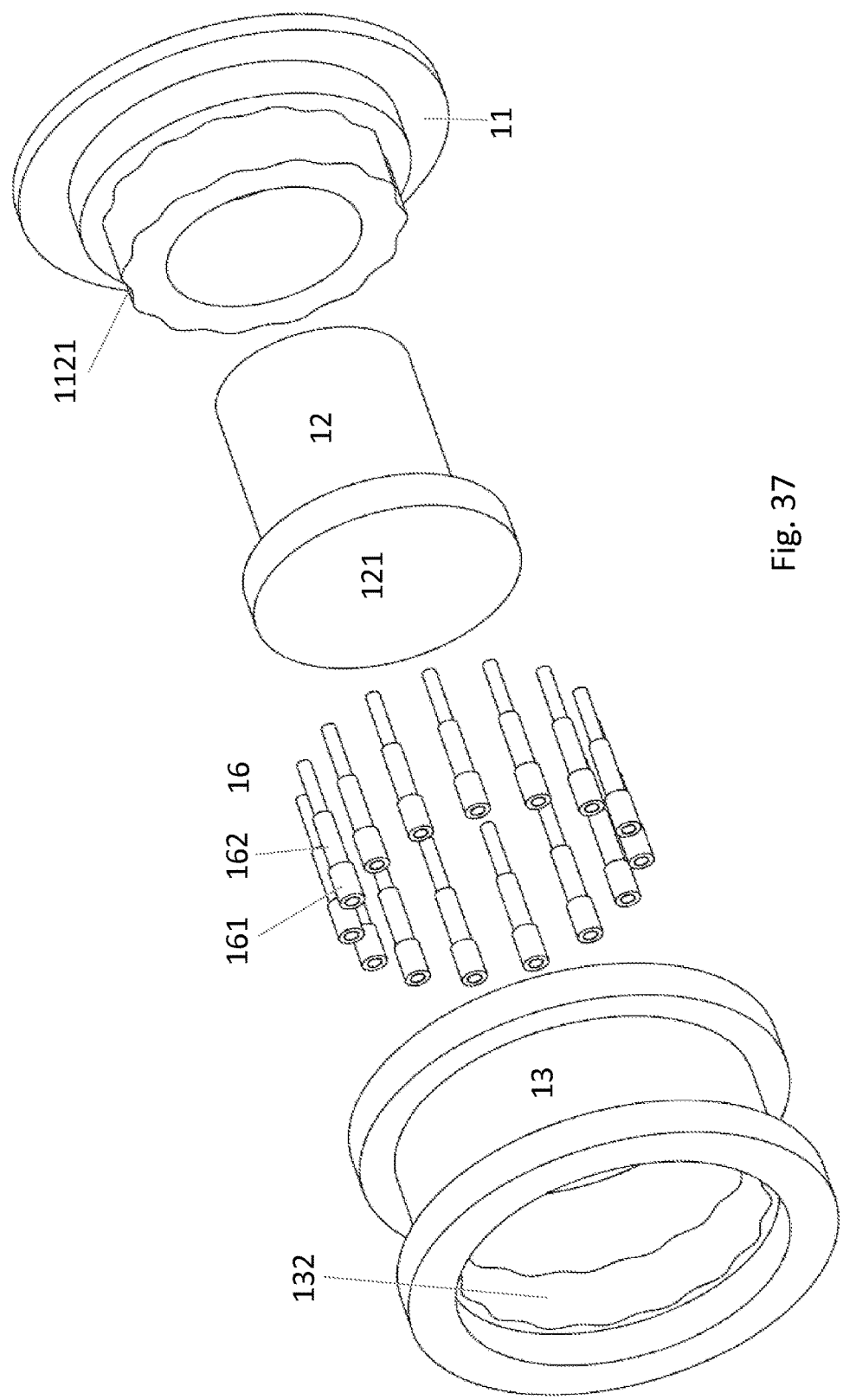
FIG. 37 is another exploded view of the gear being the fourth preferred embodiment of the present invention.
Figure 38:
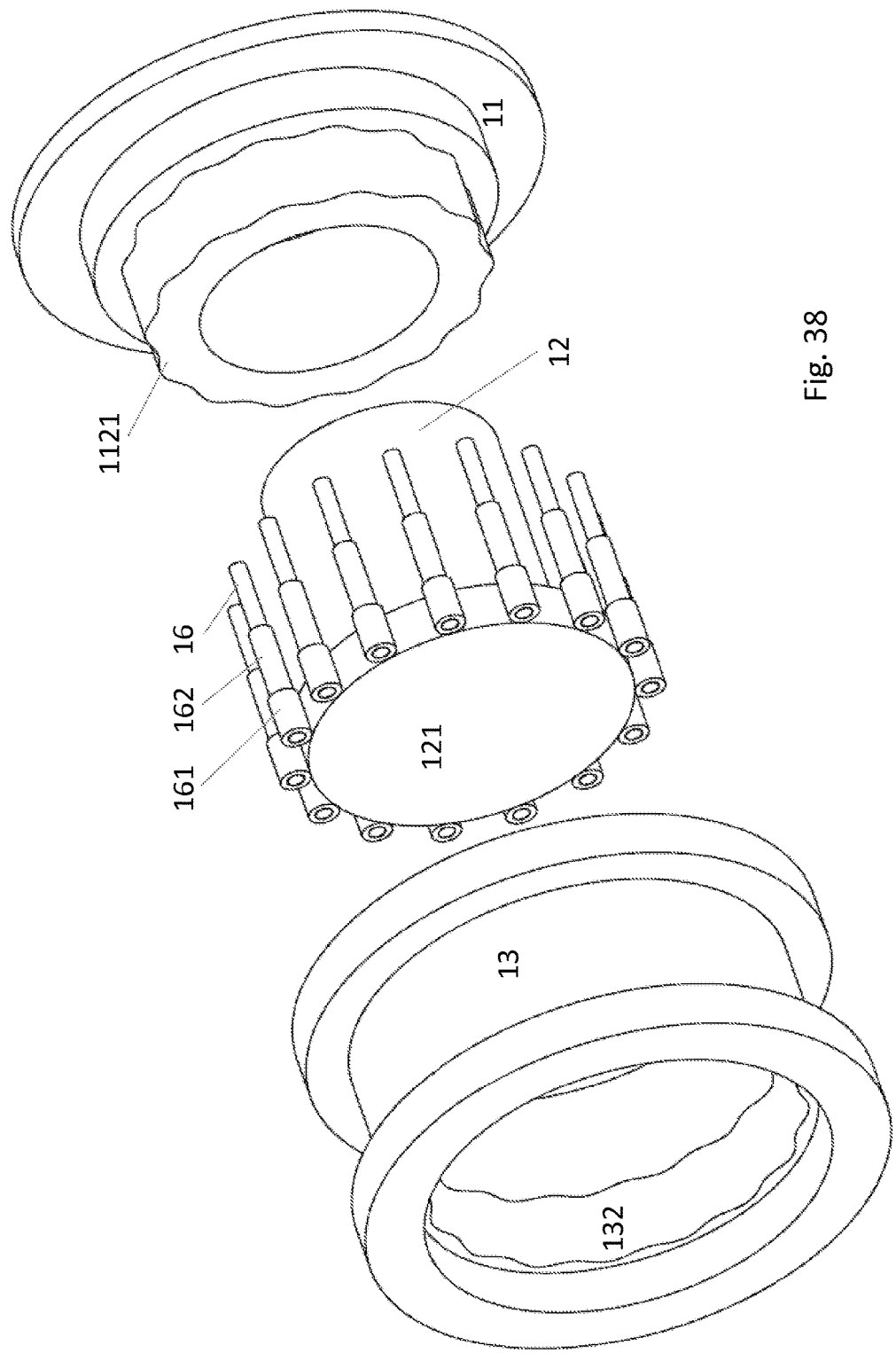
FIG. 38 is a view of the gear being the fourth preferred embodiment of the present invention partially assembled.
Figure 39:
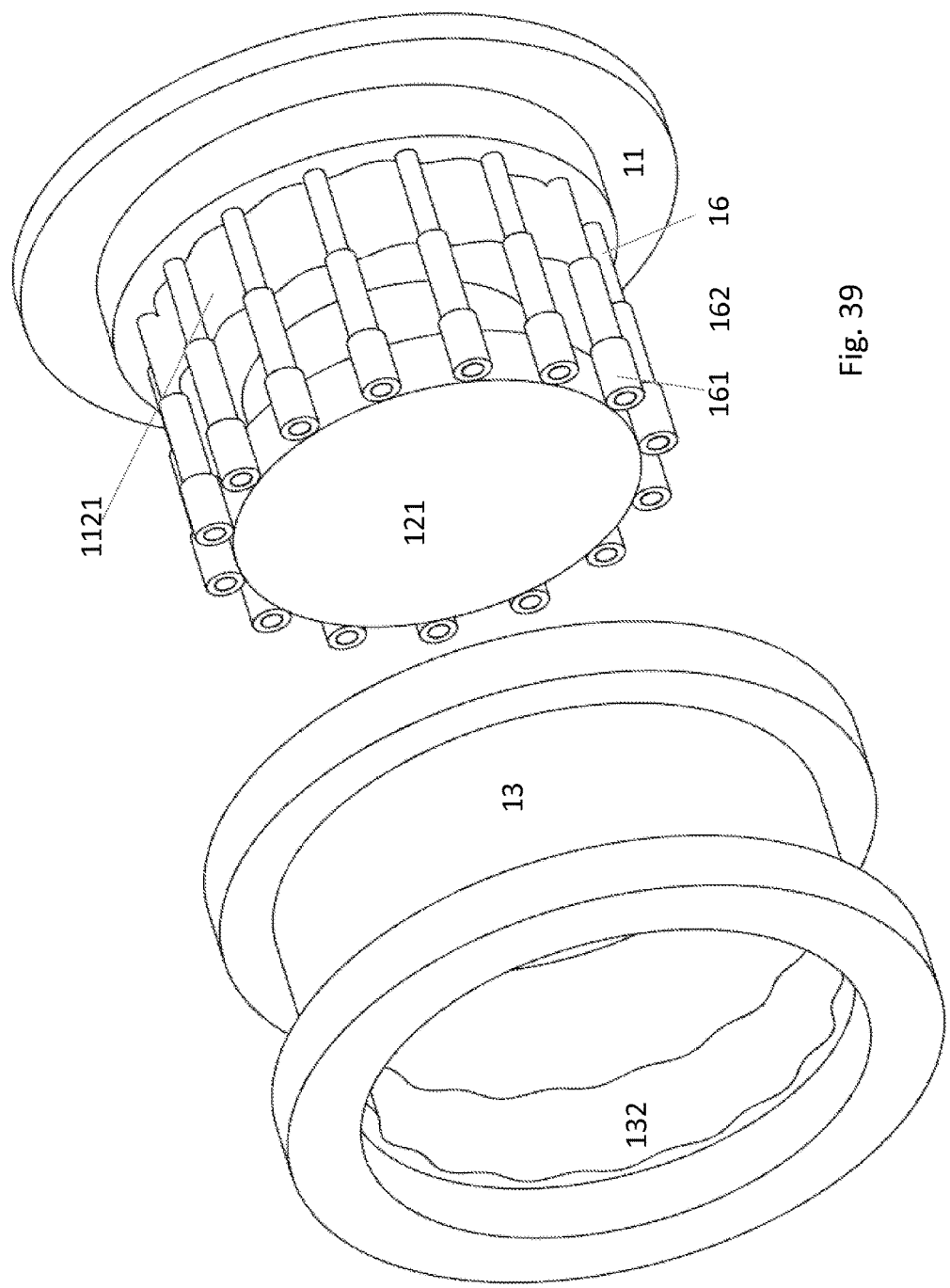
FIG. 39 is another view of the gear being the fourth preferred embodiment of the present invention partially assembled.
Figure 40:
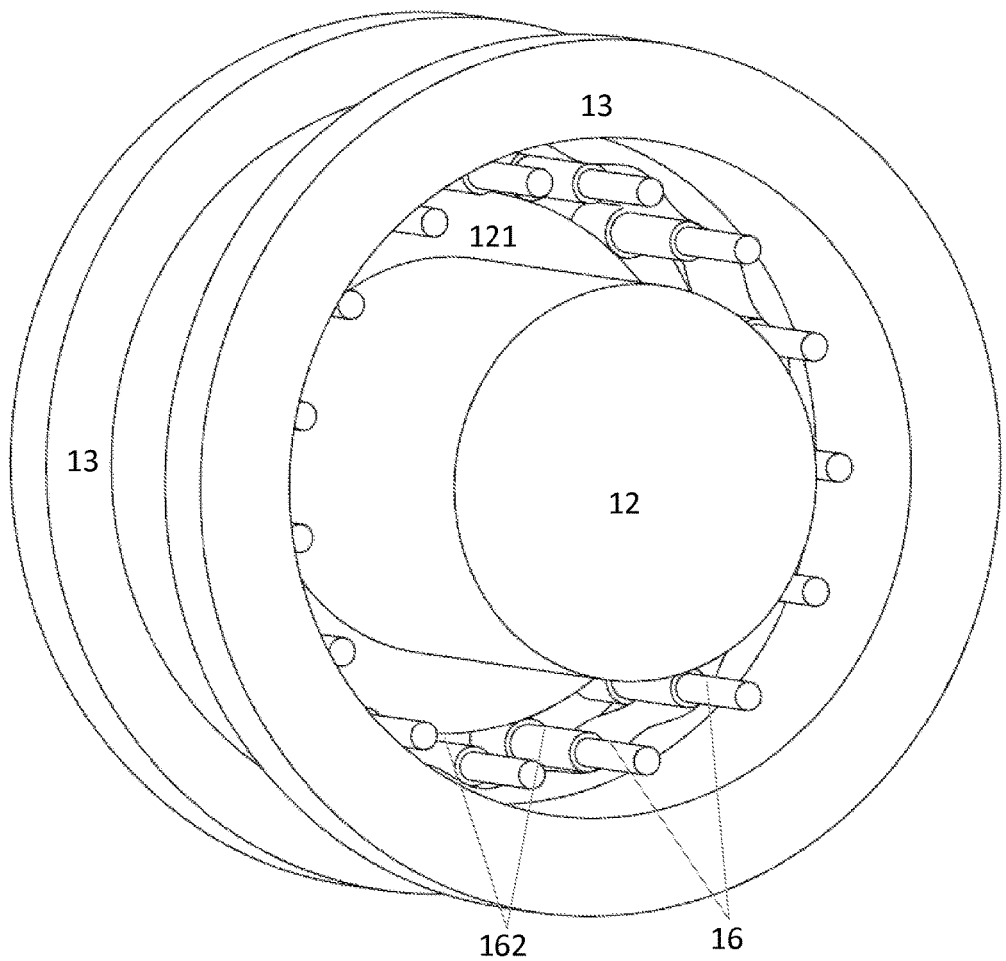
FIG. 40 shows the assembly of input shaft, rollers and output shaft of the gear being the fourth preferred embodiment of the present invention.
Figure 41:
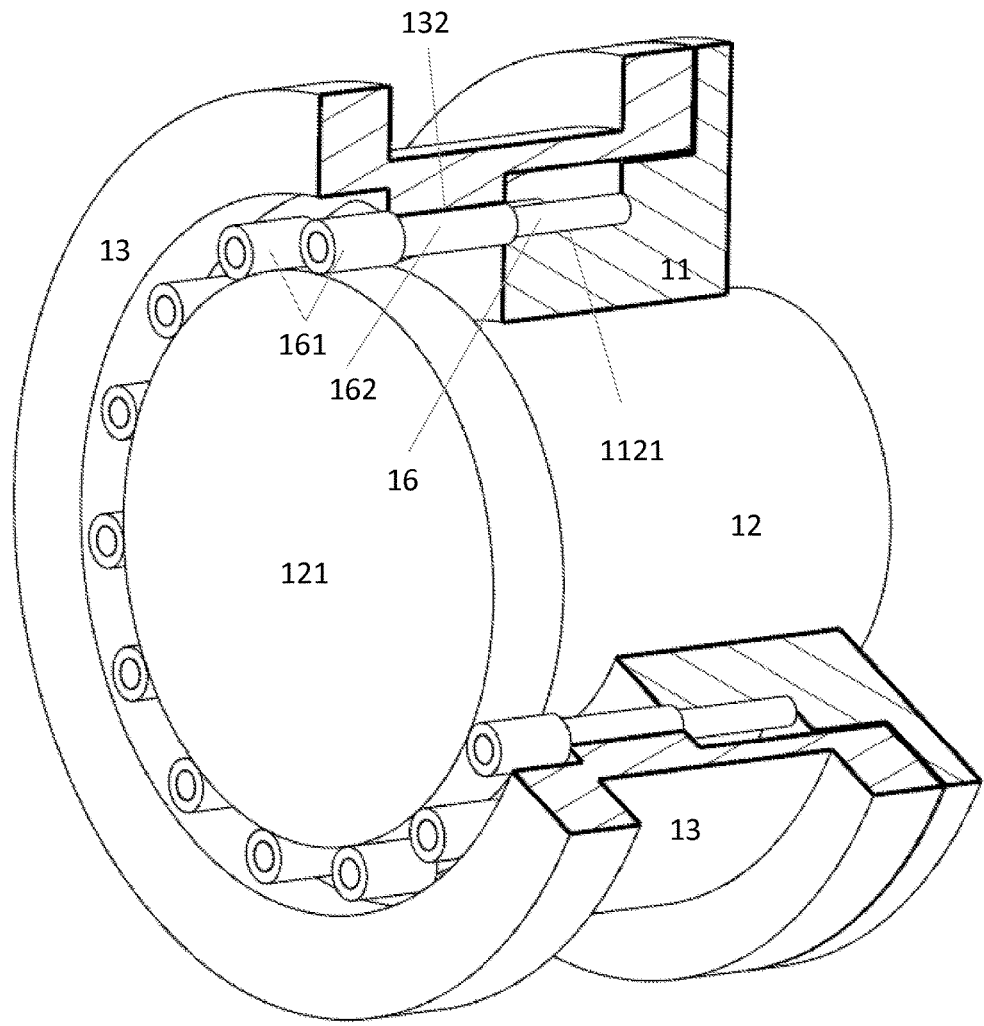
FIG. 41 is a cut-away section of the gear being the fourth preferred embodiment of the present invention.
Figure 42:
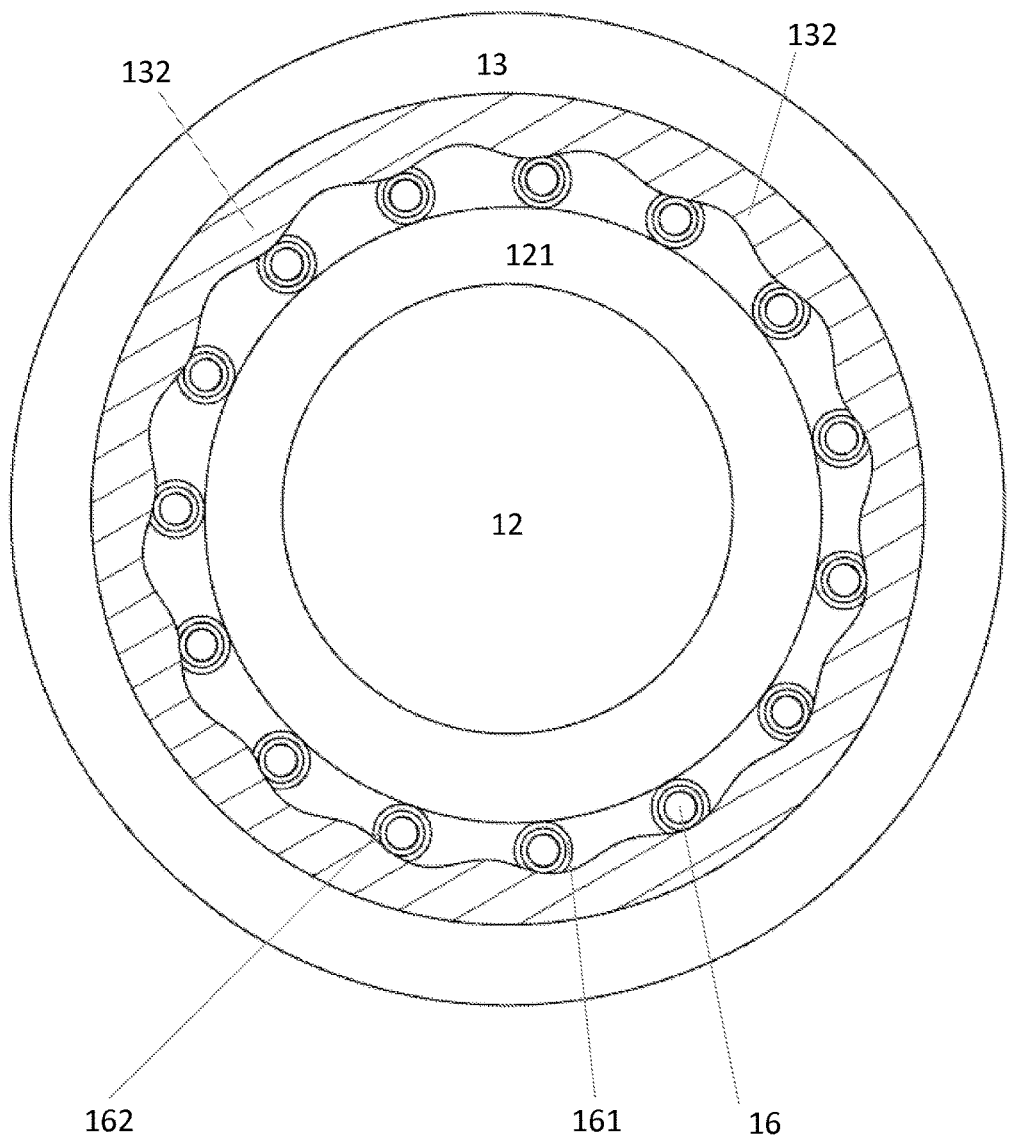
FIG. 42 is a transverse cross section of the gear being the fourth preferred embodiment of the present invention showing intermediate rollers meeting a cam placed on the output shaft, and secondary rollers meeting an eccentric placed on an input shaft.
Figure 43:
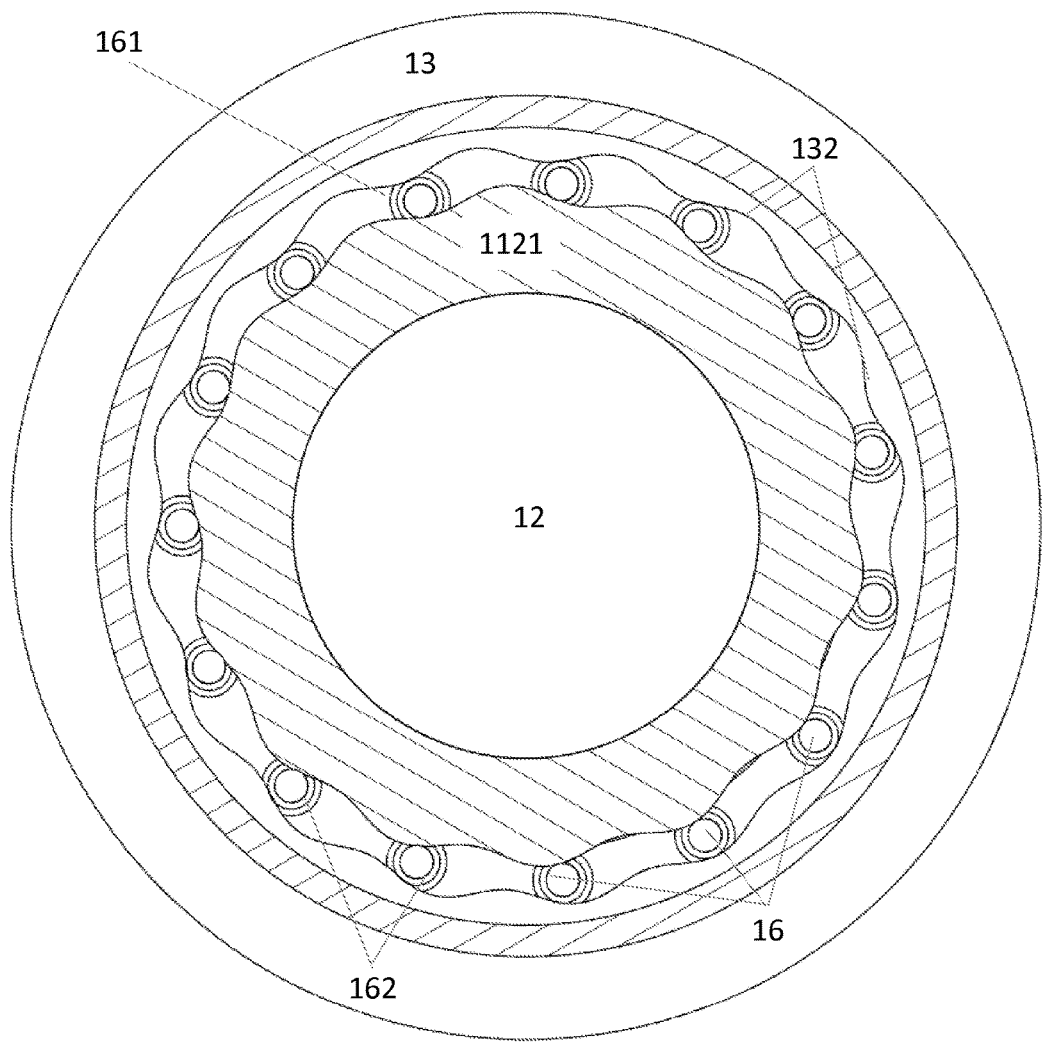
FIG. 43 is another transverse cross section of the gear being the fourth preferred embodiment of the present invention showing primary rollers meeting a cam placed in the gear body, and intermediate rollers meeting a cam placed on the output shaft.
Figure 44:
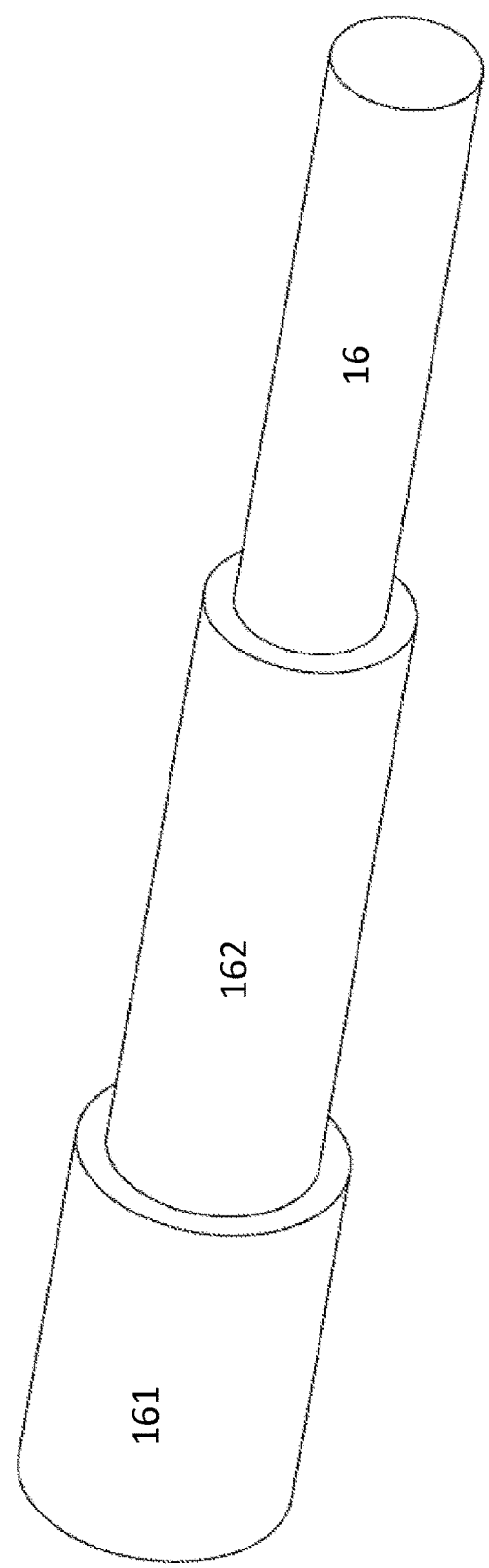
FIG. 44 is a general view of a rollers assembly.
Figure 45:
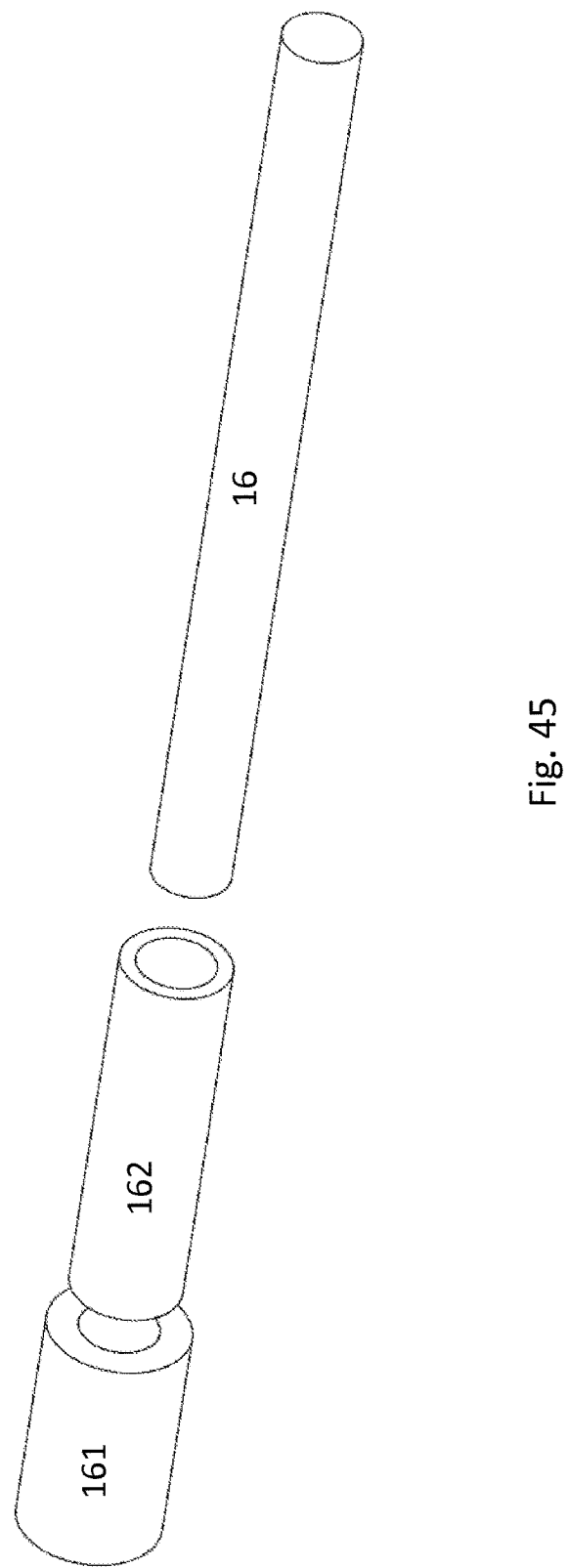
FIG. 45 is an exploded view of the rollers assembly.

First Embodiment, Variant B (FIGS. 16, 17)

Another preferred embodiment of the gear according to the present invention, illustrated in FIGS. 16, 17, differs from the variant A of the first embodiment only by the number of roller assemblies 16-161, which in the variant B is by one greater than the number of lobes of cams 1121 and 1141 (and in this example equals 17). In particular, the profile of cams 1121 and 1141 used in the variant B of the gear is the same as the profile of cams 1121 and 1141 used in variant A (it is a non-trivial fact that both the profiles are identical; a discussion of this issue is given below). The discussion of the functioning of the variant A of the gear given above applies almost literally to the variant B, the only difference is that the rotational speed of output shaft 13 of the variant B of the first embodiment of the gear equals 1/17 of the rotational speed of input shaft 12; in particular, both input shaft 12 and output shaft 13 rotate in the same direction.

By stopping output shaft 13 and letting body 11 to rotate, a gear in accordance with the present invention with transmission ratio −1/16 is obtained (again some changes, obvious to those skilled in the art, of the structure of the gear are necessary to get a fully operational device).

Second Embodiment (FIGS. 18-23)

The second embodiment of the gear according to the present invention differs from the first embodiment by the method of connecting the rollers with output shaft 13. This circumstance forces other profiles of cams, but renders the roller's yoke unnecessary.

Gear 10 being the second embodiment of the present invention (FIGS. 18-23) has a body 11, input shaft 12, output shaft 13, and a plurality (in this example 9) of roller assemblies 161-162-17-18-19. Body 11 (FIGS. 18-20 and 22) is composed of four parts 111, 112, 113, and 114. Placed in part 112 of body 11 there is cam 1121 with a number (10 in this example) of lobes; thus the number of lobes is greater by one than the number of roller assemblies, so output shaft 13 and input shaft 12 rotate in mutually opposite directions, and the transmission ratio of the gear equals −n, where n is the number of roller assemblies (thus in this example the transmission ratio equals −9). Input shaft 12 is mounted pivotally in part 111 of body 11. Output shaft 13 is mounted pivotally in part 114 of body 11 (FIGS. 18-22). Input shaft 12 has a external cam (in this example an eccentric) 121 that remains in constant contact with rollers 162 (FIGS. 18-22). Output shaft is equipped with disc 131. Each roller assembly 161-162-17-18-19 (FIGS. 18-22, and particularly FIGS. 21, 23) is composed of eccentric 18, axle 17, web 19 joining axle 17 and eccentric 18, and two rollers 161, 162 mounted pivotally on axle 17. Each roller 161 remains in constant contact with cam 1121 placed in part 112 of body 11. Each roller assembly 161-162-17-18-19 is mounted pivotally in disc 131 of output shaft 13 through eccentric 18 (FIGS. 18-22).

The discussion of the functioning of the variant A of the first embodiment of the gear given above applies almost literally to the second embodiment, the only difference is that the trajectory in the output shaft reference system of center of rollers 161, 162 is a circular arc rather than a segment of a straight line, which, as mentioned above, forces different profile of cam 1121.

Like in the case of the first embodiment of the gear, there is also a variant of the second embodiment of the gear according to the present invention, in which the number n of roller assemblies is by one greater than the number of lobes on cam 1121. In this case the transmission ratio equals n (in particular both input shaft and output shaft rotate in the same direction), however the profile of cam 1121 differs from that of the first variant of the second embodiment.

Third Embodiment (FIGS. 24-33)

The third preferred embodiment of the gear according to the instant invention differs from the first and the second embodiment in that cam 1121 placed in body 11 of the first and second embodiment is replaced by cam 132 placed on output shaft; this difference also forces a change in the method of mounting of roller assemblies, which in the present example are "stationary", i.e. mounted directly in the gear body 11.

Thus gear 10 being the third embodiment of the invention has body 11, input shaft 12, output shaft 13, and a number n (in this example 9) of roller assemblies 21-22-23-161-162-163 (FIGS. 24-30). Input 12 and output 13 shafts are mounted pivotally and coaxially in body 11. Arranged in body 11 there are n sockets 116, in which semi-circular levers 23 of roller assemblies 21-22-23-161-162-163 are mounted pivotally (FIGS. 24-29, and particularly FIG. 28). Input shaft has cam (in this example an eccentric) 121 placed thereon. Output shaft 13 has cam 132 placed thereon. Cam 132 has a number m of lobes and valleys (in this example m=n−1=8). Each roller assembly 21-22-23-161-162-163 (FIGS. 24-33, and particularly 29-33) consists of semi-circular lever 23, two holders 21 and 22, two auxiliary rollers 163, through which holders 21 and 22 are mounted pivotally on lever 23, and two rollers 161, 162 cooperating with cams 121, 132 respectively. Roller 161 is mounted pivotally in holder 21, and roller 162 is mounted pivotally in holder 22. Holder 21, resp. 22, has a socket 211, resp. 221, accommodating their respective auxiliary roller 163. Roller assemblies 21-22-23-161-162-163, input shaft 12 and output shaft 13 are mounted in body 11 so that rollers 161 remain in constant contact with cam 121 on input shaft 12, and rollers 162 remain in constant contact with cam 132 on output shaft 13. Transmission ratio of the gear equals ±k/m, where k is the number of lobes of cam 121 (in this example k=1, and the transmission ratio equals −1/8; in particular input shaft 12 and output shaft 13 revolve in opposite directions).

Again there are versions of the third embodiment of the gear with different numbers of lobes on cams 121 and 132; in particular, there are versions with both shafts rotating in the same direction.

Work of the gear is as follows: As input shaft 12 rotates, cam 121 presses rollers 161, which trough levers 23 press rollers 162; rollers 162 in turn exert force on cam 132 on output shaft 13. This force, thanks to the specific profile of cam 132, has a non-zero tangential component that generates positive torque on output shaft 13.

Fourth Embodiment (FIGS. 34-45)

This embodiment of the present invention is of particular interest, because it allows for obtaining very large transmission ratios in very compact one-stage gears.

The gear (which, in this example, assumes the form of winch) has a body 1, input shaft 12 mounted rotatably in the body 11, output shaft 13 mounted rotatably in the body 11 coaxially with input shaft 12 and assuming, in this example, the form of spool, and a plurality (15 in this example) of roller assemblies 16-161-162. Placed in body 11 there is an external cam 1121 having a number n of lobes and valleys (n=14 in this example). Placed on the output shaft 13 there is a cam 132 having a number m of lobes and valleys (m=16 in this example). Input shaft 12 has a cam 121 (with yet another number k of lobes and valleys; k=1, and cam 121 assumes the shape of eccentric in this example) placed thereon. Primary rollers 16 roll over cam 1121 placed in gear body 11, secondary rollers 161 roll over eccentric 121 placed on input shaft 12, and rollers 162 roll over cam 132 placed on output shaft (spool) 13. Profiles of cams 121, 132, and 1121 are linked together by certain mathematical formulas (not formulated explicitly in this patent specification, but similar to those given in the mathematical appendix below), which assure constant contact of rollers 16, 161, 162 with cams 1121, 121, 132 respectively, during operation of the gear.

Work of this gear is similar to that of previously described preferred embodiments: As input shaft 12 and its cam 121 revolves, rollers 16 follow the contour of cam 121, which forces rollers 162 to follow the contour of cam 1121 placed in body 11, and rollers 161- to follow the contour of cam 132 placed on output shaft 13; this forces output shaft to rotate. The assemblies of rollers rotate in unison in one direction, while output shaft 13 rotates in the opposite direction with the rotational speed equal to 1/nλm of the rotational speed of input shaft 12; thus the transmission ratio of the gear equals 1/14λ16=1/224 in this example.

Figure 46:
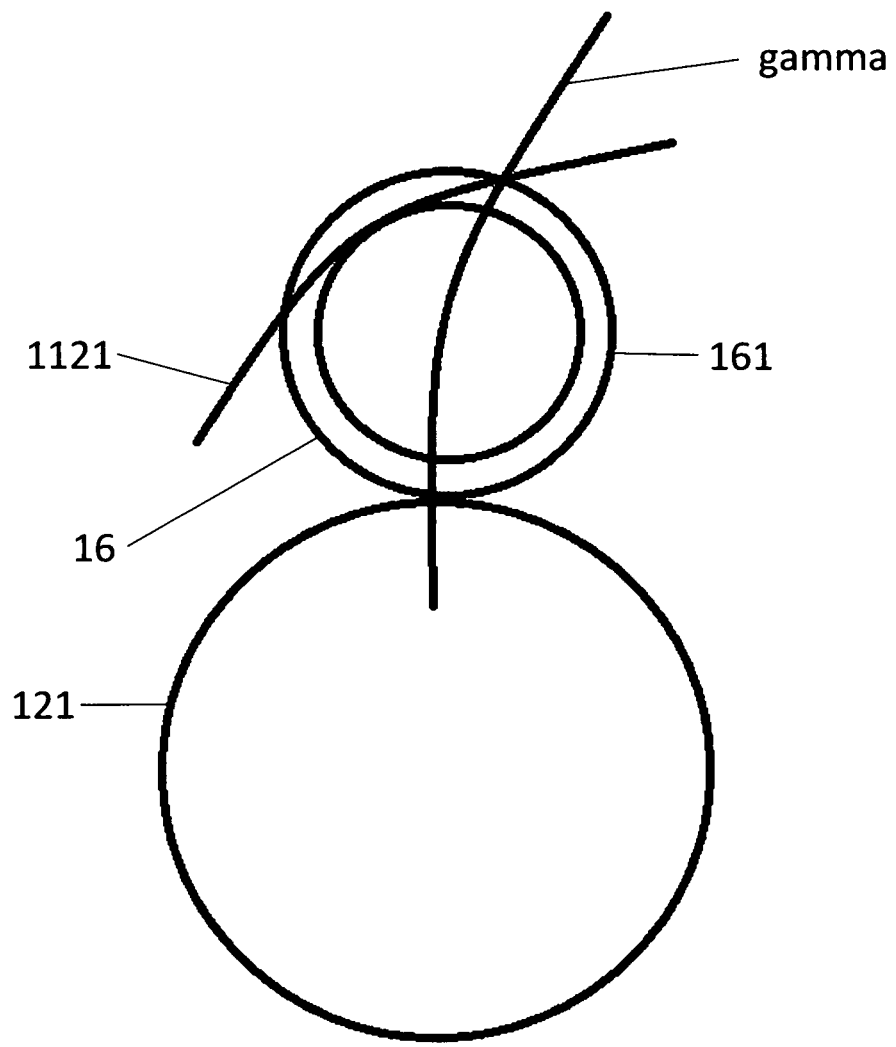
FIG. 46 is an auxiliary drawing explaining main geometric dependences between various geometric parameters of profiles of cams.

Establishment of the Relationship Between Profiles of the Cams Placed on the Input Shaft and in the Gear Body Now, having described preferred embodiments of the present invention, I embark on a discussion of relationship between profiles of cam 121 on input shaft and cams 1121 and 1141 placed in the gear body, or on input and output shafts (which will provide a proof that the construction of my gears is feasible), (FIG. 46).

I assume that I am given the following set of data:

1. A polar coordinate system $(r, \varphi)$, $r \in <0,\infty)$, $\varphi \in <0,2\pi)$, a cylindrical coordinate system $(r, \varphi, z)$, $z \in (-\infty,\infty)$, a first ("quiescent") Cartesian coordinate system $(x,y,z)$, $x = r\cos\varphi$, $y = r\sin\varphi$; and a second ("rotating") Cartesian coordinate system $(x_1, y_1, z_1)$, where the z-axis of the first Cartesian coordinate system coincides with the $z_1$-axis of the second Cartesian coordinate system, and the origin of the first Cartesian coordinate system coincides with the origin of the second Cartesian coordinate system;

2. The axes of rotation of input shaft 12 and output shaft 13 coincide with the z-axis of the first Cartesian coordinate system and the cylindrical coordinate system (and hence with the $z_1$-axis of the second Cartesian coordinate system;

3. Yoke 14 and output shaft 13 remain at rest in the first Cartesian coordinate system; the gear body 11 (and hence cams 1121 and 1141) remains at rest in the second Cartesian coordinate system;

4. Base transmission ratio of the gear, understood as the ratio $$\frac{\omega_2}{\omega_1},$$

where $\omega_1$ is the rotational speed of input shaft 12 relative yoke 14 and output shaft, (i.e. relative the first Cartesian coordinate system), and $\omega_2$ is the rotational speed of the gear body 11 relative yoke 14 and output shaft 13 (i.e. in the first Cartesian coordinate system), is given by a rational (strictly positive or strictly negative) number k;

5. For certain fixed position of input shaft 12 relative the cylindrical coordinate system $(r, \varphi, z)$, $r \in <0,\infty)$, $\varphi \in <0,2\pi)$, $z \Sigma (-\infty,\infty)$, understood as a position corresponding to a zero angle of rotation of input shaft 12 relative the cylindrical coordinate system, the profile of cam 121 on input shaft 12 is given in the cylindrical coordinate system $(r, \varphi, z)$, $r \in <0,\infty)$, $\varphi \in <0,2\pi)$, $z \in (-\infty,\infty)$ by a (continuously differentiable) function $r(\varphi,z) = f(\varphi)$ for some continuously differentiable function $r = f(\varphi)$, and $z \in <a,b>$ for some real numbers $a < 0 < b$, where $$\lim_{\varphi \to 0} f(\varphi) = \lim_{\varphi \to 2\pi} f(\varphi),$$

$$\lim_{\varphi \to 0} \frac{d}{d\varphi} f(\varphi) = \lim_{\varphi \to 2\pi} \frac{d}{d\varphi} f(\varphi);$$

thus the profile of cam 121 is given in the first Cartesian coordinate system by $x(\varphi,z) = f(\varphi)\cos\varphi$, $y(\varphi,z) = f(\varphi)\sin\varphi$, $z = z$;

6. For the position of input shaft 12 relative the cylindrical coordinate system as described in paragraph 5 above (i.e. corresponding to the zero angle of rotation of input shaft 12 relative the cylindrical coordinate system) the x-axis of the first Cartesian coordinate system coincides with the $x_1$-axis of the second Cartesian coordinate system, and the y-axis of the first Cartesian coordinate system coincides with the $y_1$-axis of the second Cartesian coordinate system 7. Radius of roller 161 rolling over cam 121 on input shaft 12 equals $r_0$ for some strictly positive real number $r_0$, and radius of roller 16 rolling over cam 1121 placed in the gear body 11 equals $r_1$ for some strictly positive real number $r_1$;

8. The center of the circle being the intersection of a fixed roller 161 with the plane (x,y,0) of the first Cartesian coordinate system moves during the gear operation along a curve γ given in the first Cartesian coordinate system by continuously differentiable functions $x = \gamma_1(t)$, $y = \gamma_2(t)$, $z = 0$.

9. $r(\varphi,\psi) = f(\varphi - \psi)$ is the profile in the cylindrical coordinate system of cam 121 rotated by the angle ψ relative the first Cartesian coordinate system; I write $f(\varphi - \psi) = f_\psi(\varphi)$; thus in the first Cartesian coordinate system the profile of cam 121 rotated by the angle ψ relative the first Cartesian coordinate system is given by $(x_\psi(\varphi) = f_\psi(\varphi)\cos\varphi, y_\psi(\varphi) = f_\psi(\varphi)\sin\varphi)$;

Principal unknowns are:

0. Functions $\tilde{x}(\varphi)$ and $\tilde{y}(\varphi)$ describing the profile of cam 1121 (or, to be more precise, the profile of the intersection of cam 1121 with the plane (x,y,0)) in the first Cartesian coordinate system.

I must also introduce some auxiliary unknowns:

Auxiliary Unknowns:

1. ψ is an angle of rotation of input shaft 12 relative yoke 14, i.e. relative the first Cartesian coordinate system.

2. $(x(\psi), y(\psi), 0)$ are coordinates of the center of roller 161 (remaining in constant contact with cam 121) in the first Cartesian coordinate system corresponding to the angle ψ of rotation of input shaft 12 relative the first Cartesian coordinate system;

3. $(x_t(\psi), y_t(\psi), 0)$ are coordinates of the point of contact of the profile (a curve) of roller 161 and the profile (a curve) of cam 121 in the first Cartesian coordinate system corresponding to the angle ψ of rotation of input shaft 12 relative the first Cartesian coordinate system;

The following two assertions, mathematical of nature, will be crucial for the determination of profile 1121:

Let δ(ψ) will be the profile in the second Cartesian coordinate system rotated relative the first Cartesian coordinate system by the angle kψ of roller 161 assuming the position corresponding to the angle ψ of rotation of input shaft 12 relative the first Cartesian coordinate system; thus δ(ψ) is a circle of radius $r_0$ with the center placed at the point having in the second Cartesian coordinate system coordinates $(\tilde{x}_1(\psi), \tilde{y}_1(\psi)) = (\cos(k\psi)x(\psi) + \sin(k\psi)y(\psi); -\sin(k\psi)x(\psi) + \cos(k\psi)y(\psi))$.

ASSERTION 1. The profile of cam 1121 (and 1141) in the second Cartesian coordinate system is an envelope of the family of circles δ(ψ).

ASSERTION 2. There exist precisely two envelopes of a family of circles of a given fixed radius r>0, the centers of which are placed along a planar curve ξ given in a Cartesian coordinate system $(\hat{x},\hat{y})$ by a continuously differentiable function $(\hat{x}=\xi_1(s),\hat{y}=\xi_2(s))$ (where s is a real parameter)); these two envelopes are two components of the (zero dimensional) sphere bundle of the radius r of normal bundle to the curve ξ. In other words, the two envelopes are the two curves given in the Cartesian coordinate system $(\hat{x},\hat{y})$ by the following functions:

$$\hat{x}(s) = \xi_1(s) \pm r\left(\frac{d\xi_2(s)}{ds} \bigg/ \sqrt{\left(\frac{d\xi_1(s)}{ds}\right)^2 + \left(\frac{d\xi_2(s)}{ds}\right)^2}\right)$$

$$\hat{y}(s) = \xi_2(s) \mp r\left(\frac{d\xi_1(s)}{ds} \bigg/ \sqrt{\left(\frac{d\xi_1(s)}{ds}\right)^2 + \left(\frac{d\xi_2(s)}{ds}\right)^2}\right).$$

Now I am in a position to formulate a relationship between profile r(φ,z)=f(φ of cam 121 and the profile of cam 1121.

The unknowns and given data as described above satisfy the following system of equations:

$$x(\psi)=\gamma_1(t(\psi)), \; y(\psi)=\gamma_2(t(\psi)) \text{ for some auxiliary unknown } t(\psi); \quad (1)$$

these two equations express the fact, that the center (x(ψ),y(ψ)) of roller 161 lies on the curve γ, $$x_r(\psi)=f_\psi(\varphi(\psi))\cos(\varphi(\psi)), \; y_r(\psi)=f_\psi(\varphi(\psi))\sin(\varphi(\psi)),$$
for some auxiliary unknown function φ(ψ); (2)

these two equations express the fact, that the point of contact of the profile of roller 161 and profile 121 rotated by the angle ψ lies on this last profile (curve), i.e. on the curve $(x_\psi(\varphi),y_\psi(\varphi))$;

$$(-y(\psi) + y_i(\psi))/r_0 = \frac{dx_\psi}{d\varphi}(\varphi(\psi)) \bigg/ \sqrt{\left(\frac{dx_\psi}{d\varphi}(\varphi(\psi))\right)^2 + \left(\frac{dy_\psi}{d\varphi}(\varphi(\psi))\right)^2},$$

$$(-x(\psi) + x_i(\psi))/r_0 = \frac{dx_\psi}{d\varphi}(\varphi(\psi)) \bigg/ \sqrt{\left(\frac{dx_\psi}{d\varphi}(\varphi(\psi))\right)^2 + \left(\frac{dy_\psi}{d\varphi}(\varphi(\psi))\right)^2}; \quad (3)$$

these two equations express the fact, that the profile of roller 161 and profile 121 rotated by the angle ψ are tangent to one another at the point $(x_r(\psi),y_r(\psi))$.

Thus we have a system of six equations for six unknowns x(ψ), y(ψ), $x_r(\psi)$, $y_r(\psi)$, t(ψ), φ(ψ), which, under quite general conditions, can be solved (e.g. in the case of all four preferred embodiments presented above).

Let $x(\psi)=\bar{x}(\psi), y(\psi)=\bar{y}(\omega)$ etc. be a solution of the system of equations (1)-(3); thus $(\bar{x}(\psi),\bar{y}(\psi))$ is the trajectory of the center of roller 161 in the first Cartesian coordinate system (expressed as a function of the angle ψ of rotation of input shaft 12 relative the first Cartesian coordinate system), and $(\tilde{x}_1(\psi),\tilde{y}_1(\psi))=(\cos(k\psi)\bar{x}(\psi)+\sin(k\psi)\bar{y}(\psi); -\sin(k\psi)\bar{x}(\psi)+\cos(k\psi)\bar{y}(\psi))$ is the trajectory of the center of roller 161 in the second Cartesian coordinate system. Now, applying Assertions 1 and particularly 2, we get the following formula for the profile of cam 1121 in the second Cartesian coordinate system:

$$\tilde{x}_1^1(\psi) = \tilde{x}_1(\psi) \pm r_1\left(\frac{d\tilde{y}_1(\psi)}{d\psi} \bigg/ \sqrt{\left(\frac{d\tilde{x}_1(\psi)}{d\psi}\right)^2 + \left(\frac{d\tilde{y}_1(\psi)}{d\psi}\right)^2}\right);$$

$$\tilde{y}_1^1(\psi) = \tilde{y}_1(\psi) \mp r_1\left(\frac{d\tilde{x}_1(\psi)}{d\psi} \bigg/ \sqrt{\left(\frac{d\tilde{x}_1(\psi)}{d\psi}\right)^2 + \left(\frac{d\tilde{y}_1(\psi)}{d\psi}\right)^2}\right);$$

or, using the fact that both the first and second Cartesian coordinate systems coincide when the angle of rotation of input shaft equals 0, we finally get the following formula for the profile of cam 1121 in the first Cartesian coordinate system:

$$\tilde{x}(\varphi) = \tilde{x}_1(\varphi) \pm r_1\left(\frac{d\tilde{y}_1(\varphi)}{d\varphi} \bigg/ \sqrt{\left(\frac{d\tilde{x}_1(\varphi)}{d\varphi}\right)^2 + \left(\frac{d\tilde{y}_1(\varphi)}{d\varphi}\right)^2}\right),$$

$$\tilde{y}(\varphi) = \tilde{y}_1(\varphi) \mp r_1\left(\frac{d\tilde{x}_1(\varphi)}{d\varphi} \bigg/ \sqrt{\left(\frac{d\tilde{x}_1(\varphi)}{d\varphi}\right)^2 + \left(\frac{d\tilde{y}_1(\varphi)}{d\varphi}\right)^2}\right).$$

For the completeness of this patent specification, below I present the formula for the profile of cam 1121 of the first embodiment (presented above) of the gear according to the instant invention; thus now I confine myself to the case, where cam 121 on input shaft 12 is an eccentric, and the path γ of the center of rollers 16, 161 is a segment of a straight line.

Thus I start with the following set of data (FIG. 45):

1. Cam 121 on input shaft 12 is an eccentric with eccentricity e and radius $r_e$;
2. Base transmission ratio k=1/s, where s is a natural number (not equal to zero); in the case of the first variant of the first embodiment of the gear according to the present invention s=16;
3. Radius of primary roller 16 equals $r_1$; radius of secondary roller 161 equals $r_0$;

Then the profile of cam 1121 is given in the first Cartesian coordinate system by the following formulas:

Let us introduce the following abbreviations:

$$A(\varphi)=\sqrt{(r_e+r_0)^2-e^2\sin^2(s\varphi)};$$

$$B(\varphi)=e\cos(s\varphi)\cos\varphi+A(\varphi)\cos\varphi;$$

$$C(\varphi)=A(\varphi)+e\cos(s\varphi);$$

$$D(\varphi)=se^2\sin(s\varphi)\cos(s\varphi)/A(\varphi)+se\sin(s\varphi);$$

$$E(\varphi)=e\cos(s\varphi)\sin\varphi+A(\varphi)\sin\varphi;$$

Then $\tilde{x}(\varphi)=B(\varphi)+r_1(B(\varphi)-D(\varphi)\sin\varphi)/\sqrt{((C(\varphi))^2+((D(\varphi))^2}$, and $$\tilde{y}(\varphi)=E(\varphi)+r_1(E(\varphi)+D(\varphi)\cos\varphi)/\sqrt{((C(\varphi))^2+((D(\varphi))^2}.$$

Contour of cam 132 placed on output shaft 13 (preferred embodiments 3 and 4) is determined completely analogously.

The foregoing description discloses four preferred embodiments of the invention. One skilled in the art will readily recognize from this description and from the accompanying figures and patent claims, that many changes and modifications can be made to the preferred embodiments without departing from the true spirit, scope and nature of the inventive concepts as defined in the following patent claims.

I claim:

1. A gear free of sliding friction including a body; a first shaft supported rotatably in the body for rotation around a first axis of rotation; a second shaft supported rotatably in the body coaxially with the first shaft for rotation around the first axis of rotation; a yoke; and at least one rollers assembly; wherein the body has a first cam secured against rotation relative the body, the first shaft has a second cam secured against rotation relative the first shaft; the yoke is rigidly connected with the second shaft to form an assembly of the second shaft and the yoke; wherein the assembly of the second shaft and the yoke defines a first cylindrical coordinate system (r, φ,z) at rest relative the assembly of the second shaft and the yoke, wherein the assembly of the second shaft and the yoke defines a first Cartesian coordinate system (x,y,z) at rest relative the assembly of the second shaft and the yoke, wherein x=r cos φ, y=r sin φ, and the z-axis of the first Cartesian coordinate system coincides with the z-axis of the first cylindrical coordinate system; wherein the first shaft defines a second cylindrical coordinate system $(r_1, \varphi_1, z_1)$ at rest relative the first shaft, wherein the first shaft defines a second Cartesian coordinate system $(x_1, y_1, z_1)$ at rest relative the first shaft, wherein $x_1 = r_1 \cos\varphi_1$, $y_1 = r_1 \sin\varphi_1$; wherein the coordinates (x,y,z) of the first Cartesian coordinate system are related to the coordinates $(x_1, y_1, z_1)$ of the second Cartesian coordinate system by the followings equations: $x = x_1 \cos\psi + y_1 \sin\psi$, $y = -x_1 \sin\psi + y_1 \cos\psi$, $z = z_1$, wherein ψ is a varying angle of rotation of the second Cartesian coordinate system relative the assembly of the second shaft and the yoke; wherein the body defines a third cylindrical coordinate system $(r_2, \varphi_2, z_2)$ at rest relative the body, wherein the body defines a third Cartesian coordinate system $(x_2, y_2, z_2)$ at rest relative the body, wherein the coordinates (x,y,z) of the first Cartesian coordinate system are related to the coordinates of the third Cartesian coordinate system by the following equations:

$$x = x_2 \cos\left(\frac{\psi}{k}\right) + y_2 \sin\left(\frac{\psi}{k}\right),$$

$$y = -x_2 \sin\left(\frac{\psi}{k}\right) + y_2 \cos\left(\frac{\psi}{k}\right),$$

$$z = z_1$$

wherein k is a rational number; wherein the at least one rollers assembly includes a first circular roller having a first circular profile with a first center, and a first radius $\rho_1$, and a second circular roller having a second circular profile with a second center, and a second radius $\rho_0$; wherein the at least one rollers assembly is connected movably with the yoke at a distance d from the first axis of rotation; wherein the first circular roller of the at least one rollers assembly is coaxial with the second circular roller of the at least one rollers assembly; wherein the first circular roller of the at least one rollers assembly is able to revolve relative the yoke around a second axis of rotation, the second circular roller of the at least one rollers assembly is able to revolve relative the yoke around the second axis of rotation, the second circular roller of the at least one rollers assembly is able to revolve relative the first circular roller of the at least one rollers assembly around the second axis of rotation, wherein the first center of the circular profile of the first circular roller and the second center of the circular profile of the second roller both lie on the second axis of rotation; wherein the at least one rollers assembly is able to move relative the yoke only as a unit, so that the distance d between the at least one rollers assembly and the first axis of rotation is able to vary; wherein the at least one rollers assembly is mounted in the body such that the first circular roller of the at least one rollers assembly is tangent to the first cam placed in the body, and the second circular roller of the at least one rollers assembly is tangent to the second cam placed on the first shaft; wherein the first cam placed in the body has a first profile defined in the third cylindrical coordinate system $(r_2, \varphi_2, z_2)$ by a first continuously differentiable function $r_2 = F(\varphi_2, z_2)$, where for each real number $z_2$ $F(0, z_2) = F(2\pi, z_2)$, and $$\lim_{\varphi_2 \to 0} \frac{dF}{d\varphi_2}(\varphi_2, z_2) = \lim_{\varphi_2 \to 2\pi} \frac{dF}{d\varphi_2}(\varphi_2, z_2),$$

wherein the first cam has a first number m of lobes and valleys; wherein the second cam placed on the first shaft has a second profile defined in the second cylindrical coordinate system $(r_1, \varphi_1, z_1)$ by a second continuously differentiable function $r_1 = G(\varphi_1, z_1)$, wherein for each real number $z_1$ $G(0, z_1) = G(2\pi, z_1)$, and $$\lim_{\varphi_1 \to 0} \frac{dG}{d\varphi_1}(\varphi_1, z_1) = \lim_{\varphi_1 \to 2\pi} \frac{dG}{d\varphi_1}(\varphi_1, z_1),$$

wherein the second cam has a second number n of lobes and valleys; wherein the first function $F(\varphi_2, z_2)$ defining the profile of the first cam placed in the body, and the second function $G(\varphi_1, z_1)$ defining the profile of the second cam placed on the first shaft are such that the first circular roller of the at least one rollers assembly remains in constant contact with the first cam placed in the body, and the second circular roller of the at least one rollers assembly remains in constant contact with the second cam placed on the first shaft, during rotation of the first shaft relative the body by 360 degrees and during rotation of the second shaft relative the body by 360 degrees.

2. The gear free of sliding friction according to claim 1, wherein the second center of the circular profile of the second circular roller moves relative the first Cartesian coordinate system during the gear operation along a first curve γ given in the first Cartesian coordinate system by a third continuously differentiable function $x = \gamma_1(t)$, a fourth continuously differentiable function $y = \gamma_2(t)$, and a fifth constant function $z = \gamma_3(t) = z_0$, wherein $z_0$ is a fixed real number; wherein the second function $G(\varphi_1, z_1)$, defining the second profile of the second cam placed on the first shaft in the second cylindrical coordinate system assumes the form $G(\varphi_1, z_1) = f(\varphi_1)$, for a sixth continuously differentiable function $r_1 = f(\varphi_1)$, wherein $$\lim_{\varphi_1 \to 0} f(\varphi_1) = \lim_{\varphi_1 \to 2\pi} f(\varphi_1),$$

$$\lim_{\varphi_1 \to 0} \frac{d}{d\varphi_1} f(\varphi_1) = \lim_{\varphi_1 \to 2\pi} \frac{d}{d\varphi_1} f(\varphi_1),$$

so that the second profile of the second cam placed on the first shaft is independent of the variable $z_1$, and is given in the second Cartesian coordinate system by the following formulas: $x_1(\varphi_1, z_1) = f(\varphi_1) \cos\varphi_1$, $y_1(\varphi_1, z_1) = f(\varphi_1) \sin\varphi_1$, $z_1 = z_1$; wherein the first profile $(\tilde{x}_2^1(\xi), \tilde{y}_1^2(\xi))$ of the first cam placed in the body satisfies in the third Cartesian coordinate system $(x_2, y_2, z_2)$ the following system of parametric equations:

$$\tilde{x}_2^1(\xi) = \tilde{x}_2(\xi) \pm \rho_1 \left( \frac{\frac{d\tilde{y}_2(\xi)}{d\xi}}{\sqrt{\left(\frac{d\tilde{x}_2(\xi)}{d\xi}\right)^2 + \left(\frac{d\tilde{y}_2(\xi)}{d\xi}\right)^2}} \right) \quad \text{(A)}$$

$$\tilde{y}_2^1(\xi) = \tilde{y}_2(\xi) \mp \rho_1 \left( \frac{\frac{d\tilde{x}_2(\xi)}{d\xi}}{\sqrt{\left(\frac{d\tilde{x}_2(\xi)}{d\xi}\right)^2 + \left(\frac{d\tilde{y}_2(\xi)}{d\xi}\right)^2}} \right); \quad \text{(B)}$$

wherein $\xi \in [0, 2\pi k)$ is a real parameter; wherein the assembly $x(\xi)$, $y(\xi)$, $t(\xi)$, $x_t(\xi)$, $y_t(\xi)$, $\varphi(\xi)$ is a solution to the following system of equations in the first Cartesian coordinate system $(x,y,z)$:

$$x(\xi) = \gamma_1(t(\xi)), \; y(\xi) = \gamma_2(t(\xi)), \quad (1)$$

$$x_t(\xi) = f_\xi(\varphi(\xi))\cos(\varphi(\xi)), \; y_t(\xi) = f_\xi(\varphi(\xi))\cos(\varphi(\xi)), \quad (2)$$

$$\frac{(-y(\xi) + y_t(\xi))}{\rho_0} = \frac{\frac{dx_\xi}{d\varphi}(\varphi(\xi))}{\sqrt{\left(\frac{dx_\xi}{d\varphi}(\varphi(\xi))\right)^2 + \left(\frac{dy_\xi}{d\varphi}(\varphi(\xi))\right)^2}}, \quad (3)$$

$$\frac{(-x(\xi) + x_t(\xi))}{\rho_0} = \frac{\frac{dy_\psi}{d\varphi}(\varphi(\xi))}{\sqrt{\left(\frac{dx_\xi}{d\varphi}(\varphi(\xi))\right)^2 + \left(\frac{dy_\xi}{d\varphi}(\varphi(\xi))\right)^2}}; \quad (4)$$

wherein $f_\xi(\varphi) = f(\varphi - \xi), \; x_\xi(\varphi) = f_\xi(\varphi)\cos\varphi, \; y_\xi(\varphi) = f_\xi(\varphi)\sin\varphi;$ and $(\tilde{x}_2(\xi), \tilde{y}_2(\xi)) = \left(\cos\left(\frac{\xi}{k}\right)x(\xi) + \sin\left(\frac{\xi}{k}\right)y(\xi); -\sin\left(\frac{\xi}{k}\right)x(\xi) + \cos\left(\frac{\xi}{k}\right)y(\xi)\right).$

3. The gear free of sliding friction according to claim 2, wherein the second cam placed on the first shaft is a circular eccentric with an eccentricity ratio e and a radius $r_e$; wherein the first curve γ is a segment of a straight line; wherein the first profile $(\tilde{x}(\varphi), \tilde{y}(\varphi))$ of the first cam placed in the body satisfies in the first Cartesian coordinate system $(x,y,z)$ the following system of parametric equations:

$$\tilde{x}(\varphi) = B(\varphi) + \rho_1 \frac{B(\varphi) - D(\varphi)\sin(\varphi)}{\sqrt{(C(\varphi))^2 + (D(\varphi))^2}}, \quad \text{(C)}$$

$$\tilde{y}(\varphi) = E(\varphi) + \rho_1 \frac{E(\varphi) + D(\varphi)\cos(\varphi)}{\sqrt{(C(\varphi))^2 + (D(\varphi))^2}}; \quad \text{(D)}$$

wherein $\varphi$ is a real parameter, and $A(\varphi) = \sqrt{(r_e + \rho_0)^2 - e^2\sin^2(k\varphi)},$ $B(\varphi) = e\cos(k\varphi)\cos\varphi + A(\varphi)\cos\varphi,$ $C(\varphi) = A(\varphi) + e\cos(k\varphi),$ $D(\varphi) = \frac{ke^2\sin(k\varphi)\cos(k\varphi)}{A(\varphi)} + ke\sin(k\varphi),$ $E(\varphi) = e\cos(k\varphi)\sin\varphi + A(\varphi)\sin\varphi.$

4. The gear free of sliding friction according to claim 2, wherein the second cam placed on the first shaft is a circular eccentric with an eccentricity ratio e and a radius $r_e$; wherein the first curve γ is a circular arc of radius a and center $O(0, b)$, wherein b is the $y_2$-coordinate of the center $O(0, b)$ in the third Cartesian coordinate system $(x_2, y_2, z_2)$; wherein the first profile $(\tilde{x}_2(\xi), \tilde{y}_2(\xi))$ of the first cam placed in the body satisfies in the third Cartesian coordinate system $(x_2, y_2, z_2)$ the following system of parametric equations:

$$\tilde{x}_2(\xi) = \tilde{\gamma}_1(\varphi) \pm \rho_1 \frac{\frac{d\tilde{\gamma}_2(\xi)}{d\xi}}{\sqrt{\left(\frac{d\tilde{\gamma}_1(\xi)}{d\xi}\right)^2 + \left(\frac{d\tilde{\gamma}_2(\xi)}{d\xi}\right)^2}}, \quad \text{(E)}$$

$$\tilde{y}_2(\xi) = \tilde{\gamma}_2(\xi) \mp \rho_1 \frac{\frac{d\tilde{\gamma}_1(\xi)}{d\xi}}{\sqrt{\left(\frac{d\tilde{\gamma}_1(\xi)}{d\xi}\right)^2 + \left(\frac{d\tilde{\gamma}_2(\xi)}{d\xi}\right)^2}}, \quad \text{(F)}$$

wherein $\xi \in [0, 2\pi k)$ is a real parameter,
wherein $\tilde{\gamma}_1(\xi) = a\cos(\xi/k)\cos\chi(\xi) \mp a\sin(\xi/k)\sin\chi(\xi) - b\sin(\xi/k),$
$\tilde{\gamma}_2(\xi) = \pm a\sin(\xi/k)\cos\chi(\xi) + a\cos(\xi/k)\sin\chi(\xi) + b\cos(\xi/k),$
and $\chi(\xi)$ is a solution to the following equation:

$(a\cos\chi(\xi) - e\cos\xi)^2 + (a\sin\chi(\xi) + b - e\sin\xi)^2 = (r_e + \rho_0)^2.$

5. A gear free of sliding friction includes a body; a first shaft supported rotatably in the body for rotation around a first axis of rotation, and defining a first cylindrical coordinate system $(r, \varphi, z)$ at rest relative the first shaft, the z-axis of which coincides with the first axis of rotation of the first shaft relative the body; a second shaft supported rotatably in the body coaxially with the first shaft for rotation around the first axis of rotation, and defining a second cylindrical coordinate system $(r_1, \varphi_1, z_1)$ at rest relative the second shaft, the $z_1$-axis of which coincides with the first axis of rotation of the second shaft relative the body; and at least one rollers assembly; wherein the first shaft has a first cam secured against rotation relative the first shaft, wherein the first cam has a first profile defined in the cylindrical coordinate system $(r, \varphi, z)$ by a first continuously differentiable function $r = F(\varphi, z)$, where for each real number z $F(0, z) = F(2\pi, z)$, and $$\lim_{\varphi \to 0} \frac{dF}{d\varphi}(\varphi, z) = \lim_{\varphi \to 2\pi} \frac{dF}{d\varphi}(\varphi, z),$$

wherein the first cam has a first number m of lobes and valleys; wherein the second shaft has a second cam secured against rotation relative the second shaft, wherein the second cam has a second profile defined in the second cylindrical coordinate system $(r_1, \varphi_1, z_1)$ by a second continuously differentiable function $r_1 = G(\varphi_1, z_1)$, where for each real number $z_1$ $G(0, z_1) = G(2\pi, z_1)$, and $$\lim_{\varphi_1 \to 0} \frac{dF}{d\varphi_1}(\varphi_1, z_1) = \lim_{\varphi_1 \to 2\pi} \frac{dF}{d\varphi_1}(\varphi_1, z_1),$$

wherein the second cam has a second number n of lobes and valleys; wherein the at least one rollers assembly includes at least a first circular roller, a second circular roller, and a lever; wherein the first circular roller is connected pivotally with the lever for rotation relative the lever around a second axis of rotation, and the second circular roller is connected pivotally with the lever for rotation relative the lever around a third axis of rotation; wherein the lever is connected pivotally with the body for oscillation relative the body around a fourth axis of rotation; wherein the at least one rollers assembly is mounted pivotally in the body through the lever so that the first roller of the at least one rollers assembly is tangent to the first cam on the first shaft, and the second roller of the at least one rollers assembly is tangent to the second cam on the second shaft; wherein the first profile r=F($\varphi$,z) of the first cam on the first shaft, and the second profile $r_1$=G($\varphi_1$,$z_1$) of the second cam on the second shaft are defined so that during revolution of the first shaft around the first axis of rotation by 360 degrees and during revolution of the second shaft around the first axis of rotation by 360 degrees the first roller of the at least one rollers assembly remains tangent to the first cam placed on the first shaft, and the second roller of the at least one rollers assembly remains tangent to the second cam placed on the second shaft.

6. A gear free of sliding friction including a body defining a first cylindrical coordinate system (r, $\varphi$,z) at rest relative the body, and a first Cartesian coordinate system (x,y,z) at rest relative the body, where x=r cos $\varphi$, y=r sin $\varphi$, wherein the z-axis of the first cylindrical coordinate system coincides with the z-axis of the first Cartesian coordinate system; a first shaft supported rotatably in the body for rotation around a first axis of rotation, and defining a second cylindrical coordinate system ($r_1$, $\varphi_1$,$z_1$) at rest relative the first shaft, the z-axis of which coincides with the first axis of rotation of the first shaft relative the body, and a second Cartesian coordinate system ($x_1$,$y_1$,$z_1$) at rest relative the first shaft, where $x_1$=$r_1$ cos $\varphi_1$, $y_1$=$r_1$ sin $\varphi_1$, wherein the $z_1$-axis of the second cylindrical coordinate system coincides with the $z_1$-axis of the second Cartesian coordinate system; a second shaft supported rotatably in the body coaxially with the first shaft for rotation around the first axis of rotation, and defining a third cylindrical coordinate system ($r_2$, $\varphi_2$,$z_2$) at rest relative the second shaft, the $z_2$-axis of which coincides with the first axis of rotation of the second shaft relative the body, and a third Cartesian coordinate system ($x_2$,$y_2$,$z_2$) at rest relative the second shaft, where $x_2$=$r_2$ cos $\varphi_2$, $y_2$=$r_2$ sin $\varphi_2$, wherein the $z_2$-axis of the third cylindrical coordinate system coincides with the $z_2$-axis of the third Cartesian coordinate system; and at least one rollers assembly; wherein the body has a first cam secured against rotation relative the body, wherein the first cam has a first profile defined in the first cylindrical coordinate system (r, $\varphi$,z) by a first continuously differentiable function r=F($\varphi$,z), where for each real number z F(0,z)=F(2$\pi$,z), and $$\lim_{\varphi \to 0} \frac{dF}{d\varphi}(\varphi, z) = \lim_{\varphi \to 2\pi} \frac{dF}{d\varphi}(\varphi, z),$$

wherein the first cam has a first number l of lobes and valleys; wherein the first shaft has a second cam secured against rotation relative the first shaft, wherein the second cam has a second profile defined in the second cylindrical coordinate system ($r_1$, $\varphi_1$,$z_1$) by a second continuously differentiable function $r_1$=G($\varphi_1$,$z_1$), where for each real number $z_1$ G(0,$z_1$)=G(2$\pi$,$z_1$), and $$\lim_{\varphi_1 \to 0} \frac{dG}{d\varphi_1}(\varphi_1, z_1) = \lim_{\varphi_1 \to 2\pi} \frac{dG}{d\varphi_1}(\varphi_1, z_1),$$

wherein the second cam has a second number m of lobes and valleys; wherein the second shaft has a third cam secured against rotation relative the second shaft, wherein the third cam has a third profile defined in the third cylindrical coordinate system ($r_2$, $\varphi_2$,$z_2$) by a third continuously differentiable function $r_2$=H($\varphi_2$,$z_2$), where for each real number $z_2$ H(0,$z_2$)=H(2$\pi$,$z_2$), and $$\lim_{\varphi_2 \to 0} \frac{dH}{d\varphi_2}(\varphi_2, z_2) = \lim_{\varphi_2 \to 2\pi} \frac{dH}{d\varphi_2}(\varphi_2, z_2),$$

wherein the third cam has a third number n of lobes and valleys; wherein the at least one rollers assembly includes a first circular roller, the circular profile of which has a first center and a first radius $\rho_1$, a second circular roller, the circular profile of which has a second center and a second radius $\rho_2$, and a third circular roller, the circular profile of which has a third center and a third radius $\rho_3$; wherein the first circular roller is connected pivotally with the second circular roller and with the third circular roller, so that the second circular roller is able to pivot relative the first circular roller around a second axis of rotation, and the third circular roller is able to pivot relative the first circular roller around the second axis of rotation; wherein the at least one rollers assembly is mounted in the body so that the first circular roller of the at least one rollers assembly is tangent to the first cam placed in the body, the second circular roller of the at least one rollers assembly is tangent to the second cam placed on the first shaft, and the third circular roller of the at least one rollers assembly is tangent to the third cam placed on the second shaft; wherein the first profile r=F($\varphi$,z) of the first cam placed in the body, the second profile $r_1$=G($\varphi_1$,$z_1$) of the second cam placed on the first shaft, and the third profile $r_2$=H($\varphi_2$,$z_2$) of the third cam placed on the second shaft, are defined so that during revolution of the first shaft around the first axis of rotation by 360 degrees, and during revolution of the second shaft around the first axis of rotation by 360 degrees, the first roller of the at least one rollers assembly remains tangent to the first cam placed in the body, the second roller of the at least one rollers assembly remains tangent to the second cam placed on the first shaft, and the third roller of the at least one rollers assembly remains tangent to the third cam placed on the second shaft.

7. The gear free of sliding friction according to claim 6, wherein the second center of the circular profile of the second circular roller moves relative the first Cartesian coordinate system during the gear operation along a first curve $\gamma$ given in the first Cartesian coordinate system by a fourth continuously differentiable function x=$\gamma_1$(t), a fifth continuously differentiable function y=$\gamma_2$(t), and a sixth constant function z=$\gamma_3$ (t)=$z_0$, wherein $z_0$ is a fixed real number; wherein the second function G($\varphi_1$,$z_1$) defining the second profile of the second cam placed on the first shaft in the second cylindrical coordinate system assumes the form G($\varphi_1$,$z_1$)=f($\varphi_1$) for a seventh continuously differentiable function $r_1$=f($\varphi_1$), where $$\lim_{\varphi_1 \to 0} f(\varphi_1) = \lim_{\varphi_1 \to 2\pi} f(\varphi_1), \lim_{\varphi_1 \to 0} \frac{d}{d\varphi_1} f(\varphi_1) = \lim_{\varphi_1 \to 2\pi} \frac{d}{d\varphi_1} f(\varphi_1),$$

so that the second profile of the second cam placed on the first shaft is independent of the variable $z_1$, and is given in the second Cartesian coordinate system by the following formulas: $x_1(\varphi_1,z_1)=f(\varphi_1)\cos \varphi_1$, $y_1(\varphi_1,z_1)=f(\varphi_1)\sin \varphi_1, z_1=z_1$; wherein the profile $(\tilde{x}^1(\xi),\tilde{y}^1(\xi))$ of the first cam placed in the body satisfies in the first Cartesian coordinate system (x,y,z) the following system of parametric equations:

$$\tilde{x}^1(\xi) = x(\xi) \pm \rho_1 \frac{\frac{dy(\xi)}{d\xi}}{\sqrt{\left(\frac{dx(\xi)}{d\xi}\right)^2 + \left(\frac{dy(\xi)}{d\xi}\right)^2}}, \quad (G)$$

$$\tilde{y}^1(\xi) = y(\xi) \mp \rho_1 \frac{\frac{dx(\xi)}{d\xi}}{\sqrt{\left(\frac{dx(\xi)}{d\xi}\right)^2 + \left(\frac{dy(\xi)}{d\xi}\right)^2}}, \quad (H)$$

where $\xi$ is a real parameter; wherein the assembly $x(\xi)$, $y(\xi)$, $t(\xi)$, $x_t(\xi)$, $y_t(\xi)$, and $\varphi(\xi)$ is a solution to the following system of equations in the first Cartesian coordinate system (x,y,z):

$$x(\xi) = \gamma_1(t(\xi)), \ y(\xi) = \gamma_2(t(\xi)), \quad (1)$$

$$x_t(\xi) = f_\xi(\varphi(\xi))\cos(\varphi(\xi)), \ y_t(\xi) = f_\xi(\varphi(\xi))\cos(\varphi(\xi)), \quad (2)$$

$$\frac{(-y(\xi) + y_t(\xi))}{\rho_2} = \pm \frac{\frac{dx_\xi}{d\varphi}(\varphi(\xi))}{\sqrt{\left(\frac{dx_\xi}{d\varphi}(\varphi(\xi))\right)^2 + \left(\frac{dy_\xi}{d\varphi}(\varphi(\xi))\right)^2}}, \quad (3)$$

$$\frac{(-x(\xi) + x_t(\xi))}{\rho_2} = \pm \frac{\frac{dy_\xi}{d\varphi}(\varphi(\xi))}{\sqrt{\left(\frac{dx_\xi}{d\varphi}(\varphi(\xi))\right)^2 + \left(\frac{dy_\xi}{d\varphi}(\varphi(\xi))\right)^2}}; \quad (4)$$

where $f_\xi(\varphi)=f(\varphi-\xi)$, $x_\xi(\varphi)=f_\xi(\varphi)\cos \varphi$, $y_\xi(\varphi)=f_\xi(\varphi)\sin \varphi$; wherein the second center of the circular profile of the second circular roller moves relative the third Cartesian coordinate system during the gear operation along a second curve $\delta$ given in the third Cartesian coordinate system by an eighth continuously differentiable function $x_2=\delta_1(s)$, a ninth continuously differentiable function $y_2=\delta_2(s)$), and a tenth constant function $z_2=z_{10}$ for some real number $z_{10}$; wherein the profile $(\tilde{x}^2(\xi),\tilde{y}^2(\xi))$ of the third cam placed on the second shaft satisfies in the third Cartesian coordinate system $(x_2,y_2,z_2)$ the following system of parametric equations:

$$\tilde{x}^2(\xi) = \bar{x}(\xi) \pm \rho_3 \frac{\frac{d\bar{y}(\xi)}{d\xi}}{\sqrt{\left(\frac{d\bar{x}(\xi)}{d\xi}\right)^2 + \left(\frac{d\bar{y}(\xi)}{d\xi}\right)^2}}, \quad (J)$$

$$\tilde{y}^2(\xi) = \bar{y}(\xi) \mp \rho_3 \frac{\frac{d\bar{x}(\xi)}{d\xi}}{\sqrt{\left(\frac{d\bar{x}(\xi)}{d\xi}\right)^2 + \left(\frac{d\bar{y}(\xi)}{d\xi}\right)^2}}, \quad (K)$$

where $\xi$ is a real parameter; wherein the assembly $\bar{x}(\xi)$, $\bar{y}(\xi)$, $\bar{t}(\xi)$, $\bar{x}_t(\xi)$, $\bar{y}_t(\xi)$, and $\bar{\varphi}(\xi)$ is a solution to the following system of equations in the third Cartesian coordinate system $(x_2,y_2,z_2)$:

$$\bar{x}(\xi) = \delta_1(\bar{t}(\xi)), \ \bar{y}(\psi) = \delta_2(\bar{t}(\xi)) \quad (4)$$

$$\bar{x}_t(\xi) = f_\xi(\bar{\varphi}(\xi))\cos(\bar{\varphi}(\xi)), \ \bar{y}_t(\xi) = f_\xi(\bar{\varphi}(\xi))\cos(\bar{\varphi}(\xi)) \quad (5)$$

$$\frac{(-\bar{y}(\xi) + \bar{y}_t(\xi))}{\rho_2} = \pm \frac{\frac{dx_\xi}{d\varphi}(\bar{\varphi}(\xi))}{\sqrt{\left(\frac{dx_\xi}{d\varphi}(\bar{\varphi}(\xi))\right)^2 + \left(\frac{dy_\xi}{d\varphi}(\bar{\varphi}(\xi))\right)^2}}, \quad (6)$$

$$\frac{(-\bar{x}(\xi) + \bar{x}_t(\xi))}{\rho_2} = \pm \frac{\frac{dy_\xi}{d\varphi}(\bar{\varphi}(\xi))}{\sqrt{\left(\frac{dx_\xi}{d\varphi}(\bar{\varphi}(\xi))\right)^2 + \left(\frac{dy_\xi}{d\varphi}(\bar{\varphi}(\xi))\right)^2}}; \quad (7)$$

where $f_\xi(\varphi)=f(\varphi-\xi)$, $x_\xi(\varphi)=f_\xi(\varphi)\cos \varphi$, $y_\xi(\varphi)=f_\xi(\varphi)\sin \varphi$.

8. The gear free of sliding friction according to claim 6, wherein m=1.

9. The gear free of sliding friction according to claim 8, wherein the second cam placed on the first shaft is a circular eccentric.

10. The gear free of sliding friction according to claim 6, wherein the absolute value of the number n−1 equals 2.

\* \* \* \* \*